(12) United States Patent
Abdelmonem et al.

(10) Patent No.: US 12,267,705 B2
(45) Date of Patent: Apr. 1, 2025

(54) METHOD AND APPARATUS FOR DETECTING AND MITIGATING PASSIVE INTERMODULATION INTERFERENCE IN A COMMUNICATION SYSTEM

(71) Applicant: ISCO International, LLC, Schaumburg, IL (US)

(72) Inventors: Amr Abdelmonem, Northbrook, IL (US); Pablo Tacconi, Arlington, TX (US); Igor Goodman, Buffalo Grove, IL (US)

(73) Assignee: ISCO International, LLC, Schaumburg, IL (US)

( * ) Notice: Subject to any disclaimer, the term of this patent is extended or adjusted under 35 U.S.C. 154(b) by 124 days.

(21) Appl. No.: 17/076,930

(22) Filed: Oct. 22, 2020

(65) Prior Publication Data
US 2021/0127284 A1    Apr. 29, 2021

Related U.S. Application Data

(60) Provisional application No. 62/925,891, filed on Oct. 25, 2019.

(51) Int. Cl.
*H04W 24/08*    (2009.01)
*H04L 27/00*    (2006.01)

(52) U.S. Cl.
CPC ......... *H04W 24/08* (2013.01); *H04L 27/0008* (2013.01)

(58) Field of Classification Search
CPC .................. H04W 24/08; H04W 24/02; H04L 27/0008; H04B 1/1027
See application file for complete search history.

(56) References Cited

U.S. PATENT DOCUMENTS

| | | | |
|---|---|---|---|
| 6,591,108 B1* | 7/2003 | Herrig | H04W 16/04 370/330 |
| 7,346,134 B2 | 3/2008 | Smith | |
| 9,548,775 B2 | 1/2017 | Smith | |
| 2013/0310090 A1* | 11/2013 | Bevan | H04B 1/123 455/501 |
| 2016/0301436 A1* | 10/2016 | Zou | H04L 27/0008 |
| 2016/0366605 A1* | 12/2016 | Tsui | H04W 24/08 |

(Continued)

*Primary Examiner* — Meng Vang
*Assistant Examiner* — Hector Reyes
(74) *Attorney, Agent, or Firm* — Guntin & Gust, PLC; Robert Gingher

(57) ABSTRACT

A system that incorporates aspects of the subject disclosure may perform operations including, for example, receiving an uplink signal generated by a communication device; generating an estimation of one or more downlink signals generated by one or more transmitters; detecting a passive intermodulation interference in the uplink signal, wherein the passive intermodulation interference is caused by the one or more transmitters, wherein the passive intermodulation interference is detected by the circuit based on a comparison of characteristics of the uplink signal with the estimation of the one or more downlink signals generated by the one or more transmitters, and wherein the one or more transmitters are unassociated with the communication device generating the uplink signal; and performing signal conditioning on the uplink signal to reduce the passive intermodulation interference. Other embodiments are disclosed.

20 Claims, 41 Drawing Sheets

(56) References Cited

U.S. PATENT DOCUMENTS

| | | | | |
|---|---|---|---|---|
| 2017/0353929 A1* | 12/2017 | Tacconi | ................ | H04W 52/42 |
| 2018/0070254 A1* | 3/2018 | Hannan | ............... | H04W 72/082 |
| 2019/0007078 A1* | 1/2019 | Tsui | .................... | H04B 1/0466 |
| 2019/0052294 A1* | 2/2019 | Abdelmonem | ....... | H04B 17/373 |
| 2020/0021323 A1* | 1/2020 | Cyzs | ....................... | H04B 1/123 |
| 2020/0145032 A1* | 5/2020 | Ayala | ................... | H04B 17/345 |
| 2020/0296729 A1* | 9/2020 | Lindoff | ............... | H04W 72/082 |
| 2021/0099199 A1* | 4/2021 | Pehlke | ................... | H04B 1/123 |
| 2021/0127284 A1* | 4/2021 | Abdelmonem | ....... | H04W 24/08 |

* cited by examiner

3290

METHOD AND APPARATUS FOR DETECTING AND MITIGATING PASSIVE INTERMODULATION INTERFERENCE IN A COMMUNICATION SYSTEM

CROSS-REFERENCE TO RELATED APPLICATIONS

The present application claims the benefit of priority to U.S. Provisional Application No. 62/925,891 filed on Oct. 25, 2019, which is hereby incorporated by reference herein in its entirety.

FIELD OF THE DISCLOSURE

The subject disclosure is related to a method and apparatus for increasing performance of communication paths for communication nodes in the presence of passive intermodulation (PIM) interference.

BACKGROUND OF THE DISCLOSURE

In most communication environments involving short range or long range wireless communications, interference from unexpected wireless sources can impact the performance of a communication system leading to lower throughput, dropped calls, reduced bandwidth which can cause traffic congestion, or other adverse effects, which are undesirable.

Some service providers of wireless communication systems have addressed interference issues by adding more communication nodes, policing interferers, or utilizing antenna steering techniques to avoid interferers.

BRIEF DESCRIPTION OF THE DRAWINGS

Reference will now be made to the accompanying drawings, which are not necessarily drawn to scale, and wherein.

DETAILED DESCRIPTION

Figure 1:
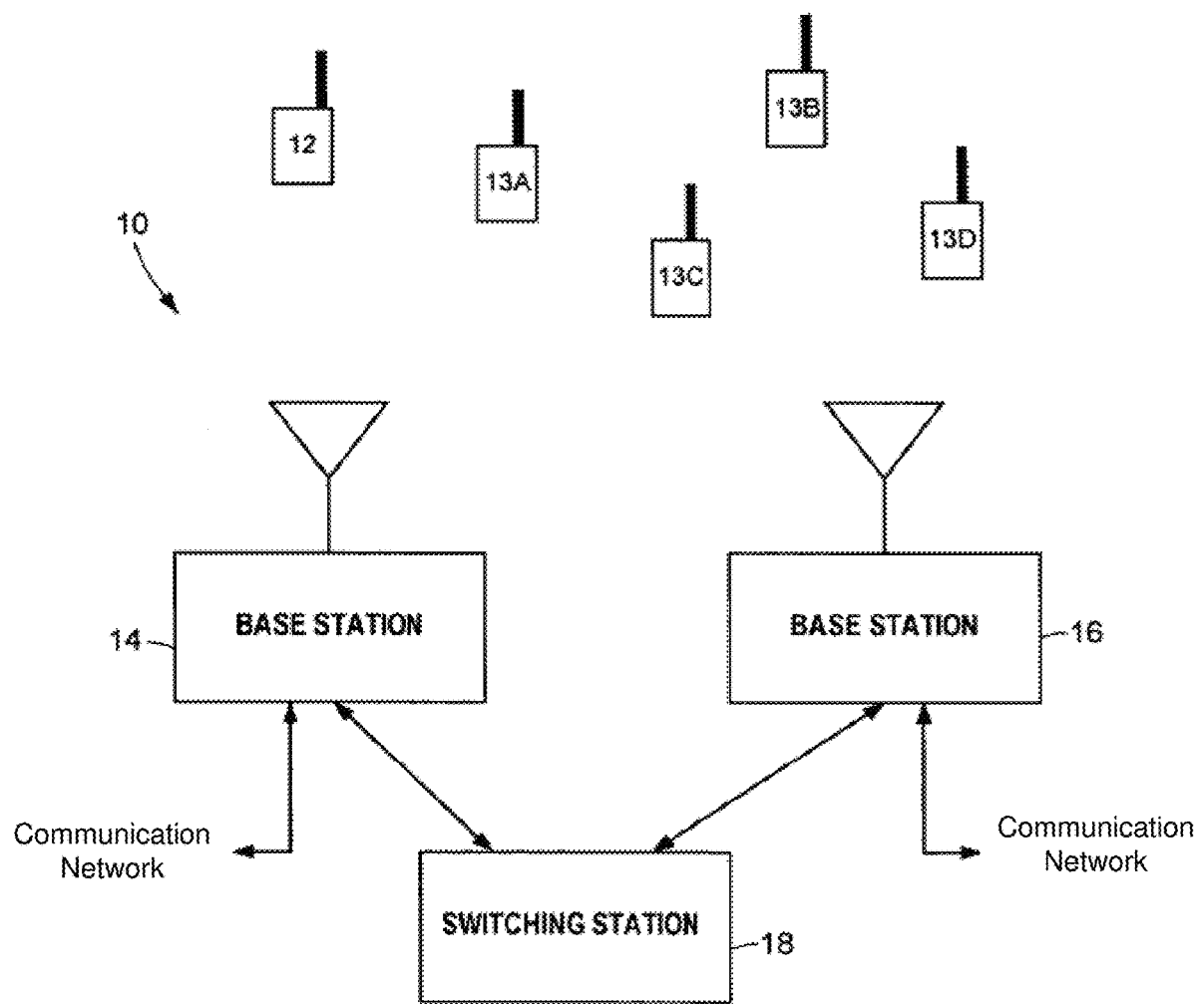
FIG. 1 depicts an illustrative embodiment of a communication system.

A leading source of interference that impacts 4G and/or 5G Long Term Evolution (LTE) networks is passive intermodulation (PIM) interference. PIM interference occurs when radio frequency (RF) energy from two or more transmitters is non-linearly mixed in a passive circuit, such as a bad RF connection, damaged cables, poor antennas, metallic structures, etc. In a conventional approach, removing PIM interference requires knowledge of the transmitted signals. The subject disclosure describes, among other things, illustrative embodiments for detecting and mitigating interference signals. Other embodiments are included in the subject disclosure.

One embodiment of the subject disclosure includes a method of receiving, by a circuit, an uplink signal generated by a communication device; generating, by the circuit, an estimation of one or more downlink signals generated by one or more transmitters; detecting, by the circuit, a passive intermodulation interference in the uplink signal, wherein the passive intermodulation interference is caused by the one or more transmitters, wherein the passive intermodulation interference is detected by the circuit based on a comparison of characteristics of the uplink signal with the estimation of the one or more downlink signals generated by the one or more transmitters, and wherein the one or more transmitters are unassociated with the communication device generating the uplink signal; and performing, by the circuit, signal conditioning on the uplink signal to reduce the passive intermodulation interference.

One embodiment of the subject disclosure includes a base station, including: an antenna; and a circuit coupled to the antenna, the circuit facilitating operations including: receiving an uplink signal generated by a communication device; generating an estimation of one or more downlink signals generated by one or more transmitters; detecting a passive intermodulation interference in the uplink signal, wherein the passive intermodulation interference is caused by the one or more transmitters, wherein the passive intermodulation interference is detected by the circuit based on a comparison of characteristics of the uplink signal with the estimation of the one or more downlink signals generated by the one or more transmitters, and wherein the one or more transmitters are unassociated with the communication device generating the uplink signal; and performing signal conditioning on the uplink signal to reduce the passive intermodulation interference.

One embodiment of the subject disclosure includes a machine-readable storage device, comprising executable instructions that, when executed by a system, facilitate performance of operations, the operations comprising: receiving an uplink signal generated by a communication device; generating an estimation of one or more downlink signals generated by one or more transmitters; detecting a passive intermodulation interference in the uplink signal, wherein the passive intermodulation interference is caused by the one or more transmitters, wherein the passive intermodulation interference is detected based on a comparison of characteristics of the uplink signal with the estimation of the one or more downlink signals generated by the one or more transmitters, and wherein the one or more transmitters are unassociated with the communication device generating the uplink signal; and performing signal conditioning on the uplink signal to reduce the passive intermodulation interference.

As shown in FIG. 1, an exemplary telecommunication system 10 may include mobile units 12, 13A, 13B, 13C, and 13D, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13A, 13B, 13C, and 13D exchange voice, data or other information with one of the base stations 14, 16, each of which is connected to a conventional land line communication network. For example, information, such as voice information, transferred from the mobile unit 12 to one of the base stations 14, 16 is coupled from the base station to the communication network to thereby connect the mobile unit 12 with, for example, a land line telephone so that the land line telephone may receive the voice information. Conversely, information, such as voice information may be transferred from a land line communication network to one of the base stations 14, 16, which in turn transfers the information to the mobile unit 12.

The mobile units 12, 13A, 13B, 13C, and 13D and the base stations 14, 16 may exchange information in either narrow band or wide band format. For the purposes of this description, it is assumed that the mobile unit 12 is a narrowband unit and that the mobile units 13A, 13B, 13C, and 13D are wideband units. Additionally, it is assumed that the base station 14 is a narrowband base station that communicates with the mobile unit 12 and that the base station 16 is a wideband digital base station that communicates with the mobile units 13A, 13B, 13C, and 13D.

Narrow band format communication takes place using, for example, narrowband 200 kilohertz (KHz) channels. The Global system for mobile phone systems (GSM) is one example of a narrow band communication system in which the mobile unit 12 communicates with the base station 14 using narrowband channels. Alternatively, the mobile units 13A, 13B, 13C, and 13D communicate with the base stations 16 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths.

The switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another base station as the mobile unit 12 roams between geographical areas that are covered by the two base stations.

One particular problem that may arise in the telecommunication system 10 is when the mobile unit 12 or the base station 14, each of which communicates using narrowband channels, interferes with the ability of the base station 16 to receive and process wideband digital signals from the digital mobile units 13A, 13B, 13C, and 13D. In such a situation, the narrowband signal transmitted from the mobile unit 12 or the base station 14 may interfere with the ability of the base station 16 to properly receive wideband communication signals.

Figure 2:
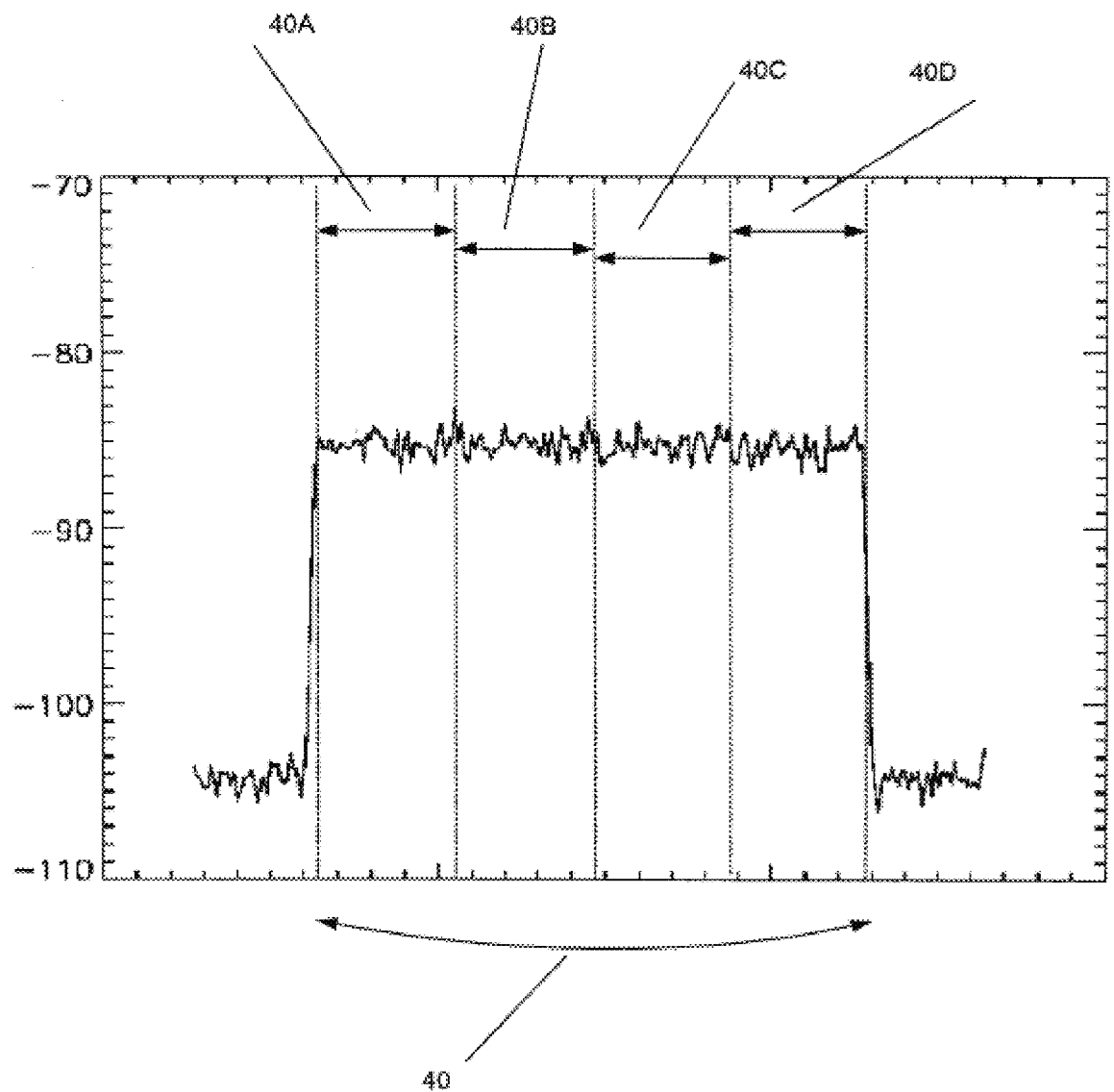
FIG. 2 depicts an illustrative embodiment of a frequency spectrum of a four carrier CDMA signal.
Figure 3:
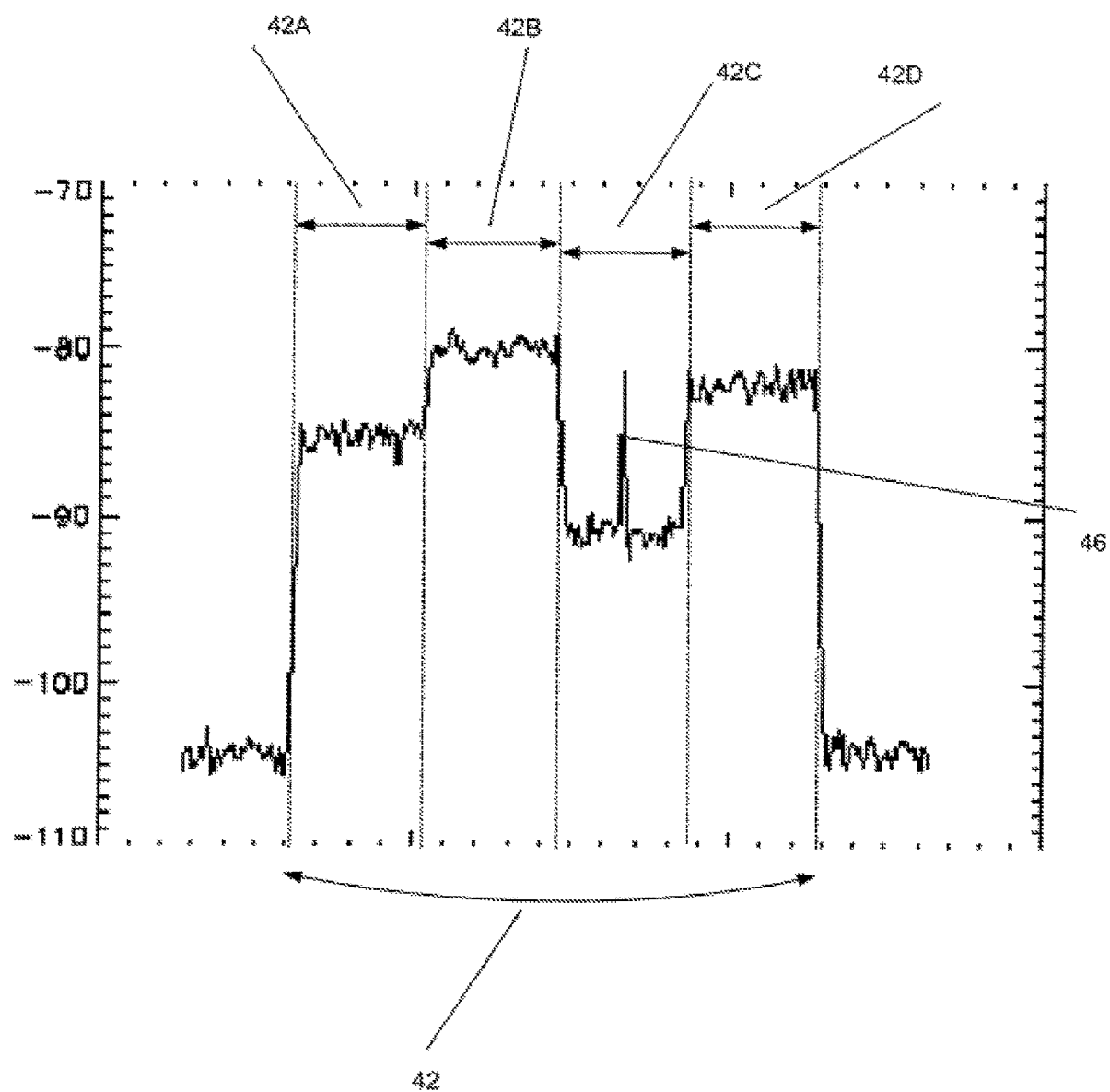
FIG. 3 depicts an illustrative embodiment of a frequency spectrum of a four carrier CDMA signal showing unequal power balancing between the four CDMA carriers and including an interferer.

As will be readily appreciated, the base station 16 may receive and process wideband digital signals from more than one of the digital mobile units 13A, 13B, 13C, and 13D. For example, the base station 16 may be adapted to receive and process four CDMA carriers 40A-40D that fall within a multi-carrier CDMA signal 40, as shown in FIG. 2. In such a situation, narrowband signals transmitted from more than one mobile units, such as, the mobile unit 12, may interfere with the ability of the base station 16 to properly receive wideband communication signals on any of the four CDMA carriers 40A-40D. For example, FIG. 3 shows a multi-carrier CDMA signal 42 containing four CDMA carriers 42A, 42B, 42C and 42D adjacent to each other wherein one of the CDMA carriers 42C has a narrowband interferer 46 therein. As shown in FIG. 3, it is quite often the case that the signal strengths of the CDMA carrier signals 42A-42D are not equal.

As disclosed in detail hereinafter, a system and/or a method for multiple channel adaptive filtering or interference suppression may be used in a communication system. In particular, such a system or method may be employed in a communication system to protect against, or to report the presence of, interference, which has deleterious effects on the performance of the communication system. Additionally, such a system and method may be operated to eliminate interference in CDMA carriers having other CDMA carriers adjacent thereto.

The foregoing system and methods can also be applied to other protocols such as AMPS, GSM, UMTS, LTE, VoLTE, 802.11xx, 5G, next generation wireless protocols, and so on. Additionally, the terms narrowband and wideband referred to above can be replaced with sub-bands, concatenated bands, bands between carrier frequencies (carrier aggregation), and so on, without departing from the scope of the subject disclosure. It is further noted that the term interference can represent emissions within band (narrowband or wideband), out-of-band interferers, interference sources outside cellular (e.g., TV stations, commercial radio or public safety radio), interference signals from other carriers (inter-carrier interference), interference signals from user equipment (UEs) operating in adjacent base stations, and so on. Interference can represent any foreign signal that can affect communications between communication devices (e.g., a UE served by a particular base station).

Figure 4:
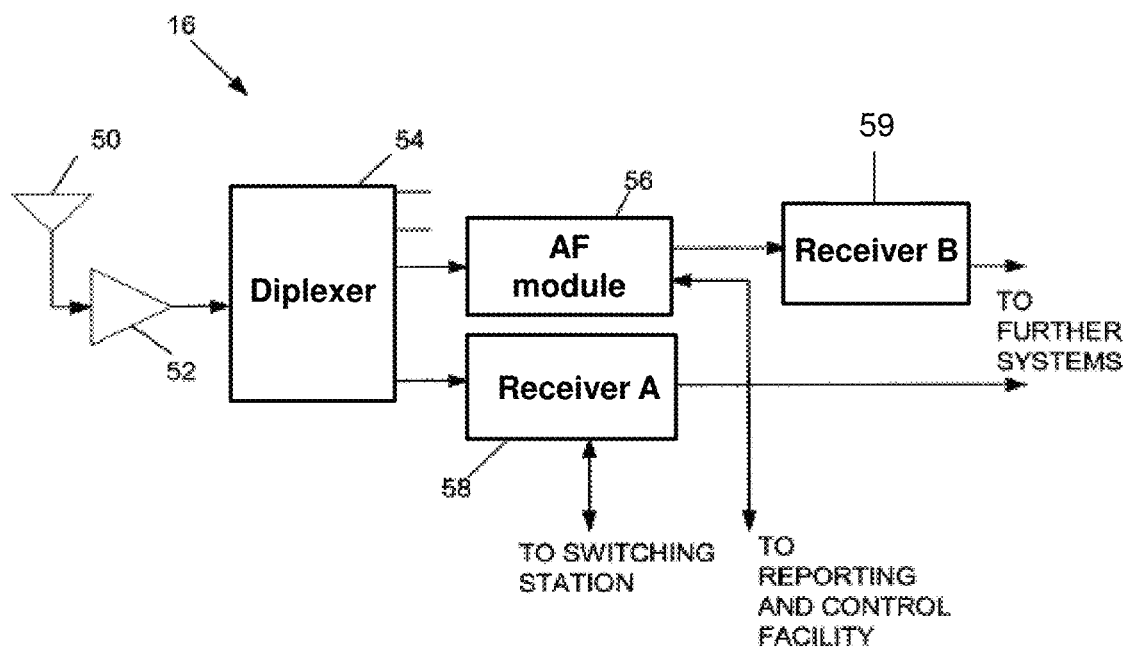
FIG. 4 depicts an illustrative embodiment of a base station of FIG. 1.

As shown in FIG. 4, the signal reception path of the base station 16, which was described as receiving interference from the mobile unit 12 in conjunction with FIG. 1, includes an antenna 50 that provides signals to an amplifier 52. The output of the amplifier 52 is coupled to a diplexer 54 that splits the signal from the amplifier 52 into a number of different paths, one of which may be coupled to an adaptive front end 56 and another of which may be coupled to a receiver A 58. The output of the adaptive front end 56 is coupled to a receiver B 59, which may, for example, be embodied in a CDMA receiver or any other suitable receiver B. Although only one signal path is shown in FIG. 4, it will be readily understood to those having ordinary skill in the art that such a signal path is merely exemplary and that, in reality, a base station may include two or more such signal paths that may be used to process main and diversity signals received by the base station 16.

It will be readily understood that the illustrations of FIG. 4 can also be used to describe the components and functions of other forms of communication devices such as a small cell base station, a microcell base station, a picocell base station, a femto cell, a Wi-Fi router or access point, a cellular phone, a smartphone, a laptop computer, a tablet, or other forms of wireless communication devices suitable for applying the principles of the subject disclosure. Accordingly, such communication devices can include variants of the components shown in FIG. 4 and perform the functions that will be described below. For illustration purposes only, the descriptions below will address the base station 16 with an understanding that these embodiments are exemplary and non-limiting to the subject disclosure.

Referring back to FIG. 4, the outputs of the receiver A 58 and the receiver B 59 can be coupled to other systems within the base station 16. Such systems may perform voice and/or data processing, call processing or any other desired function. Additionally, the adaptive front-end module 56 may also be communicatively coupled, via the Internet, telephone lines, cellular network, or any other suitable communication systems, to a reporting and control facility that is remote from the base station 16. In some networks, the reporting and control facility may be integrated with the switching station 18. The receiver A 58 may be communicatively coupled to the switching station 18 and may respond to commands that the switching station 18 issues.

Each of the components 50-60 of the base station 16 shown in FIG. 4, except for the adaptive front-end module 56, may be found in a conventional cellular base station 16, the details of which are well known to those having ordinary skill in the art. It will also be appreciated by those having ordinary skill in the art that FIG. 4 does not disclose every system or subsystem of the base station 16 and, rather, focuses on the relevant systems and subsystems to the subject disclosure. In particular, it will be readily appreciated that, while not shown in FIG. 4, the base station 16 can include a transmission system or other subsystems. It is further appreciated that the adaptive front end module 56 can be an integral subsystem of a cellular base station 16, or can be a modular subsystem that can be physically placed in different locations of a receiver chain of the base station 16, such as at or near the antenna 50, at or near the amplifier 52, or at or near the receiver B 59.

During operation of the base station 16, the antenna 50 receives CDMA carrier signals that are broadcast from the mobile unit 13A, 13B, 13C and 13D and couples such signals to the amplifier 52, which amplifies the received signals and couples the amplified signals to the diplexer 54. The diplexer 54 splits the amplified signal from the amplifier 52 and essentially places copies of the amplified signal on each of its output lines. The adaptive front-end module 56 receives the signal from the diplexer 54 and, if necessary, filters the CDMA carrier signal to remove any undesired interference and couples the filtered CDMA carrier signal to the receiver B 59.

As noted previously, FIG. 2 illustrates an ideal frequency spectrum 40 of a CDMA carrier signal that may be received at the antenna 50, amplified and split by the amplifier 52 and the diplexer 54 and coupled to the adaptive front-end module 56. If the CDMA carrier signal received at the antenna 50 has a frequency spectrum 40 as shown in FIG. 2 without any interference, the adaptive front end will not filter the CDMA carrier signal and will simply couple the signal directly through the adaptive front end module 56 to the receiver B 59.

Figure 5:
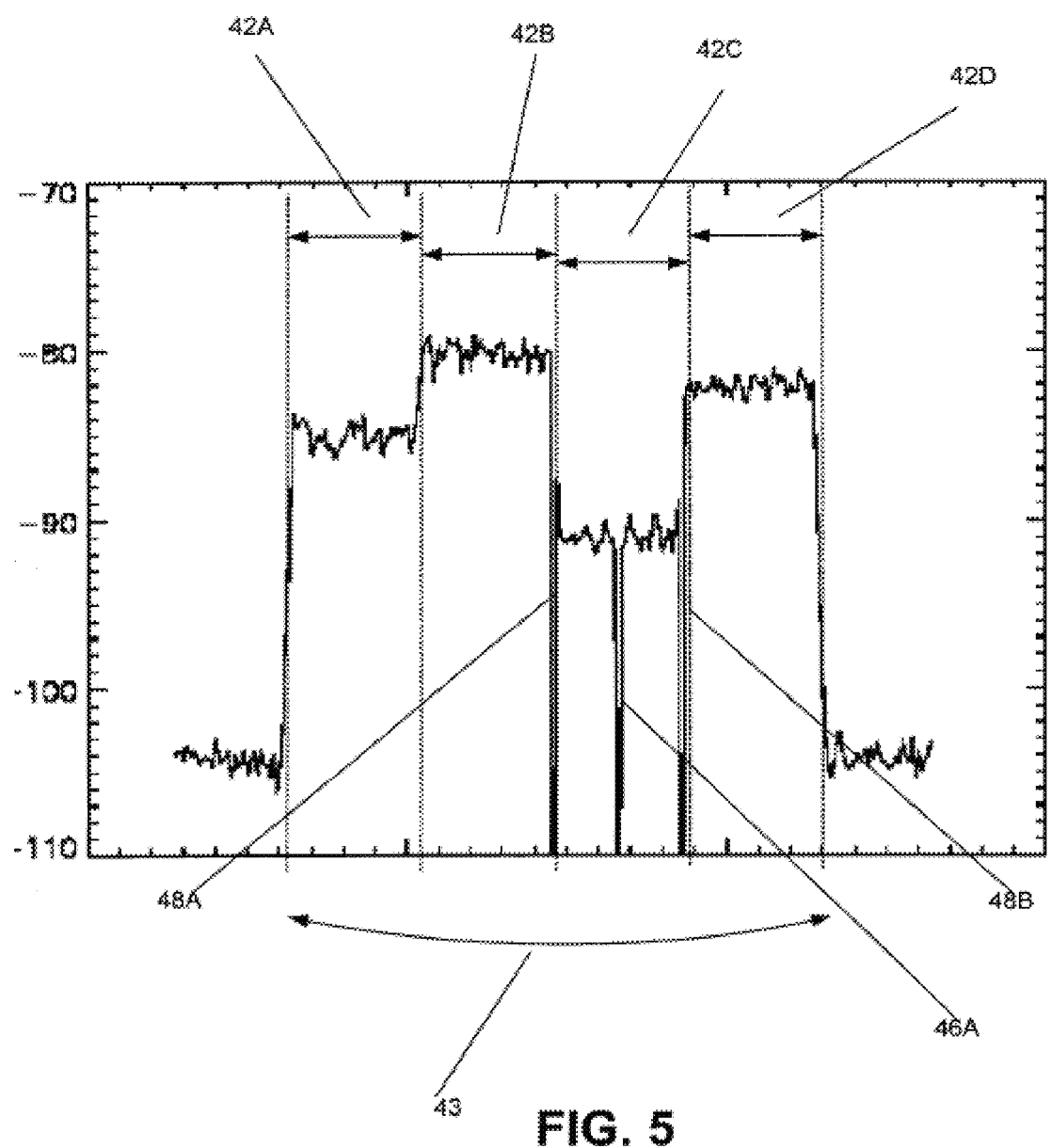
FIG. 5 depicts an illustrative embodiment of a frequency spectrum of a four carrier CDMA signal having four CDMA carriers with suppression of an interferer that results in falsing.

However, as noted previously, it is possible that the CDMA carrier signal transmitted by the mobile units 13A-13D and received by the antenna 50 has a frequency spectrum as shown in FIG. 3 which contains a multi-carrier CDMA signal 42 that includes not only the four CDMA carriers 42A, 42B, 42C and 42D from the mobile units 13A, 13B, 13C and 13D having unequal CDMA carrier strengths, but also includes interferer 46, as shown in FIG. 3, which in this illustration is caused by mobile unit 12. If a multi-carrier CDMA signal having a multi-carrier CDMA signal 42 including interferer 46 is received by the antenna 50 and amplified, split and presented to the adaptive front end module 56, it will filter the multi-carrier CDMA signal 42 to produce a filtered frequency spectrum 43 as shown in FIG. 5.

The filtered multi-carrier CDMA signal 43 has the interferer 46 removed, as shown by the notch 46A. The filtered multi-carrier CDMA signal 43 is then coupled from the adaptive front-end module 56 to the receiver B 59, so that the filtered multi-carrier CDMA signal 43 may be demodulated. Although some of the multi-carrier CDMA signal 42 was removed during filtering by the adaptive front-end module 56, sufficient multi-carrier CDMA signal 43 remains to enable the receiver B 59 to recover the information that was broadcast by mobile unit(s). Accordingly, in general terms, the adaptive front-end module 56 selectively filters multi-carrier CDMA signals to remove interference therefrom. Further detail regarding the adaptive front-end module 56 and its operation is provided below in conjunction with FIGS. 6-21.

Figure 6:
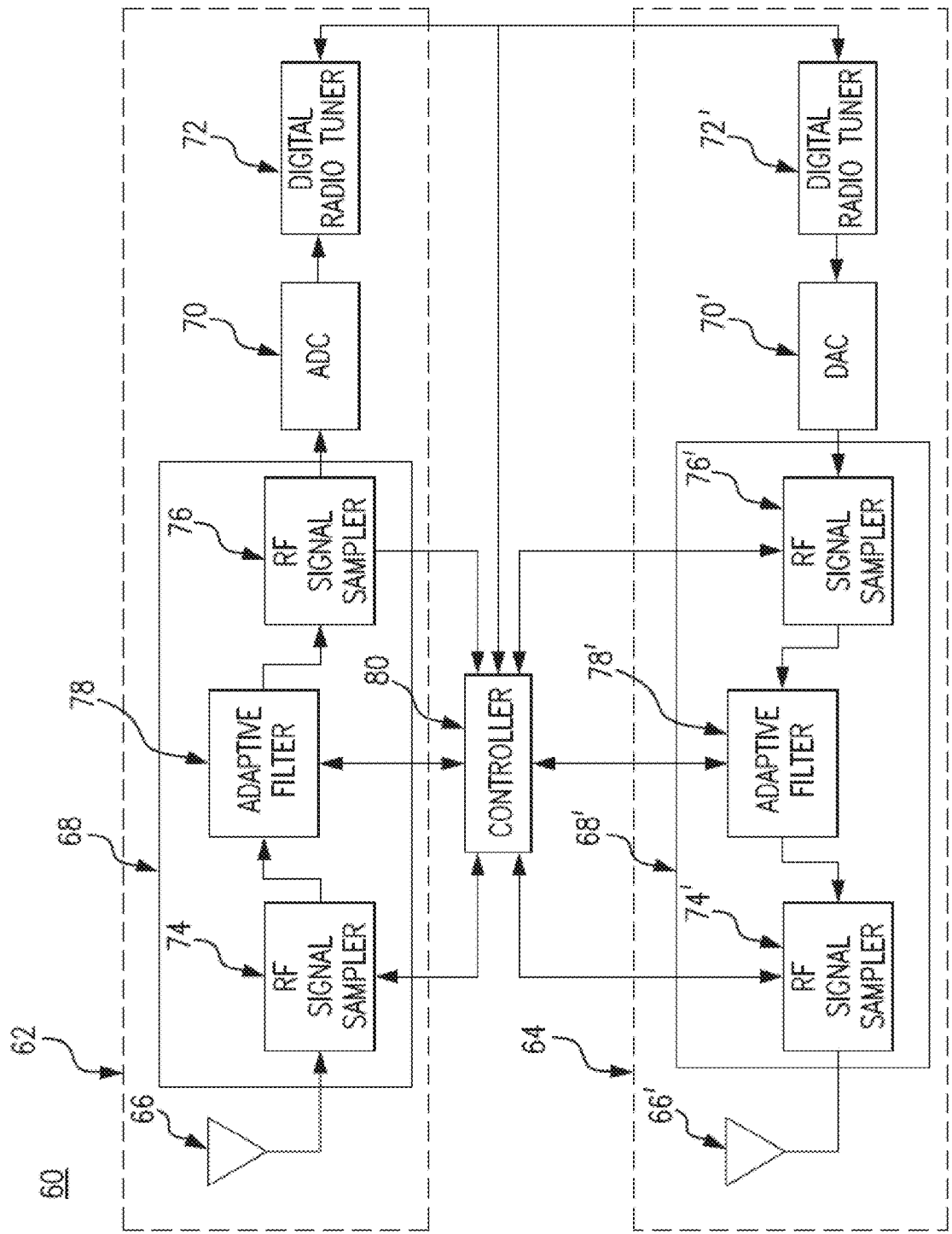
FIG. 6 depicts an illustrative embodiment of an interference detection and mitigation system.

FIG. 6 depicts another example embodiment of the adaptive front-end module 56. As noted earlier, the adaptive front-end module 56 can be utilized by any communication device including cellular phones, smartphones, tablets, small base stations, femto cells, Wi-Fi access points, and so on. In the illustration of FIG. 3, the adaptive front end module 56 can include a radio 60 comprising two stages, a receiver stage 62 and a transmitter stage 64, each coupled to an antenna assembly 66, 66', which may comprise one of more antennas for the radio 60. The radio 60 has a first receiver stage coupled to the antenna assembly 66 and includes an adaptive front-end controller 68 that receives the input RF signal from the antenna and performs adaptive signal processing on that RF signal before providing the modified RF signal to an analog-to-digital converter 70, which then passes the adapted RF signal to a digital RF tuner 72.

As shown in FIG. 6, the adaptive front-end controller 68 of the receiver stage 62 includes two RF signal samplers 74, 76 connected between an RF adaptive filter stage 78 that is controlled by controller 80. The adaptive filter stage 78 may have a plurality of tunable digital filters that can sample an incoming signal and selectively provide band pass or band stop signal shaping of an incoming RF signal, whether it is an entire communication signal or a sub-band signal or various combinations of both. A controller 80 is coupled to the samplers 74, 76 and filter stage 78 and serves as an RF link adapter that along with the sampler 74 monitors the input RF signal from the antenna 66 and determines various RF signal characteristics such as the interferences and noise within the RF signal. The controller 80 is configured to execute any number of a variety of signal processing algorithms to analyze the received RF signal and determine a filter state for the filter stage 78.

By providing tuning coefficient data to the filter stage 78, the adaptive front end controller 68 acts to pre-filter the received RF signal before the signal is sent to the RF tuner 72, which analyzes the filtered RF signal for integrity and/or for other applications such as cognitive radio applications. After filtering, the radio tuner 72 may then perform channel demodulation, data analysis, and local broadcasting functions. The RF tuner 72 may be considered the receiver side of an overall radio tuner, while RF tuner 72' may be considered the transmitter side of the same radio tuner. Prior to sending the filtered RF signal, the sampler 76 may provide an indication of the filtered RF signal to the controller 80 in a feedback manner for further adjusting of the adaptive filter stage 78.

In some examples, the adaptive front-end controller 68 is synchronized with the RF tuner 72 by sharing a master clock signal communicated between the two. For example, cognitive radios operating on a 100 μs response time can be synchronized such that for every clock cycle the adaptive front end analyzes the input RF signal, determines an optimal configuration for the adaptive filter stage 78, filters that RF signal into the filtered RF signal and communicates the same to the radio tuner 72 for cognitive analysis at the radio. By way of example, cellular phones may be implemented with a 200 μs response time on filtering. By implementing the adaptive front-end controller 68 using a field programmable gate array configuration for the filter stage, wireless devices may identify not only stationary interference, but also non-stationary interference, of arbitrary bandwidths on that moving interferer.

In some implementations, the adaptive front-end controller 68 may filter interference or noise from the received incoming RF signal and pass that filtered RF signal to the tuner 72. In other examples, such as cascaded configurations in which there are multiple adaptive filter stages, the adaptive front-end controller 68 may be configured to apply the filtered signal to an adaptive band pass filter stage to create a passband portion of the filtered RF signal. For example, the radio tuner 72 may communicate information to the controller 80 to instruct the controller that the radio is only looking at a portion of an overall RF spectrum and thus cause the adaptive front-end controller 68 not to filter certain portions of the RF spectrum and thereby band pass only those portions. The integration between the radio tuner 72 and the adaptive front-end controller 68 may be particularly useful in dual-band and tri-band applications in which the radio tuner 72 is able to communicate over different wireless standards, such as GSM, UMTS, or LTE standards.

The algorithms that may be executed by the controller 80 are not limited to interference detection and filtering of interference signals. In some configurations the controller 80 may execute a spectral blind source separation algorithm that looks to isolate two sources from their convolved mixtures. The controller 80 may execute a signal to interference noise ratio (SINR) output estimator for all or portions of the RF signal. The controller 80 may perform bidirectional transceiver data link operations for collaborative retuning of the adaptive filter stage 78 in response to instructions from the radio tuner 72 or from data the transmitter stage 64. The controller 80 can determine filter tuning coefficient data for configuring the various adaptive filters of stage 78 to properly filter the RF signal. The controller 80 may also include a data interface communicating the tuning coefficient data to the radio tuner 72 to enable the radio tuner 72 to determine filtering characteristics of the adaptive filter 78.

In one embodiment the filtered RF signal may be converted from a digital signal to an analog signal within the adaptive front-end controller 68. This allows the controller 80 to integrate in a similar manner to conventional RF filters. In other examples, a digital interface may be used to connect the adaptive front-end controller 68 with the radio tuner 72, in which case the ADC 70 would not be necessary.

The above discussion is in the context of the receiver stage 62. Similar elements are shown in the transmitter stage 64 but bearing a prime. The elements in the transmitter stage 64 may be similar to those of the receiver 62, with the exception of the digital to analog converter (DAC) 70' and other adaptations to the other components shown with a prime in the reference numbers. Furthermore, some or all of these components may in fact be executed by the same corresponding structure in the receiver stage 62. For example, the RF receiver tuner 72 and the transmitter tuner 72' may be performed by a single tuner device. The same may be true for the other elements, such as the adaptive filter stages 78 and 78', which may both be implemented in a single FPGA, with different filter elements in parallel for full duplex (simultaneous) receive and transmit operation.

Figure 7:
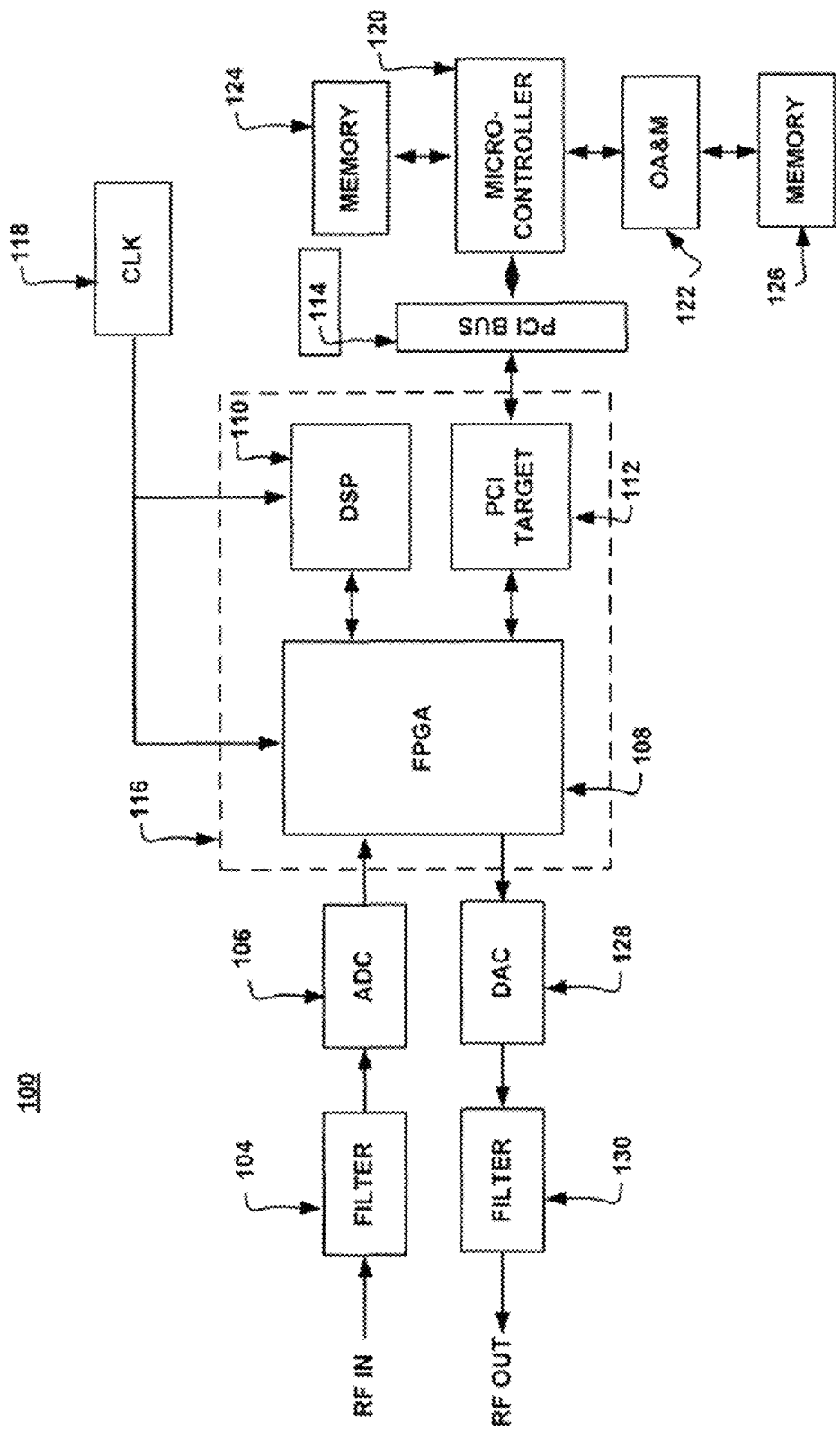
FIG. 7 depicts an illustrative embodiment of an interference detection and mitigation system.

FIG. 7 illustrates another example implementation of an adaptive front-end controller 100. Input RF signals are received at an antenna (not shown) and coupled to an initial analog filter 104, such as low noise amplifier (LNA) block, then digitally converted via an analog to digital converter (ADC) 106, prior to the digitized input RF signal being coupled to a field programmable gate array (FPGA) 108. The adaptive filter stage described above may be implemented within the FPGA 108, which has been programmed to contain a plurality of adaptive filter elements tunable to different operating frequencies and frequency bands, and at least some being adaptive from a band pass to a band stop configuration or vice versa, as desired. Although an FPGA is illustrated, it will be readily understood that other architectures such as an application specific integrated circuit (ASIC) or a digital signal processor (DSP) may also be used to implement a digital filter architecture described in greater detail below.

A DSP 110 is coupled to the FPGA 108 and executes signal processing algorithms that may include a spectral blind source separation algorithm, a signal to interference noise ratio (SINR) output estimator, bidirectional transceiver data line operation for collaborative retuning of the adaptive filter stage in response to instructions from the tuner, and/or an optimal filter tuning coefficients algorithm.

FPGA 108 is also coupled to a PCI target 112 that interfaces the FPGA 108 and a PCI bus 114 for communicating data externally. A system clock 118 provides a clock input to the FPGA 108 and DSP 110, thereby synchronizing the components. The system clock 118 may be locally set on the adaptive front-end controller, while in other examples the system claims 118 may reflect an external master clock, such as that of a radio tuner. The FPGA 108, DSP 110, and PCI target 112, designated collectively as signal processing module 116, will be described in greater detail below. In the illustrated example, the adaptive front-end controller 100 includes a microcontroller 120 coupled to the PCI bus 114 and an operations, alarms and metrics (OA&M) processor 122. Although they are shown and described herein as separate devices that execute separate software instructions, those having ordinary skill in the art will readily appreciate that the functionality of the microcontroller 120 and the OA&M processor 122 may be merged into a single processing device. The microcontroller 120 and the OA&M processor 122 are coupled to external memories 124 and 126, respectively. The microcontroller 120 may include the ability to communicate with peripheral devices, and, as such, the microcontroller 120 may be coupled to a USB port, an Ethernet port, or an RS232 port, among others (though none shown). In operation, the microcontroller 120 may locally store lists of channels having interferers or a list of known typically available frequency spectrum bands, as well as various other parameters. Such a list may be transferred to a reporting and control facility or a base station, via the OA&M processor 122, and may be used for system diagnostic purposes.

The aforementioned diagnostic purposes may include, but are not limited to, controlling the adaptive front-end controller 100 to obtain particular information relating to an interferer and re-tasking the interferer. For example, the reporting and control facility may use the adaptive front-end controller 100 to determine the identity of an interferer, such as a mobile unit, by intercepting the electronic serial number (ESN) of the mobile unit, which is sent when the mobile unit transmits information on the channel. Knowing the identity of the interferer, the reporting and control facility may contact infrastructure that is communicating with the mobile unit (e.g., the base station) and may request the infrastructure to change the transmit frequency for the mobile unit (i.e., the frequency of the channel on which the mobile unit is transmitting) or may request the infrastructure to drop communications with the interfering mobile unit altogether.

Additionally, in a cellular configuration (e.g., a system based on a configuration like that of FIG. 1) diagnostic purposes may include using the adaptive front-end controller 100 to determine a telephone number that the mobile unit is attempting to contact and, optionally handling the call. For example, the reporting and control facility may use the adaptive front-end controller 100 to determine that the user of the mobile unit was dialing 911, or any other emergency number, and may, therefore, decide that the adaptive front-end controller 100 should be used to handle the emergency call by routing the output of the adaptive front-end controller 100 to a telephone network.

The FPGA 108 can provide a digital output coupled to a digital to analog converter (DAC) 128 that converts the digital signal to an analog signal which may be provided to a filter 130 to generate a filtered RF output to be broadcast from the base station or mobile station. The digital output at the FPGA 108, as described, may be one of many possible outputs. For example, the FPGA 108 may be configured to output signals based on a predefined protocol such as a Gigabit Ethernet output, an open base station architecture initiative (OBSAI) protocol, or a common public radio interface (CPRI) protocol, among others.

It is further noted that the aforementioned diagnostic purposes may also include creating a database of known interferers, the time of occurrence of the interferers, the frequency of occurrence of the interferers, spectral information relating to the interferers, a severity analysis of the interferers, and so on. The identity of the interferers may be based solely on spectral profiles of each interferer that can be used for identification purposes. Although the aforementioned illustrations describe a mobile unit 12 as an interferer, other sources of interference are possible. Any electronic appliance that generates electromagnetic waves such as, for example, a computer, a set-top box, a child monitor, a wireless access point (e.g., Wi-Fi, ZigBee, Bluetooth, etc.) can be a source of interference. In one embodiment, a database of electronic appliances can be analyzed in a laboratory setting or other suitable testing environment to determine an interference profile for each appliance. The interference profiles can be stored in a database according to an appliance type, manufacturer, model number, and other parameters that may be useful in identifying an interferer. Spectral profiles provided by, for example, the OA&M processor 108 to a diagnostic system can be compared to a database of previously characterized interferers to determine the identity of the interference when a match is detected.

A diagnostic system, whether operating locally at the adaptive front end controller, or remotely at a base station, switching station, or server system, can determine the location of the interferer near the base station (or mobile unit) making the detection, or if a more precise location is required, the diagnostic system can instruct several base stations (or mobile units) to perform triangulation analysis to more precisely locate the source of the interference if the interference is frequent and measurable from several vantage points. With location data, interference identity, timing and frequency of occurrence, the diagnostic system can generate temporal and geographic reports showing interferers providing field personnel a means to assess the volume of interference, its impact on network performance, and it may provide sufficient information to mitigate interference by means other than filtering, such as, for example, interference avoidance by way of antenna steering at the base station, beam steering, re-tasking an interferer when possible, and so on.

Figure 8:
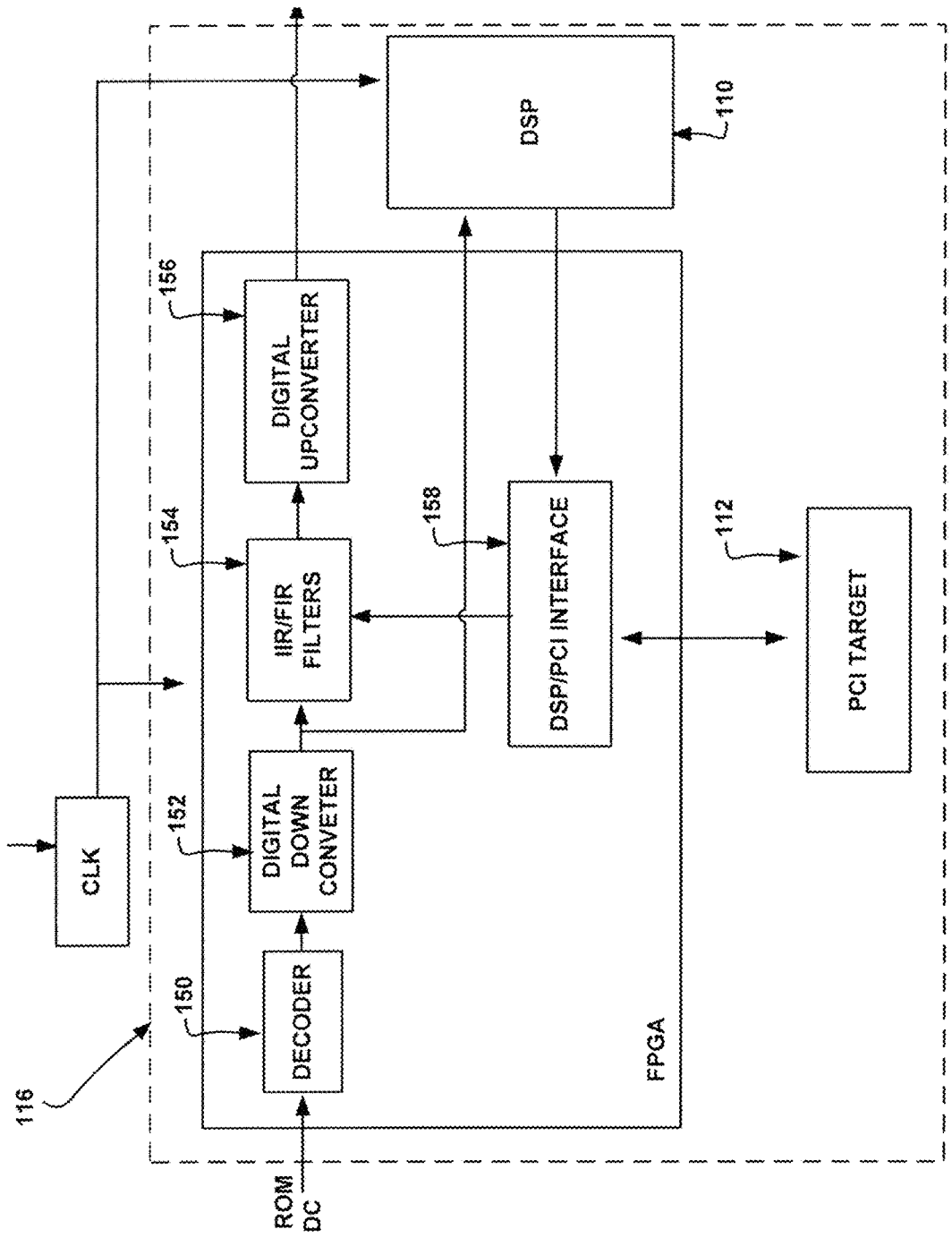
FIG. 8 depicts an illustrative embodiment of signal processing module of FIG. 7.

FIG. 8 illustrates further details of an example implementation of a signal processing module 116 that may serve as another embodiment of an adaptive front-end controller, it being understood that other architectures may be used to implement a signal detection algorithm. A decoder 150 receives an input from the ADC 106 and decodes the incoming data into a format suitable to be processed by the signal processing module 116. A digital down converter 152, such as a polyphase decimator, down converts the decoded signal from the decoder 150. The decoded signal is separated during the digital down conversion stage into a complex representation of the input signal, that is, into In-Phase (I) and Quadrature-Phase (Q) components which are then fed into a tunable infinite impulse response (IIR)/finite impulse response (FIR) filter 154. The IIR/FIR filter 154 may be implemented as multiple cascaded or parallel IIR and FIR filters. For example, the IIR/FIR filter 154 may be used with multiple filters in series, such as initial adaptive band pass filter followed by adaptive band stop filter. For example, the band pass filters may be implemented as FIR filters, while the band stop filters may be implemented as IIR filters. In an embodiment, fifteen cascaded tunable IIR/FIR filters are used to optimize the bit width of each filter. Of course, other digital down converters and filters such as cascaded integrator-comb (CIC) filters may be used, to name a few. By using complex filtering techniques, such as the technique described herein, the sampling rate is lowered thereby increasing (e.g., doubling) the bandwidth that the filter 154 can handle. In addition, using complex arithmetic also provides the signal processing module 116 the ability to perform higher orders of filtering with greater accuracy.

The I and Q components from the digital down converter 152 are provided to the DSP 110 which implements a detection algorithm and in response provides the tunable IIR/FIR filter 154 with tuning coefficient data that tunes the IIR and/or FIR filters 154 to specific notch (or band stop) and/or band pass frequencies, respectively, and specific bandwidths. The tuning coefficient data, for example, may include a frequency and a bandwidth coefficient pair for each of the adaptive filters, which enables the filter to tune to a frequency for band pass or band stop operation and the bandwidth to be applied for that operation. The tuning coefficient data corresponding to a band pass center frequency and bandwidth may be generated by the detection algorithm and passed to a tunable FIR filter within the IIR/FIR filter 154. The filter 154 may then pass all signals located within a passband of the given transmission frequency. Tuning coefficient data corresponding to a notch (or band stop) filter may be generated by the detection algorithm and then applied to an IIR filter within the IIR/FIR filter 154 to remove any interference located within the passband of the band pass filter. The tuning coefficient data generated by the detection algorithm are implemented by the tunable IIR/FIR filters 154 using mathematical techniques known in the art. In the case of a cognitive radio, upon implementation of the detection algorithm, the DSP 110 may determine and return coefficients corresponding to a specific frequency and bandwidth to be implemented by the tunable IIR/FIR filter 154 through a DSP/PCI interface 158. Similarly, the transfer function of a notch (or band stop) filter may also be implemented by the tunable IIR/FIR filter 154. Of course, other mathematical equations may be used to tune the IIR/FIR filters 154 to specific notch, band stop, or band pass frequencies and to a specific bandwidth.

After the I and Q components are filtered to the appropriate notch (or band stop) or band pass frequency at a given bandwidth, a digital up converter 156, such as a polyphase interpolator, converts the signal back to the original data rate, and the output of the digital up converter is provided to the DAC 128.

A wireless communication device capable to be operated as a dual- or tri-band device communicating over multiple standards, such as over UMTS and LTE may use the adaptive digital filter architecture embodiments as described above. For example, a dual-band device (using both LTE and UMTS) may be preprogrammed within the DSP 110 to transmit first on LTE, if available, and on UMTS only when outside of an LTE network. In such a case, the IIR/FIR filter 154 may receive tuning coefficient data from the DSP 110 to pass all signals within an LTE range. That is, the tuning coefficient data may correspond to a band pass center frequency and bandwidth adapted to pass only signals within the LTE range. The signals corresponding to a UMTS signal may be filtered, and any interference caused by the UMTS signal may be filtered using tuning coefficients, received from the DSP 110, corresponding to a notch (or band stop) frequency and bandwidth associated with the UMTS interference signal.

Alternatively, in some cases it may be desirable to keep the UMTS signal in case the LTE signal fades quickly and the wireless communication device may need to switch communication standards rapidly. In such a case, the UMTS signal may be separated from the LTE signal, and both passed by the adaptive front-end controller. Using the adaptive digital filter, two outputs may be realized, one output corresponding to the LTE signal and one output corresponding to a UMTS signal. The DSP 110 may be programmed to again recognize the multiple standard service and may generate tuning coefficients corresponding to realize a filter, such as a notch (or band stop) filter, to separate the LTE signal from the UMTS signal. In such examples, an FPGA may be programmed to have parallel adaptive filter stages, one for each communication band.

To implement the adaptive filter stages, in some examples, the signal processing module 116 is pre-programmed with general filter architecture code at the time of production, for example, with parameters defining various filter types and operation. The adaptive filter stages may then be programmed, through a user interface or other means, by the service providers, device manufactures, etc., to form the actual filter architecture (parallel filter stages, cascaded filter stages, etc.) for the particular device and for the particular network(s) under which the device is to be used. Dynamic flexibility can be achieved during runtime, where the filters may be programmed to different frequencies and bandwidths, each cycle, as discussed herein.

One method of detecting a signal having interference is by exploiting the noise like characteristics of a signal. Due to such noise like characteristics of the signal, a particular measurement of a channel power gives no predictive power as to what the next measurement of the same measurement channel may be. In other words, consecutive observations of power in a given channel are un-correlated. As a result, if a given measurement of power in a channel provides predictive power over subsequent measurements of power in that particular channel, thus indicating a departure from statistics expected of a channel without interference, such a channel may be determined to contain interference.

Figure 9:
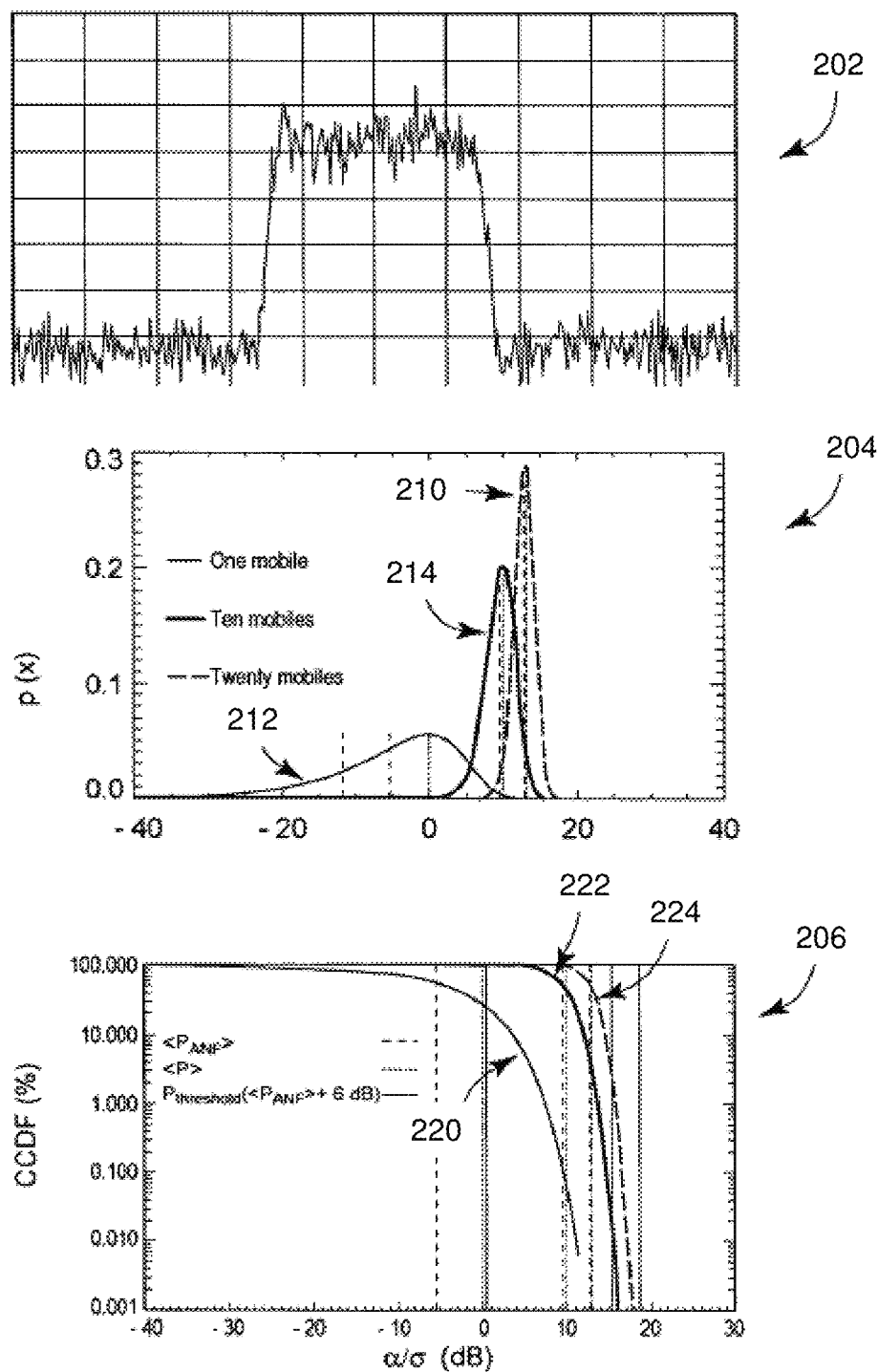
FIG. 9 depicts an illustrative embodiment of plots of a spread spectrum signal.

FIG. 9 illustrates an IS-95 CDMA signal 202, which is a generic Direct Sequence Spread Spectrum (DSSS) signal. The CDMA signal 202 may have a bandwidth of 1.2288 MHz and it may be used to carry up to 41 channels, each of which has a bandwidth of 30 kHz. One way to identify interference affecting the CDMA signal 202 may be to identify any of such 41 channels having excess power above an expected power of the CDMA signal 202. FIG. 9 also illustrates the probability distribution functions (PDFs) 204 of a typical DSSS signal and a complementary cumulative distribution functions (CCDFs) 206 of a typical DSSS signal, which may be used to establish a criteria used to determine channels disposed within a signal and having excess power.

Specifically, the PDFs 204 include probability distribution of power in a given channel, which is the likelihood p(x) of measuring a power x in a given channel, for a DSSS signal carrying one mobile unit (212), for a DSSS signal carrying ten mobile units (214), and for a DSSS signal carrying twenty mobile units (210). For example, for the PDF 212, representing a DSSS signal carrying one mobile unit, the distribution p(x) is observed to be asymmetric, with an abbreviated high-power tail. In this case, any channel having power higher than the high-power tail of the PDF 212 may be considered to have an interference signal.

The CCDFs 206 denote the likelihood that a power measurement in a channel will exceed a given mean power u, by some value a/G, wherein a is standard deviation of the power distribution. Specifically, the CCDFs 206 include an instance of CCDF for a DSSS signal carrying one mobile unit (220), an instance of CCDF for a DSSS signal carrying ten mobile units (222), and an instance of CCDF for a DSSS signal carrying twenty mobile units (224). Thus, for example, for a DSSS signal carrying one mobile unit, the likelihood of any channel having the ratio α/σ of 10 dB or more is 0.01%. Therefore, an optimal filter can be tuned to such a channel having excess power.

One method of detecting such a channel having interference is by exploiting the noise like characteristic of a DSSS signal. Due to such noise like characteristic of DSSS signal, a particular measurement of a channel power gives no predictive power as to what the next measurement of the same measurement channel may be. In other words, consecutive observations of power in a given channels are un-correlated. As a result, if a given measurement of power in a channel provides predictive power over subsequent measurements of power in that particular channel, thus indicating a departure from statistics expected of a channel without interference, such a channel may be determined to contain interference.

Figure 10:
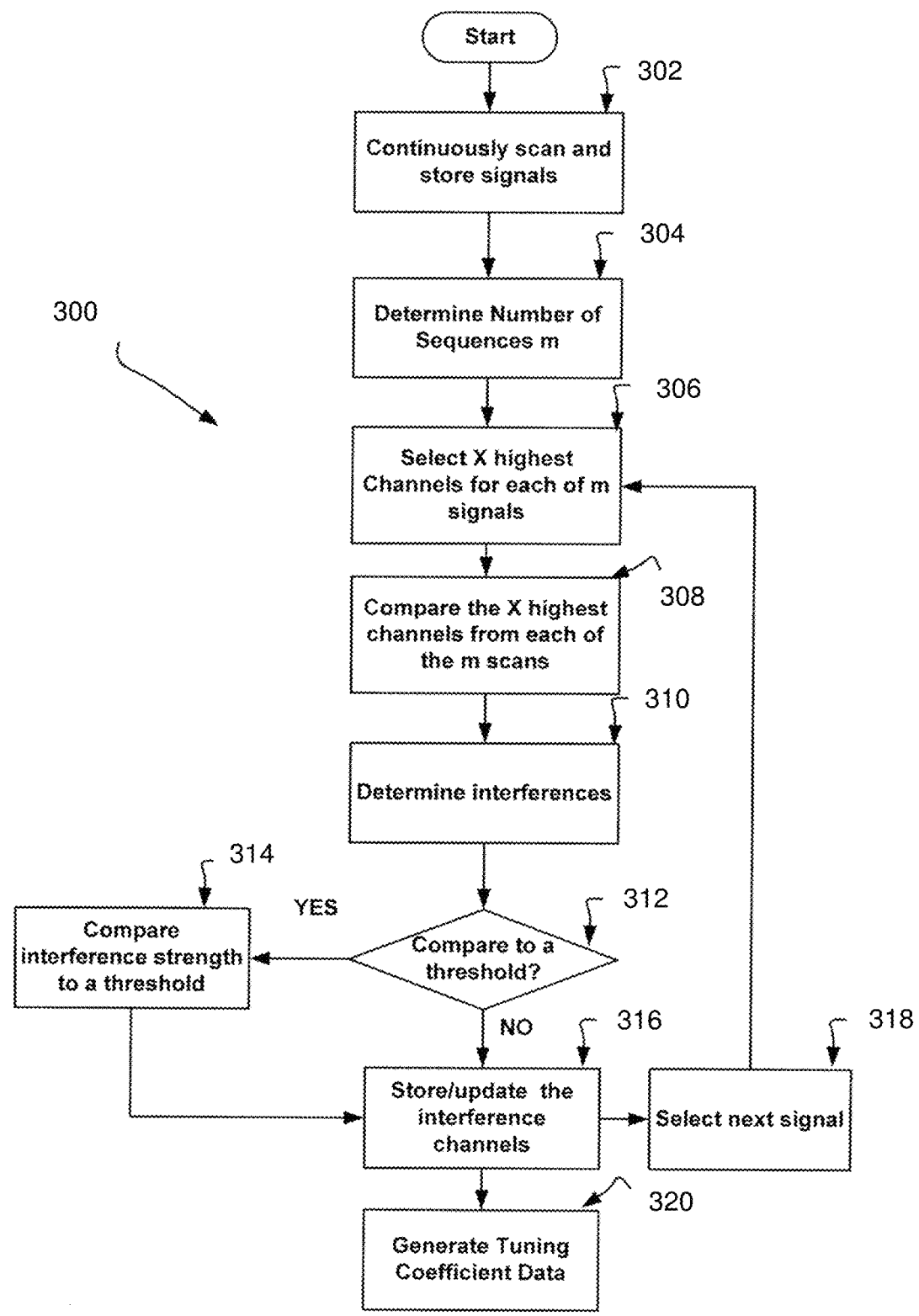
FIG. 10 depicts an illustrative embodiment of a method for interference detection.

FIG. 10 illustrates a flowchart of an interference detection program 300 that may be used to determine location of interference in a DSSS signal. At block 302 a series of DSSS signals can be scanned by the adaptive front-end controller described above and the observed values of the signal strengths can be stored for each of various channels located in the DSSS signal. For example, at block 302 the adaptive front-end controller may continuously scan the 1.2288 MHz DSSS signal 60 for each of the 41 channels dispersed within it. The adaptive front-end controller may be implemented by any well-known analog scanner or digital signal processor (DSP) used to scan and store signal strengths in a DSSS signal. The scanned values of signal strengths may be stored in a memory of such DSP or in any other computer readable memory. The adaptive front-end controller may store the signal strength of a particular channel along with any information, such as a numeric identifier, identifying the location of that particular channel within the DSSS signal.

At block 304 the adaptive front-end controller can determine the number of sequences m of a DSSS signal that may be required to be analyzed to determine channels having interference. A user may provide such a number m based on any pre-determined criteria. For example, a user may provide m to be equal to four, meaning that four consecutive DSSS signals need to be analyzed to determine if any of the channels within that DSSS signal spectrum includes an interference signal. As one of ordinary skill in the art would appreciate, the higher is the selected value of m, the more accurate will be the interference detection. However, the higher the number m is, the higher is the delay in determining whether a particular DSSS signal had an interference present in it, subsequently, resulting in a longer delay before a filter is applied to the DSSS signal to remove the interference signal.

Generally, detection of an interference signal may be performed on a rolling basis. That is, at any point in time, m previous DSSS signals may be used to analyze presence of an interference signal. The earliest of such m interference signals may be removed from the set of DSSS signals used to determine the presence of an interference signal on a first-in-first-out basis. However, in an alternate embodiment, an alternate sampling method for the set of DSSS signals may also be used.

At block 306 the adaptive front-end controller can select x channels having the highest signal strength from each of the m most recent DSSS signals scanned at the block 302. The number x may be determined by a user. For example, if x is selected to be equal to three, the block 306 may select three highest channels from each of the m most recent DSSS signals. The methodology for selecting x channels having highest signal strength from a DSSS signal is described in further detail in FIG. 11 below. For example, the adaptive front end controller at block 306 may determine that the first of the m DSSS signals has channels 10, 15 and 27 having the highest signal strengths, the second of the m DSSS channels has channels 15 and 27 and 35 having the highest signal strengths, and the third of the m DSSS channels has the channels 15, 27 and 35 having the highest signal strength.

After having determined the x channels having the highest signal strengths in each of the m DSSS signals, at block 308 the adaptive front end controller can compare these x channels to determine if any of these highest strength channels appear more than once in the m DSSS signals. In case of the example above, the adaptive front end controller at block 308 may determine that the channels 15 and 27 are present among the highest strength channels for each of the last three DSSS signals, while channel 35 is present among the highest strength channels for at least two of the last three DSSS signals.

Such consistent appearance of channels having highest signal strength over subsequent DSSS signals indicate that channels 15 and 27, and probably the channel 35, may have an interference signal super-imposed on them. At block 310 the adaptive front-end controller may use such information to determine which channels may have interference. For example, based on the number of times a given channel appears in the selected highest signal strength channels, the adaptive front end controller at block 310 may determine the confidence level that may be assigned to a conclusion that a given channel contains an interference signal.

Alternatively, at block 310 the adaptive front end controller may determine a correlation factor for each of the various channels appearing in the x selected highest signal strength channels and compare the calculated correlation factors with a threshold correlation factor to determine whether any of the x selected channels has correlated signal strengths. Calculating a correlation factor based on a series of observations is well known to those of ordinary skill in the art and therefore is not illustrated in further detail herein. The threshold correlation factor may be given by the user of the interference detection program 300.

Note that while in the above illustrated embodiment, the correlation factors of only the selected highest signal strength channels are calculated, in an alternate embodiment, correlation factors of all the channels within the DSSS signals may be calculated and compared to the threshold correlation factor.

Empirically, it may be shown that when m is selected to be equal to three, for a clean DSSS signal, the likelihood of having at least one match among the higher signal strength channels is 0.198, the likelihood of having at least two matches among the higher signal strength channels is 0.0106, and the likelihood of having at least three matches among the higher signal strength channels is $9.38 \times 10^{-5}$. Thus, the higher the number of matches, the lesser is the likelihood of having a determination that one of the x channels contains an interference signal (i.e., a false positive interference detection). It may be shown that if the number of scans m is increased to, say four DSSS scans, the likelihood of having such matches in m consecutive scans is even smaller, thus providing higher confidence that if such matches are found to be present, they indicate presence of interference signal in those channels.

To identify the presence of interference signals with even higher level of confidence, at block 312 the adaptive front-end controller may decide whether to compare the signal strengths of the channels determined to have an interference signal with a threshold. If at block 312 the adaptive front-end controller decides to perform such a comparison, at block 314 the adaptive front-end controller may compare the signal strength of each of the channels determined to have an interference with a threshold level. Such comparing of the channel signal strengths with a threshold may provide added confidence regarding the channel having an interference signal so that when a filter is configured according to the channel, the probability of removing a non-interfering signal is reduced. However, a user may determine that such added confidence level is not necessary and thus no such comparison to a threshold needs to be performed. In which case, at block 316 the adaptive front-end controller stores the interference signals in a memory.

After storing the information about the channels having interference signals, at block 318 the adaptive front-end controller selects the next DSSS signal from the signals scanned and stored at block 302. At block 318 the adaptive front end controller may cause the first of the m DSSS signals to be dropped and the newly added DSSS signal is added to the set of m DSSS signals that will be used to determine presence of an interference signal (first-in-first-out). Subsequently, at block 306 the process of determining channels having interference signals is repeated by the adaptive front-end controller. Finally, at block 320 the adaptive front-end controller may select and activate one or more filters that are located in the path of the DSSS signal to filter out any channel identified as having interference in it.

While for purposes of simplicity of explanation, the respective processes are shown and described as a series of blocks in FIG. 10, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 11:
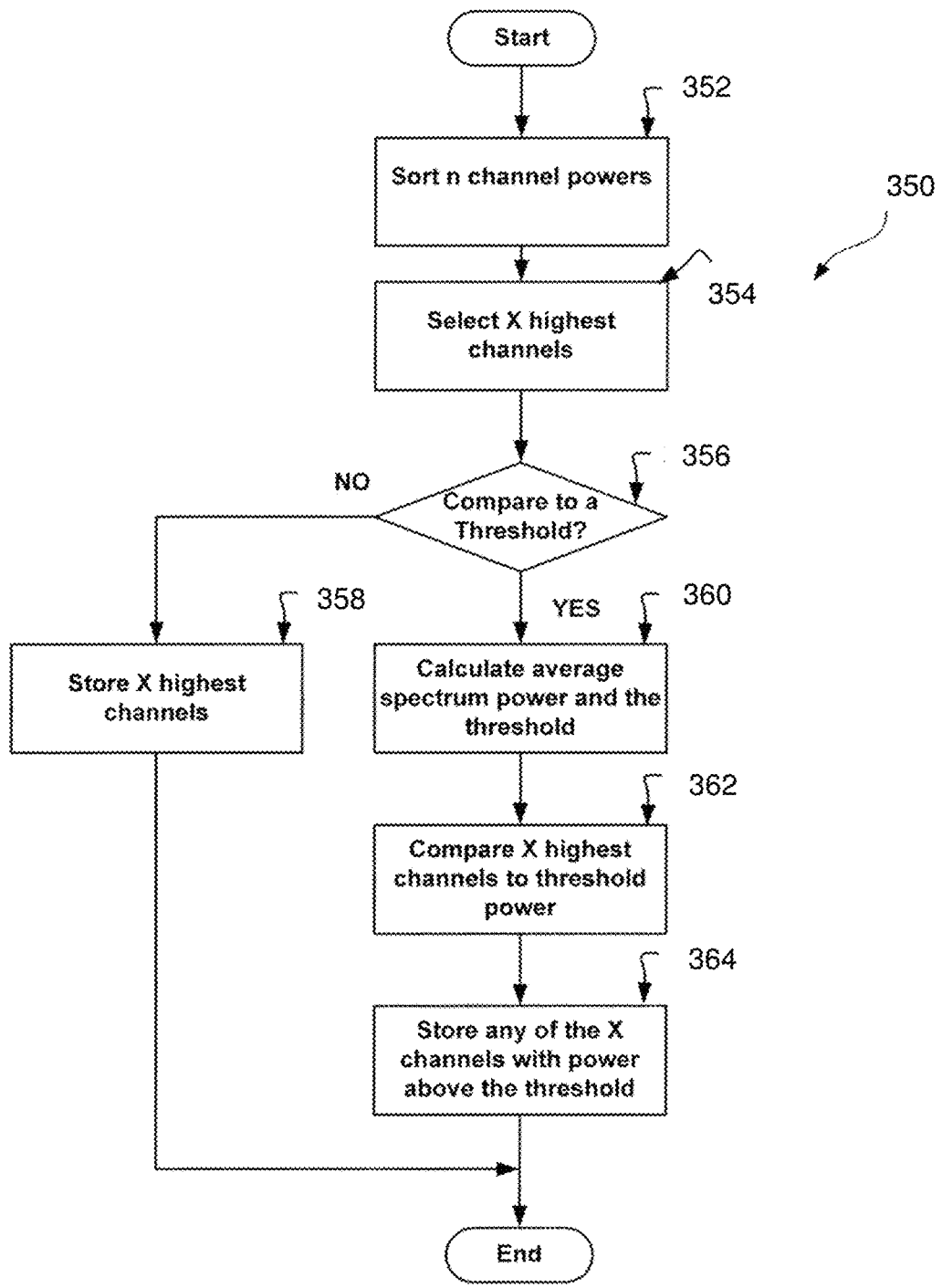
FIG. 11 depicts illustrative embodiments of the method of FIG. 10.

Now referring to FIG. 11, a flowchart illustrates a high strength channels detection program 350 that may be used to identify various channels within a given scan of the DSSS signal that may contain an interference signal. The high strength channels detection program 350 may be used to implement the functions performed at block 306 of the interference detection program 300. In a manner similar to the interference detection program 300, the high strength channels detection program 350 may also be implemented using software, hardware, firmware or any combination thereof.

At block 352 the adaptive front-end controller may sort signal strengths of each of the n channels within a given DSSS signal. For example, if a DSSS signal has 41 channels, at block 352 the adaptive front-end controller may sort each of the 41 channels according to its signal strengths. Subsequently, at block 354 the adaptive front-end controller may select the x highest strength channels from the sorted channels and store information identifying the selected x highest strength channels for further processing. An embodiment of the high strength channels detection program 350 may simply use the selected x highest strength channels from each scan of the DSSS signals to determine any presence of interference in the DSSS signals. However, in an alternate embodiment, additional selected criteria may be used.

Subsequently, at block 356 the adaptive front end controller can determine if it is necessary to compare the signal strengths of the x highest strength channels to any other signal strength value, such as a threshold signal strength, etc., where such a threshold may be determined using the average signal strength across the DSSS signal. For example, at block 356 the adaptive front end controller may use a criterion such as, for example: "when x is selected to be four, if at least three out of four of the selected channels have also appeared in previous DSSS signals, no further comparison in necessary." Another criterion may be, for example: "if any of the selected channels is located at the fringe of the DSSS signal, the signal strengths of such channels should be compared to a threshold signal strength." Other alternate criteria may also be provided.

If at block 356 the adaptive front-end controller determines that no further comparison of the signal strengths of the selected x channels is necessary, at block 358 the adaptive front-end controller stores information about the selected x channels in a memory for further processing. If at block 356 the adaptive front-end controller determines that it is necessary to apply further selection criteria to the selected x channels, the adaptive front-end controller returns to block 360. At block 360 the adaptive front-end controller may determine a threshold value against which the signal strengths of each of the x channels are compared based on a predetermined methodology.

For example, in an embodiment, at block 360 the adaptive front-end controller may determine the threshold based on the average signal strength of the DSSS signal. The threshold signal strength may be the average signal strength of the DSSS signal or a predetermined value may be added to such average DSSS signal to derive the threshold signal strength.

Subsequently, at block 362 the adaptive front-end controller may compare the signal strengths of the selected x channels to the threshold value determined at block 360. Only the channels having signal strengths higher than the selected threshold are used in determining presence of interference in the DSSS signal. Finally, at block 364 the adaptive front-end controller may store information about the selected x channels having signal strengths higher than the selected threshold in a memory. As discussed above, the interference detection program 300 may use such information about the selected channels to determine the presence of interference signal in the DSSS signal.

The interference detection program 300 and the high strength channel detection program 350 may be implemented by using software, hardware, firmware or any combination thereof. For example, such programs may be stored on a memory of a computer that is used to control activation and deactivation of one or more notch filters. Alternatively, such programs may be implemented using a digital signal processor (DSP) which determines the presence and location of interference channels in a dynamic fashion and activates/de-activates one or more filters.

While for purposes of simplicity of explanation, the respective processes are shown and described as a series of blocks in FIG. 11, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12:
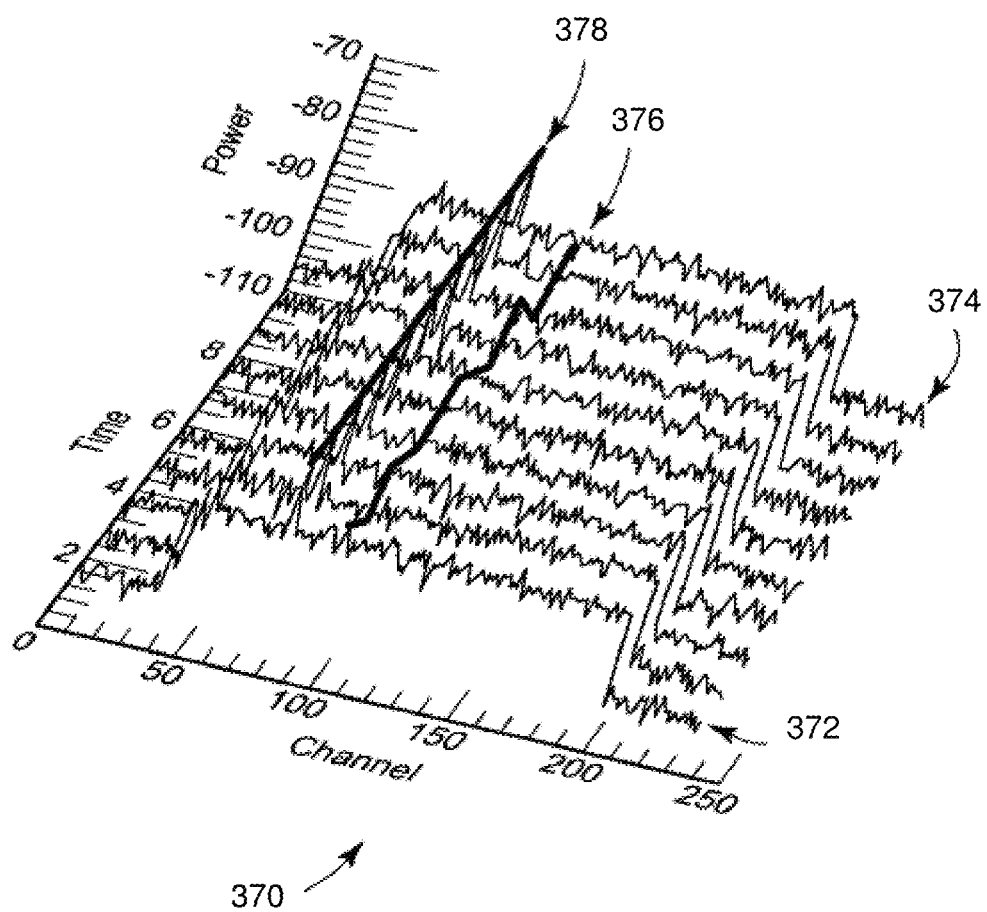
FIG. 12 depicts illustrative embodiments of a series of spread spectrum signals intermixed with an interference signal.

FIG. 12 illustrates a three-dimensional graph 370 depicting several DSSS signals 372-374 over a time period. A first axis of the graph 370 illustrates the number of channels of the DSSS signals 372-374, a second axis illustrates time over which a number of DSSS signals 372-374 are scanned, and a third axis illustrates the power of each of the channels. The DSSS signals 372-374 are shown to be affected by an interference signal 378.

The interference detection program 370 may start scanning various DSSS signals 372-374 starting from the first DSSS signal 372. As discussed above at block 304 the adaptive front-end controller determines the number m of the DSSS signals 372-374 that are to be scanned. Because the interference signal 378 causes the signal strength of a particular channel to be consistently higher than the other channels for a number of consecutive scans of the DSSS signals 372-374 at block 210 the adaptive front end controller identifies a particular channel having an interference signal present. Subsequently, at block 320 the adaptive front-end controller will select and activate a filter that applies the filter function as described above, to the channel having interference.

The graph 370 also illustrates the average signal strengths of each of the DSSS signals 372-374 by a line 376. As discussed above, at block 362 the adaptive front-end controller may compare the signal strengths of each of the x selected channels from the DSSS signals 372-374 with the average signal strength, as denoted by line 376, in that particular DSSS signal.

Figure 13:
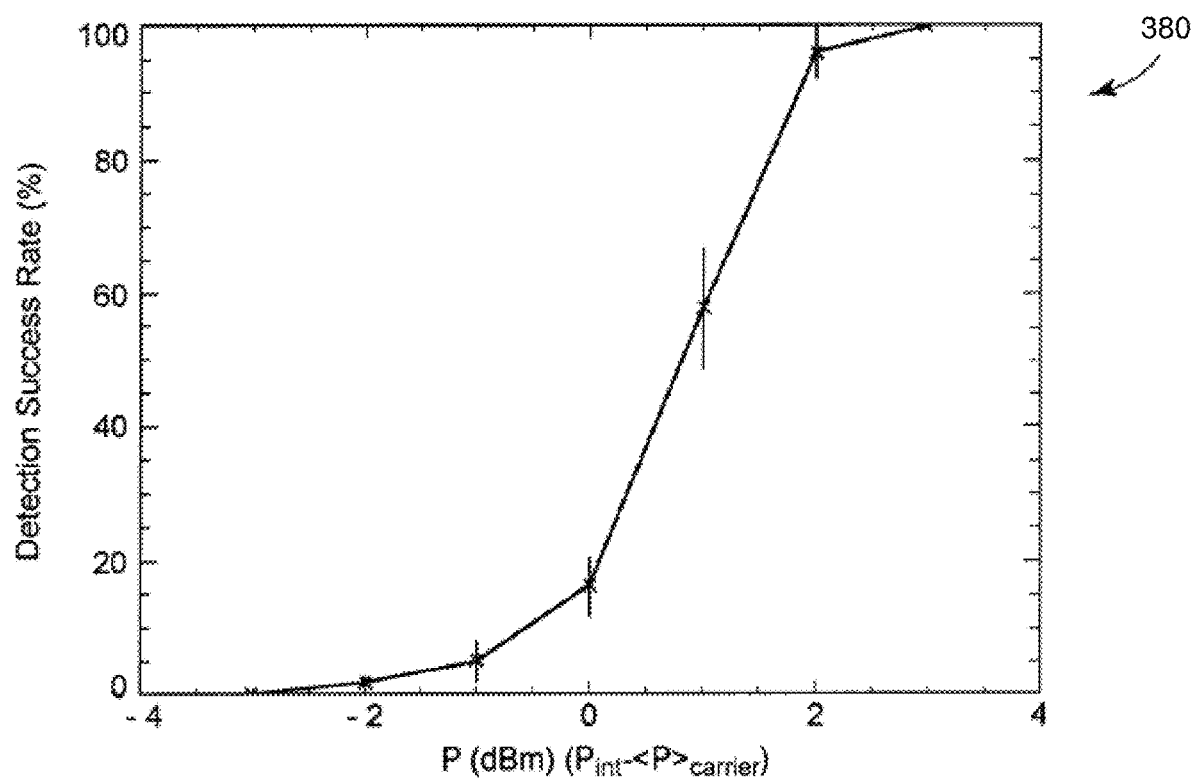
FIG. 13 depicts an illustrative embodiment of a graph depicting interference detection efficiency of a system of the subject disclosure.

Now referring to FIG. 13, a graph 380 illustrates interference detection success rate of using the interference detection program 370, as a function of strength of an interference signal affecting a DSSS signal. The x-axis of the graph 380 depicts the strength of interference signal relative to the strength of the DSSS signal, while the y-axis depicts the detection success rate in percentages. As illustrated, when an interference signal has a strength of at least 2 dB higher than the strength of the DSSS signal, such an interference signal is detected with at least ninety five percent success rate.

The foregoing interference detection and mitigation embodiments can further be adapted for detecting and mitigating interference in long-term evolution (LTE) communication systems.

Figure 14:
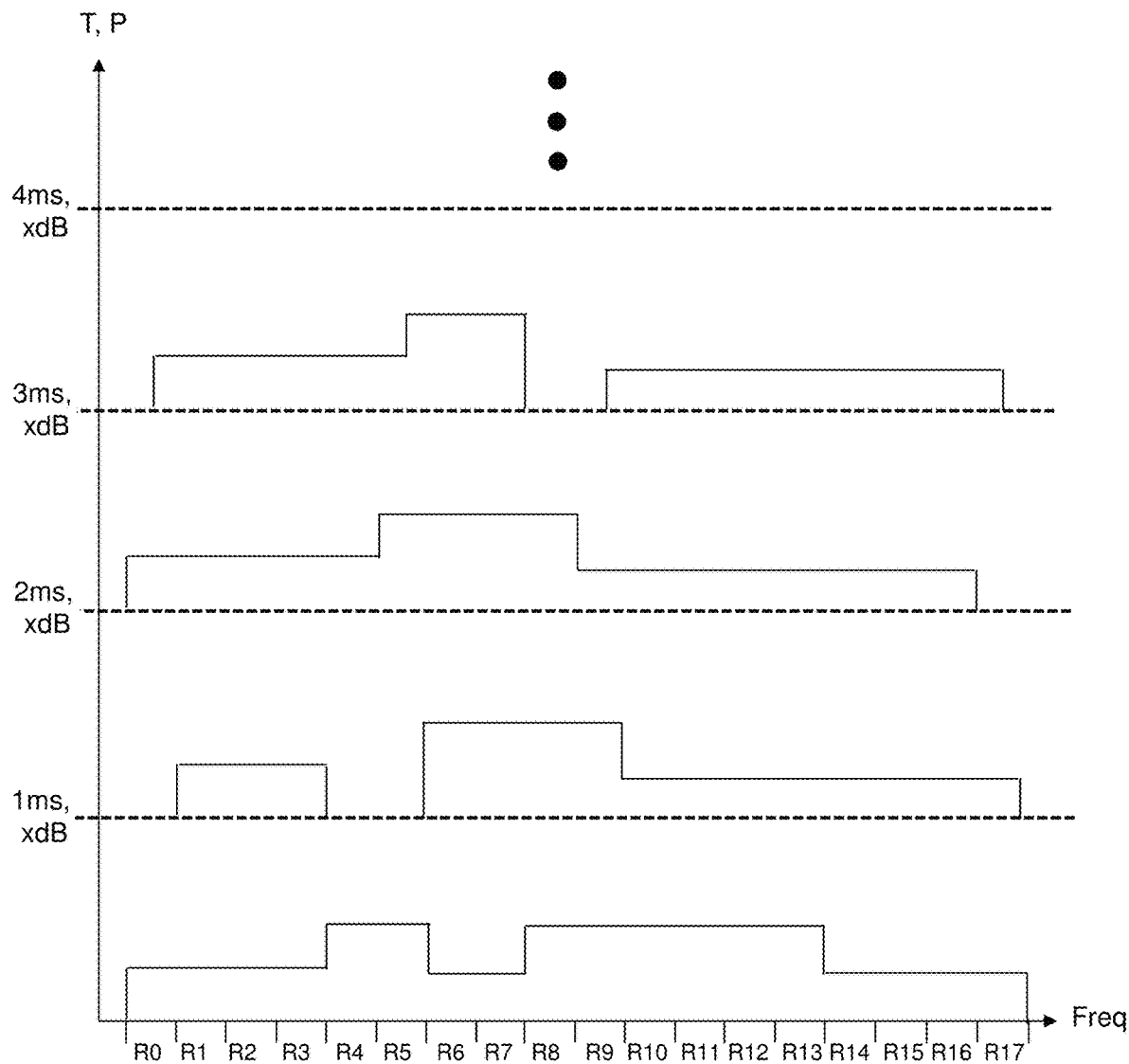
FIG. 14 depicts illustrative embodiments of Long-Term Evolution (LTE) time and frequency signal plots.

LTE transmission consists of a combination of Resource Blocks (RB's) which have variable characteristics in frequency and time. A single RB can be assigned to a user equipment, specifically, a 180 KHz continuous spectrum utilized for 0.5-1 msec. An LTE band can be partitioned into a number of RBs which could be allocated to individual communication devices for specified periods of time for LTE transmission. Consequently, an LTE spectrum has an RF environment dynamically variable in frequency utilization over time. FIG. 14 depicts an illustrative LTE transmission.

LTE utilizes different media access methods for downlink (orthogonal frequency-division multiple access; generally, referred to as OFDMA) and uplink (single carrier frequency-division multiple access; generally, referred to as SC-FDMA). For downlink communications, each RB contains 12 sub-carriers with 15 KHz spacing. Each sub-carrier can be used to transmit individual bit information according to the OFDMA protocol. For uplink communications, LTE utilizes a similar RB structure with 12 sub-carriers, but in contrast to downlink, uplink data is pre-coded for spreading across 12 sub-carriers and is transmitted concurrently on all 12 sub-carriers.

The effect of data spreading across multiple sub-carriers yields a transmission with spectral characteristics similar to a CDMA/UMTS signal. Hence, similar principles of interference detection can be applied within an instance of SC-FDMA transmission from an individual communication device—described herein as user equipment (UE). However, since each transmission consists of unknown RB allocations with unknown durations, such a detection principle can only be applied separately for each individual RB within a frequency and specific time domain. If a particular RB is not used for LTE transmission at the time of detection, the RF spectrum will present a thermal noise which adheres to the characteristics of a spread spectrum signal, similar to a CDMA/UMTS signal.

Figure 15:
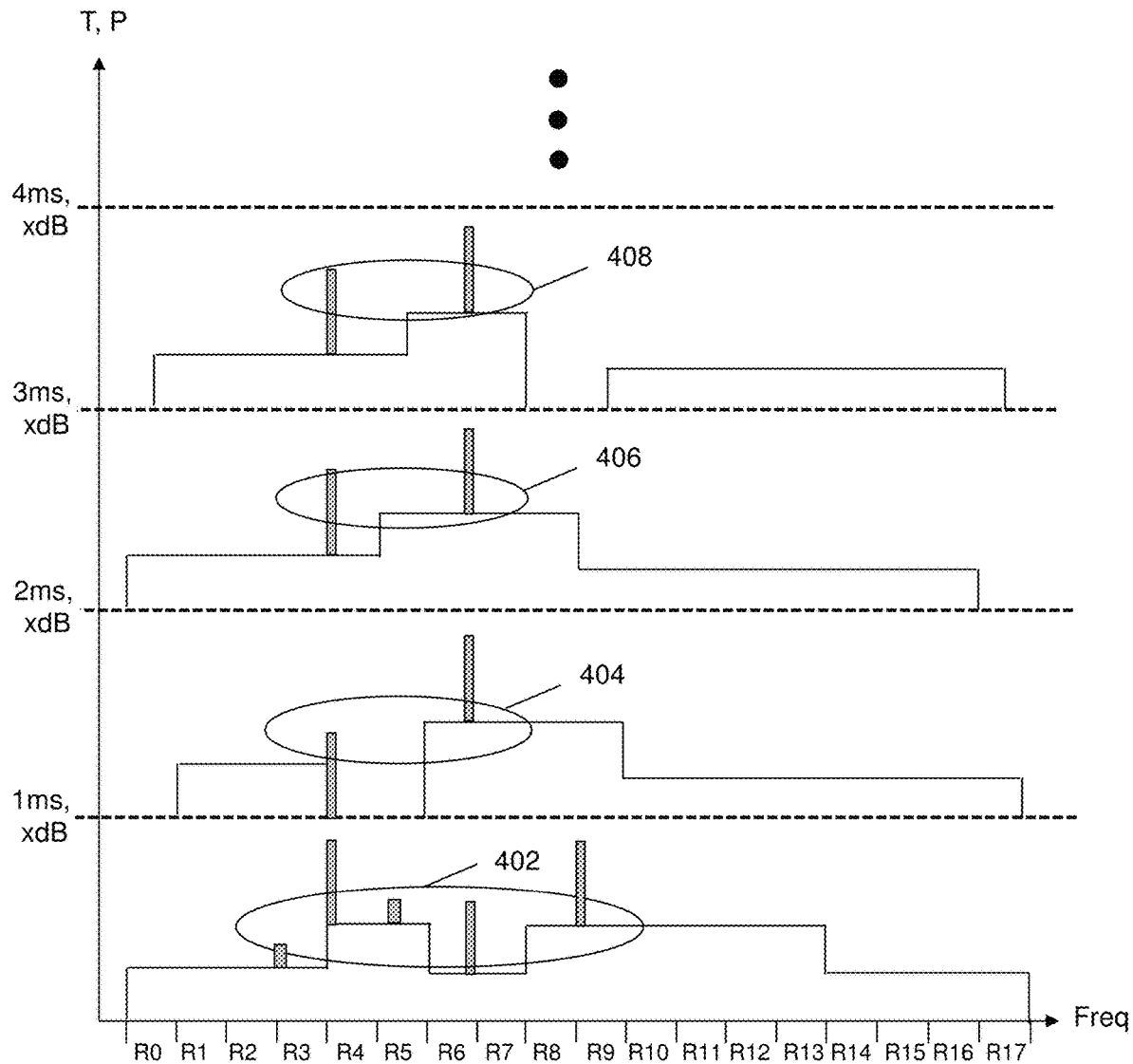
FIG. 15 depicts illustrative embodiments of LTE time and frequency signal plots intermixed with interference signals.

Co-channel, as well as other forms of interference, can cause performance degradation to SC-FDMA and OFDMA signals when present. FIG. 15 depicts an illustration of an LTE transmission affected by interferers 402, 404, 406 and 408 occurring at different points in time. Since such LTE transmissions do not typically have flat power spectral densities (see FIG. 14), identification of interference as shown in FIG. 15 can be a difficult technical problem. The subject disclosure presents a method to improve the detection of interference in SC-FDMA/OFDM channels through a time-averaging algorithm that isolates interference components in the channel and ignores the underlying signal.

Time averaging system (TAS) can be achieved with a boxcar (rolling) average, in which the TAS is obtained as a linear average of a Q of previous spectrum samples, with Q being a user-settable parameter. The Q value determines the "strength" of the averaging, with higher Q value resulting in a TAS that is more strongly smoothed in time and less dependent on short duration transient signals. Due to the frequency-hopped characteristic of SC-FDMA/OFDMA signals, which are composed of short duration transients, the TAS of such signals is approximately flat. It will be appreciated that TAS can also be accomplished by other methods such as a forgetting factor filter.

Figure 16:
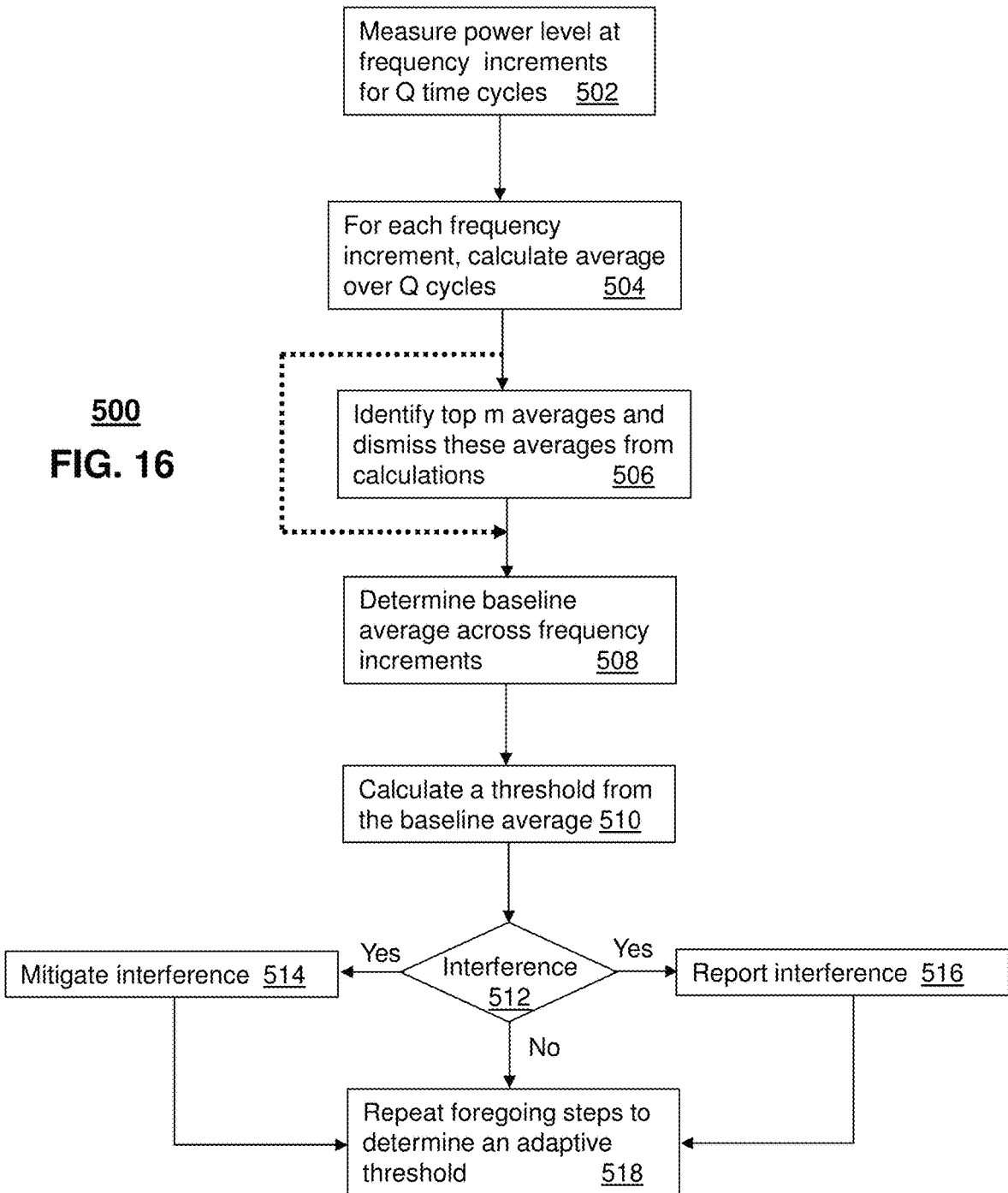
FIG. 16 depicts an illustrative embodiment of a method for detecting and mitigating interference signals shown in FIG. 15.

In one embodiment, an adaptive threshold can be determined by a method 500 as depicted in FIG. 16. Q defines how many cycles of $t_i$ to use (e.g., 100 cycles can be represented by $t_1$ thru $t_{100}$). The adaptive front-end module 56 of FIG. 6 can be configured to measure power in 30 KHz increments starting from a particular RB and over multiple time cycles. For illustration purposes, the adaptive front-end module 56 is assumed to measure power across a 5 MHz spectrum. It will be appreciated that the adaptive front-end module 56 can be configured for other increments (e.g., 15 KHz or 60 KHz), and a different RF spectrum bandwidth. With this in mind, the adaptive front-end module 56 can be configured at frequency increment f1 to measure power at t1, t2, thru tq (q representing the number of time cycles, i.e., Q). At f1+30 kHz, the adaptive front-end module 56 measures power at t1, t2, thru tn. The frequency increment can be defined by $f0+(z-1)*30$ KHz=fz, where f0 is a starting frequency, where $z=1 \ldots x$, and z defines increments of 30 KHz increment, e.g., f1=f(z=1) first 30 KHz increment, f2=f(z=2) second 30 KHz increment, etc.

The adaptive front-end module 56 repeats these steps until the spectrum of interest has been fully scanned for Q cycles, thereby producing the following power level sample sets:

$$S_{f1(t1\ thru\ tq)}: s_{1,t1,f1}, s_{2,t2,f1}, \ldots, s_{q,tq,f1}$$

$$S_{f2(t1\ thru\ tq)}: s_{1,t1,f2}, s_{2,t2,f2}, \ldots, s_{q,tq,f2}$$

$$\ldots$$

$$S_{fx(t1\ thru\ tq)}: s_{1,t1,fz}, s_{2,t2,fx}, \ldots, s_{q,tq,tx}$$

The adaptive front-end module 56 in step 504, calculates averages for each of the power level sample sets as provided below:

$$a1(f1) = (s_{1,t1,f1} + s_{2,t2,f1}, \ldots, +s_{q,tq,f1})/q$$

$$a2(f2) = (s_{1,t1,f2} + s_{2,t2,f2}, \ldots, s_{q,tq,f2})/q$$

$$\ldots$$

$$ax(fx) = (s_{1,t1,fx} + s_{2,t2,fx}, \ldots, s_{q,tq,fx})/q$$

In one embodiment, the adaptive front-end module 56 can be configured to determine at step 506 the top "n" averages (e.g., the top 3 averages) and dismiss these averages from the calculations. The variable "m" can be user-supplied or can be empirically determined from field measurements collected by one or more base stations utilizing an adaptive front-end module 56. This step can be used to avoid skewing a baseline average across all frequency increments from being too high, resulting in a threshold calculation that may be too conservative. If step 506 is invoked, a baseline average can be determined in step 508 according to the equation: Baseline Avg=(a1+a2+ . . . +az−averages that have been dismissed)/(x−m). If step 506 is skipped, the baseline average can be determined from the equation: Baseline Avg=(a1+a2+ . . . +az)/x. Once the baseline average is determined in step 508, the adaptive front-end module 56 can proceed to step 510 where it calculates a threshold according to the equation: Threshold=ydB offset+Baseline Avg. The ydB offset can be user defined or empirically determined from field measurements collected by one or more base stations utilizing an adaptive front-end module 56.

Figure 17:
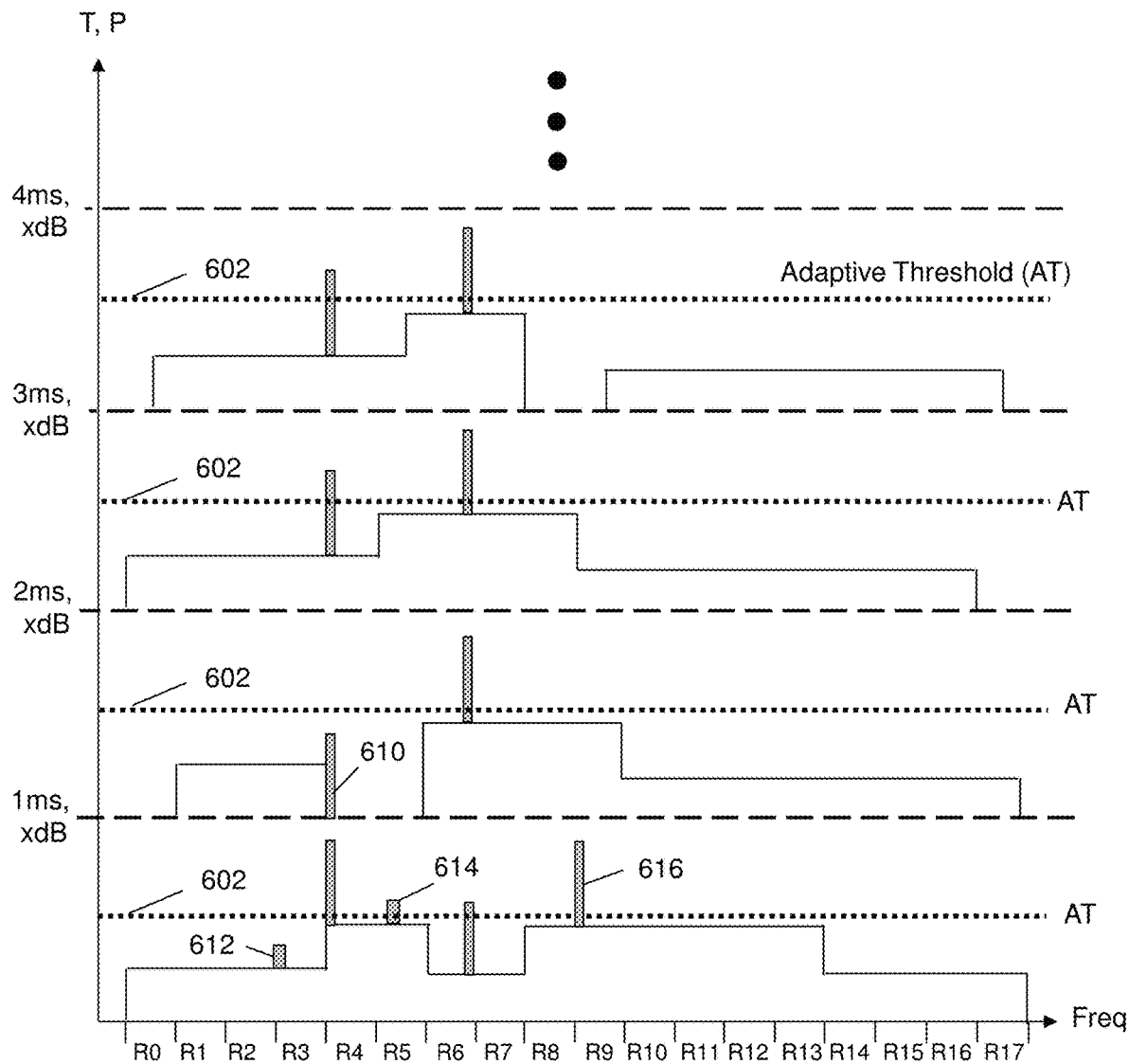
FIG. 17 depicts an illustrative embodiment of adaptive thresholds used for detecting and mitigating interference signals shown in FIG. 15.

Once a cycle of steps 502 through 510 have been completed, the adaptive front end module 56 can monitor at step 512 interference per frequency increment of the spectrum being scanned based on any power levels measured above the threshold 602 calculated in step 510 as shown in FIG. 17. Not all interferers illustrated in FIG. 17 exceed the threshold, such as the interferer with reference 610. Although this interferer has a high-power signature, it was not detected because it occurred during a resource block (R4) that was not in use. As such, the interferer 510 fell below the threshold 602. In another illustration, interferer s 612 also fell below the threshold 602. This interferer was missed because of its low power signature even though the RB from which it occurred (R3) was active.

Method 500 can utilize any of the embodiments in the illustrated flowcharts described above to further enhance the interference determination process. For example, method 500 of FIG. 16 can be adapted to apply weights to the power levels, and/or perform correlation analysis to achieve a desired confidence level that the proper interferers are addressed. For example, with correlation analysis, the adaptive front-end module 56 can be configured to ignore interferers 614 and 616 of FIG. 17 because their frequency of occurrence is low. Method 500 can also be adapted to prioritize interference mitigation. Prioritization can be based on frequency of occurrence of the interferers, time of day of the interference, the affect the interference has on network traffic, and/or other suitable factors for prioritizing interference to reduce its impact on the network. Prioritization schemes can be especially useful when the filtering resources of the adaptive front-end module 56 can only support a limited number of filtering events.

Figure 18:
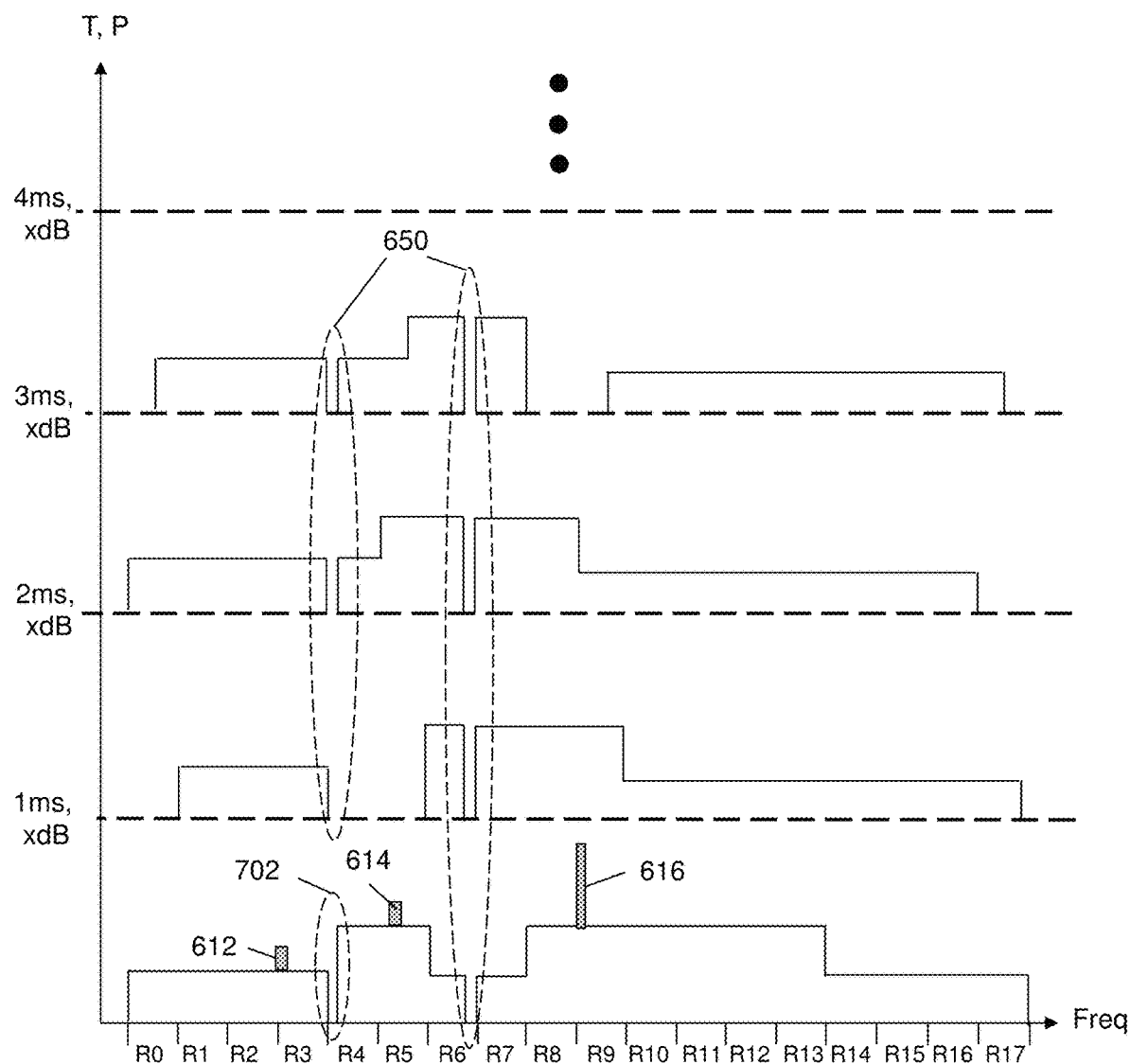
FIG. 18 depicts an illustrative embodiment of resulting LTE signals after mitigating interference according to the method of FIG. 16.

When one or more interferers are detected in step 512, the adaptive front-end module 56 can mitigate the interference at step 514 by configuring one or more filters to suppress the one or more interferers as described above. When there are limited resources to suppress all interferers, the adaptive front-end module 56 can use a prioritization scheme to address the most harmful interference as discussed above. FIG. 18 provides an illustration of how the adaptive front-end module 56 can be suppress interferers based on the aforementioned algorithms of the subject disclosure. For example, interferers 612, 614 and 616 can be ignored by the adaptive front-end module 56 because their correlation may be low, while interference suppression is applied for all other interferers as shown by reference 650.

In one embodiment, the adaptive front-end module 56 can submit a report to a diagnostic system that includes information relating to the interferers detected. The report can including among other things, a frequency of occurrence of the interferer, spectral data relating to the interferer, an identification of the base station from which the interferer was detected, a severity analysis of the interferer (e.g., bit error rate, packet loss rate, or other traffic information detected during the interferer), and so on. The diagnostic system can communicate with other base stations with other operable adaptive front end module 56 to perform macro analysis of interferers such as triangulation to locate interferers, identity analysis of interferers based on a comparison of spectral data and spectral profiles of known interferers, and so on.

In one embodiment, the reports provided by the adaptive front-end module 56 can be used by the diagnostic system to in some instance perform avoidance mitigation. For example, if the interferer is known to be a communication device in the network, the diagnostic system can direct a base station in communication with the communication device to direct the communication device to another channel so as to remove the interference experienced by a neighboring base station. Alternatively, the diagnostic system can direct an affected base station to utilize beam steering and or mechanical steering of antennas to avoid an interferer. When avoidance is performed, the mitigation step 514 can be skipped or may be invoked less as a result of the avoidance steps taken by the diagnostic system.

Once mitigation and/or an interference report has been processed in steps 514 and 516, respectively, the adaptive front-end module 56 can proceed to step 518. In this step, the adaptive front-end module 56 can repeat steps 502 thru 510 to calculate a new baseline average and corresponding threshold based on Q cycles of the resource blocks. Each cycle creates a new adaptive threshold that is used for interference detection. It should be noted that when Q is high, changes to the baseline average are smaller, and consequently the adaptive threshold varies less over Q cycles. In contrast, when Q is low, changes to the baseline average are higher, which results in a more rapidly changing adaptive threshold.

Generally speaking, one can expect that there will be more noise-free resource blocks than resource blocks with substantive noise. Accordingly, if an interferer is present (constant or ad hoc), one can expect the aforementioned algorithm described by method 500 will produce an adaptive threshold (i.e., baseline average+offset) that will be lower than interferer's power level due to mostly noise-free resource blocks driving down baseline average. Although certain communication devices will have a high initial power level when initiating communications with a base station, it can be further assumed that over time the power levels will be lowered to a nominal operating condition. A reasonably high Q would likely also dampen disparities between RB's based on the above described embodiments.

It is further noted that the aforementioned algorithms can be modified while maintaining an objective of mitigating detected interference. For instance, instead of calculating a baseline average from a combination of averages a1(f1) through ax(fx) or subsets thereof, the adaptive front end controller 56 can be configured to calculate a base line average for each resource block according to a known average of adjacent resource blocks, an average calculated for the resource block itself, or other information that may be provided by, for example, a resource block scheduler that may be helpful in calculating a desired baseline average for each resource block or groups of resource blocks. For instance, the resource block schedule can inform the adaptive front-end module 56 as to which resource blocks are active and at what time periods. This information can be used by the adaptive front-end module 56 determine individualized baseline averages for each of the resource blocks or groups thereof. Since baseline averages can be individualized, each resource block can also have its own threshold applied to the baseline average of the resource block. Accordingly, thresholds can vary between resource blocks for detecting interferers.

It is further noted that the aforementioned mitigation and detection algorithms can be implemented by any communication device including cellular phones, smartphones, tablets, small base stations, macro base stations, femto cells, Wi-Fi access points, and so on. Small base stations (commonly referred to as small cells) can represent low-powered radio access nodes that can operate in licensed and/or unlicensed spectrum that have a range of 10 meters to 1 or 2 kilometers, compared to a macrocell (or macro base station) which might have a range of a few tens of kilometers. Small base stations can be used for mobile data offloading as a more efficient use of radio spectrum.

While for purposes of simplicity of explanation, the respective processes are shown and described as a series of blocks in FIG. 16, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 19:
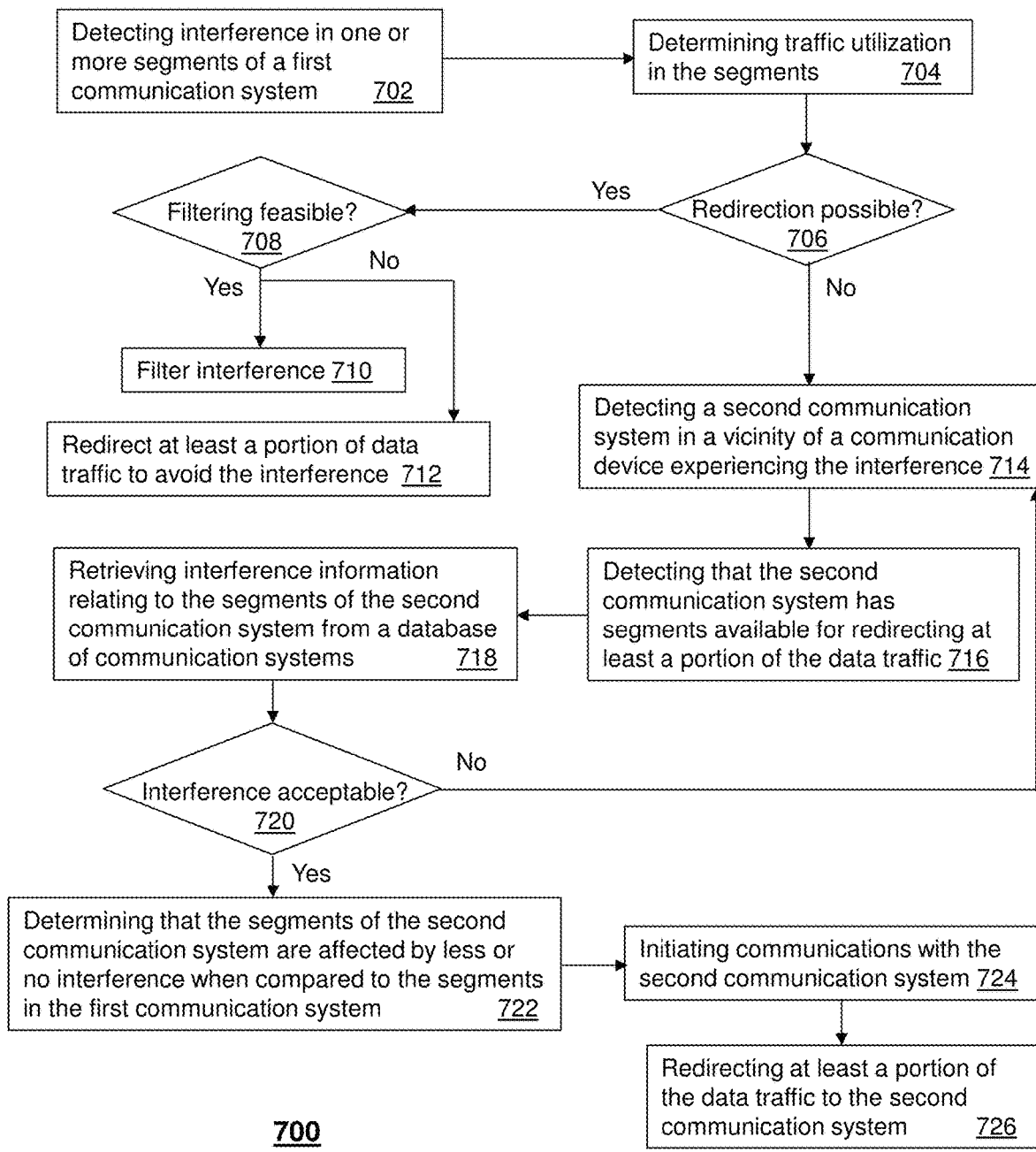
FIG. 19 depicts an illustrative embodiment of a method for mitigating interference.
Figure 20:
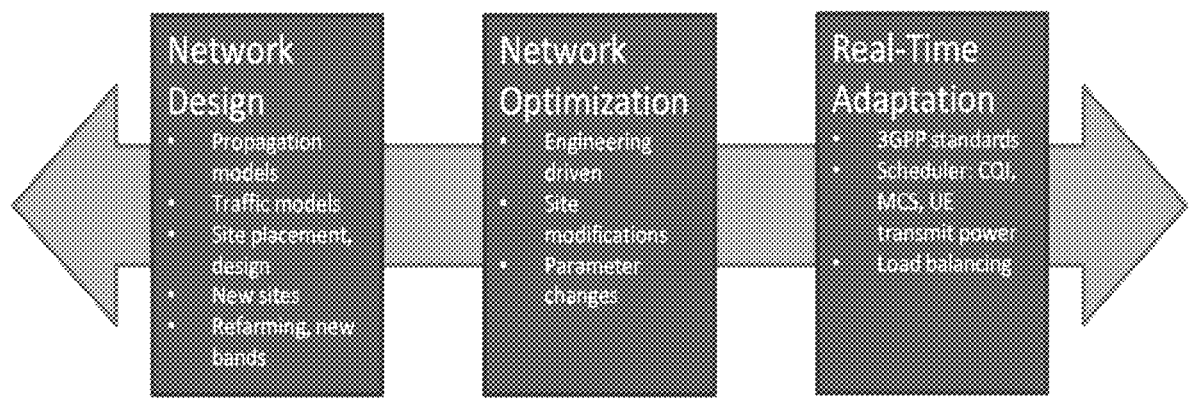
FIG. 20 depicts an illustrative embodiment of a network design.
Figure 21:
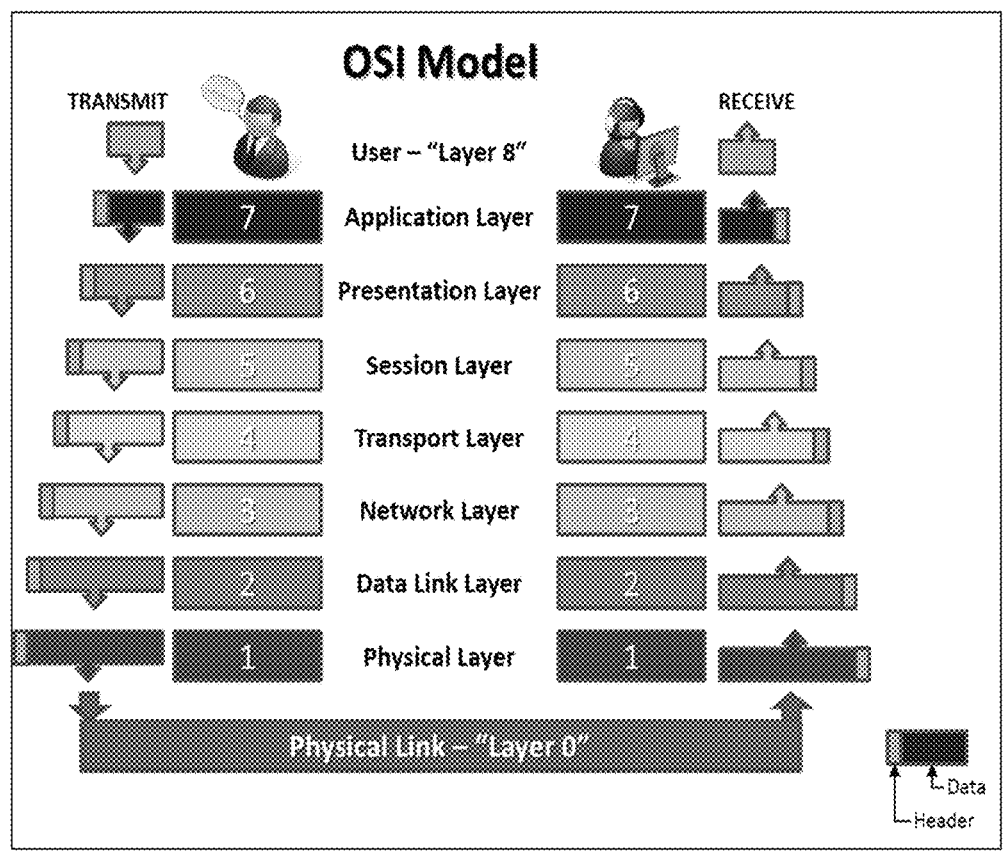
FIG. 21 depicts an illustrative embodiment of an Open Systems Interconnect (OSI) model.

FIG. 19 depicts an illustrative embodiment of a method 700 for mitigating interference such as shown in FIG. 15. Method 700 can be performed singly or in combination by a mobile communication device, a stationary communication device, base stations, and/or a system or systems in communication with the base stations and/or mobile communication devices. Method 700 can begin with step 702, where interference is detected in one or more segments of a first communication system. A communication system in the present context can represent a base station, such as a cellular base station, a small cell (which can represent a femto cell, or a smaller more portable version of a cellular base station), a Wi-Fi router, a cordless phone base station, or any other form of a communication system that can provide communication services (voice, data or both) to fixed or mobile communication devices. The terms communication system and base station may be used interchangeably below. In either instance, such terms are to be given a broad interpretation such as described above. A segment can represent a resource block or other subsets of communication spectrum of any suitable bandwidth. For illustration purposes only, segments will be referred to henceforth as resource blocks. In addition, reference will be made by a mobile communication device affected by the interference. It is to be understood that method 700 can also be applied to stationary communication devices.

Referring back to step 702, the interference occurring in the resource block(s) can be detected by a mobile communication device utilizing the adaptive thresholds described in the subject disclosure. The mobile communication device can inform the first communication system (herein referred to as first base station) that it has detected such interference. The interference can also be detected by a base station that is in communication with the mobile communication device. The base station can collect interference information in a database for future reference. The base station can also transmit the interference information to a centralized system that monitors interference at multiple base stations. The interference can be stored and organized in a system-wide database (along with the individual databases of each base station) according to time stamps when the interference occurred, resource blocks affected by the interference, an identity of the base station collecting the interference information, an identity of the mobile communication device affected by the interference, frequency of occurrence of the interference, spectral information descriptive of the interference, an identity of the interferer if it can be synthesized from the spectral information, and so on.

At step 704, a determination can be made as to the traffic utilization of resource blocks affected by the interference and other resource blocks of the first base station that may be unaffected by interference or experiencing interference less impactful to communications. In this step a determination can be made as to the availability of unused bandwidth for redirecting data traffic of the mobile communication device affected by the interference to other resource blocks. Data traffic can represent voice only communications, data only communications, or a combination thereof. If other resource blocks are identified that can be used to redirect all or a portion of the data traffic with less interference or no interference at all, then a redirection of at least a portion of the data traffic is possible at step 706.

At step 708 a further determination can be made whether interference suppression by filtering techniques described in the subject disclosure can be used to avoid redirection and continued use of the resource blocks currently assigned to the mobile communication device. Quality of Service (QoS), data throughput, and other factors as defined by the service provider or as defined in a service agreement between a subscriber of the mobile communication device and the service provider can be used to determine whether noise suppression is feasible. If noise suppression is feasible, then one or more embodiments described in the subject disclosure can be used in step 710 to improve communications in the existing resource blocks without redirecting data traffic of the mobile communication device.

If, however, noise suppression is not feasible, then the mobile communication device can be instructed to redirect at least a portion of data traffic to the available resource blocks of the first base station identified in step 706. The first base station providing services to the mobile communication device can provide these instructions to the mobile communication device. However, prior to instructing the mobile communication device to redirect traffic, the base station can retrieve interference information from its database to assess the quality of the available resource blocks identified in step 706. If the available resource blocks have less interference or no interference at all, then the base station can proceed to step 712. If, however, there are no available resource blocks at step 706, or the available resource blocks are affected by equal or worse noise, then method 700 continues at step 714.

In one embodiment, steps 702, 704, 706, 708, 710, and 712 can be performed by a base station. Other embodiments are contemplated.

In step 714, a second communication system (referred to herein as second base station) in a vicinity of the mobile communication device can be detected. Step 714 can represent the base station that detected the interference in step 702 informing a central system overlooking a plurality of base stations that filtering or redirection of traffic of the affected mobile communication device is not possible. The detection of the second communication system can be made by the mobile communication device, or a determination can be made by the central system monitoring the location of the affected mobile communication device as well as other mobile communication devices according to coordinate information provided by a GPS receiver of the mobile communication devices, and knowledge of a communication range of other base stations. At step 716, resource blocks of the second base station can be determined to be available for redirecting at least a portion of the data traffic of the mobile communication device. At step 718, interference information can be retrieved from a system-wide database that stores interference information provided by base stations, or the interference information can be retrieved from or by the second base station from its own database. At step 720, a determination can be made from the interference information whether the resource blocks of the second base station are less affected by interference than the interference occurring in the resource blocks of the first base station. This step can be performed by a central system that tracks all base stations, or by the affected mobile communication device which can request the interference information from the central system, access the system-wide database, or access the database of the second base station.

If the interference information indicates the interference in the resource blocks of the second base station tend to be more affected by interference than the resource blocks of the first base station, then method 700 can proceed to step 714 and repeat the process of searching for an alternate base station in a vicinity of the mobile communication device, determining availability of resource blocks for transporting at least a portion of the data traffic of the mobile communication device, and determining whether noise in these resource blocks is acceptable for redirecting the traffic. It should be noted that the mobile communication device can perform noise suppression as described in step 710 on the resource blocks of the second base station. Accordingly, in step 720 a determination of whether the interference is acceptable in the resource blocks of the second base station can include noise suppression analysis based on the embodiments described in the subject disclosure. If an alternate base station is not found, the mobile communication device can revert to step 710 and perform noise suppression on the resource blocks of the first base station to reduce packet losses and/or other adverse effects, and if necessary increase error correction bits to further improve communications.

If, on the other hand, at step 722 the interference in the resource blocks of the second base station is acceptable, then the mobile communication device can proceed to step 724 where it initiates communication with the second base station and redirects at least a portion (all or some) of the data traffic to the resource blocks of the second base station at step 726. In the case of a partial redirection, the mobile communication device may be allocating a portion of the data traffic to some resource blocks of the first base station and the rest to the resource blocks of the second base station. The resource blocks of the first base station may or may not be affected by the interference detected in step 702. If the resource blocks of the first base station being used by the mobile communication device are affected by the interference, such a situation may be acceptable if throughput is nonetheless increased by allocating a portion of the data traffic to the resource blocks of the second base station.

It should be further noted that a determination in step 720 of an acceptable interference level can be the result of no interference occurring in the resource blocks of the second base station, or interference being present in the resource blocks of the second base station but having a less detrimental effect than the interference experienced in the resource blocks of the first base station. It should be also noted that the resource blocks of the second base station may experience interference that is noticeably periodic and not present in all time slots. Under such circumstances, the periodicity of the interference may be less harmful than the interference occurring in the resource blocks of the first base station if such interference is more frequent or constant in time. It is further noted that a resource block scheduler of the second base station may assign the resource blocks to the mobile communication device according to a time slot scheme that avoids the periodicity of the known interference.

It is contemplated that the steps of method 700 can be rearranged and/or individually modified without departing from the scope of the claims of the subject disclosure. Consequently, the steps of method 700 can be performed by a mobile communication device, a base station, a central system, or any combination thereof.

While for purposes of simplicity of explanation, the respective processes are shown and described as a series of blocks in FIG. 19, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Operating a wireless network can require a significant amount of effort to deploy and maintain it successfully. An additional complication involves the addition of new cell sites, sector splits, new frequency bands, technology evolving to new generations, user traffic patterns evolving and growing, and customer expectations for coverage and accessibility increasing. Such complexities in network design, optimization and adaptation are illustrated by way of example in FIG. 20. The underlying physical link that supports such networks is negatively impacted by changing weather, construction of new buildings, and an increase in operators offering services and devices using the wireless spectrum.

All of these challenges which can impact the operations of a network combine to make it harder for users to make calls, transfer data, and enjoy wireless applications. Wireless customers do not necessarily understand the complexity that makes a communication network work properly. They just expect it to always work. The service provider is left having to design the best network it can, dealing with all of the complexity described above. Tools have been developed to manage in part this complexity, but the wireless physical link requires special expertise. The underlying foundation of the performance of the wireless network is the physical link, the foundation that services rely upon. Typically, networks are designed to use the OSI seven-layer model (shown in FIG. 21), which itself requires a reliable physical layer (referred to herein as the RF link) as a necessary element to achieve a desirable performance design. Without the RF link network communications would not be possible.

The RF link is characterized at a cell site deployment stage when cell sites are selected and antenna heights and azimuths are determined. Dimensioning and propagation along with user traffic distribution are a starting point for the RF link. Once a cell site is built and configured, further optimization falls into two major categories: RF optimization/site modifications (e.g., involving adjusting azimuth or tilting antennas, adding low noise amplifiers or LNAs, etc.), and real-time link adaptation (the way an eNodeB and user equipment (UE) are constantly informing each other about link conditions and adjusting power levels, modulation schemes, etc.).

The network design along with RF optimization/site modifications are only altered occasionally and most changes are expensive. Real-time link adaptation, on the other hand, has low ongoing costs and to the extent possible can be used to respond in real-time to changes experienced by an RF link (referred to herein as the "link condition"). The aspects of designing, optimizing and running a network are vital and a priority for network operators and wireless network equipment makers. Between network design and real-time adaptation, a wide variety of manual and autonomous changes take place as part of network optimization and self-organizing networks.

In addition to the issues described above, there is an unsolved problem impacting the RF link that is not being addressed well with today's solutions, which in turn impacts network performance and the resulting customer experience. The subject disclosure addresses this problem by describing embodiments for improving the RF physical layer autonomously without relying on traditional cell site modifications. The subject disclosure also describes embodiments for monitoring link conditions more fully and over greater time windows than is currently performed. Currently, Service Overlay Networks (SON) focus only on downlink conditioning. The systems and methods of the subject disclosure can be adapted to both uplink and the downlink conditioning. Improvements made to an uplink by a base station, for example, can be shared with the SON network to perform downlink conditioning and thereby improve downlink performance. For example, if the performance of an uplink is improved, the SON can be notified of such improvements and can be provided uplink performance data. The SON network can use this information to, for example, direct the base station to increase coverage by adjusting a physical position of an antenna (e.g., adjust tilt of the antenna).

Additionally, the systems and methods of the subject disclosure can be adapted to demodulate a transmit link (downlink) to obtain parametric information relating to the downlink (e.g., a resource block or RB schedule, gain being used on the downlink, tilt position of the antenna, etc.). In an embodiment, the systems and methods of the subject disclosure can be adapted to obtain the downlink parametric information without demodulation (e.g., from a functional module of the base station). The systems and methods of the subject disclosure can in turn use the downlink parametric information to improve uplink conditioning. In an embodiment, systems and methods of the subject disclosure can use gain data associated with a downlink, a tilt position or adjustments of the downlink antenna, to improve uplink conditioning. In an embodiment, the systems and methods of the subject disclosure can be adapted to use the RB schedule to determine which RB's are to be observed/measured (e.g., RB's in use by UE's) and which RB's are to be ignored (e.g., RB's not in use by UE's) when performing uplink conditioning.

Additionally, in a closed-loop system, the embodiments of the subject disclosure can be adapted to balance performance between an uplink and downlink contemporaneously or sequentially. For example, when an antenna is physically adjusted (e.g., tilted) the embodiments of the subject disclosure can be adapted to determine how such an adjustment affects the uplink. If the adjustment is detrimental to the uplink, it can be reversed in whole or in part. If the adjustment has a nominal adverse impact on the uplink, the adjustment can be preserved or minimally adjusted. If the adjustment has an adverse impact on the uplink that is not detrimental but significant, changes to the uplink (e.g., increasing gain, filter scheme on uplink, requesting UEs to change MCS, etc.) can be identified and initiated to determine if the adjustment to the antenna can be preserved or should be reversed in whole or in part. In an embodiment, a combination of a partial reversal to the adjustment of the antenna and adjustments to the uplink can be initiated to balance a performance of both the uplink and downlink. Closed-loop concepts such as these can also be applied to the uplink. In an embodiment, for example, the downlink can be analyzed in response to changes to the uplink, and adjustments can be performed to the downlink and/or the uplink if the effects are undesirable.

In an embodiment, closed-loop system(s) and method(s) that perform link conditioning on both the uplink and downlink can be adapted to identify a balanced ("sweet spot") performance between the uplink and the downlink such that neither the uplink nor the downlink is at optimal (or maximum) performance. In an embodiment, a closed-loop system and method can be performed by the SON network by receiving conditioning information relating to an uplink and/or a downlink from cell sites and by directing a number of such cell sites to perform corrective actions on the uplink, the downlink, or both to balance performance therebetween. In an embodiment, a closed-loop system and method for balancing performance between uplinks and downlinks can be performed by cell sites independently, UEs independently, cell sites cooperating with UEs, cell sites cooperating among each other, UEs cooperating among each other, or combinations thereof with or without assistance of a SON network by analyzing link conditioning performed on the uplinks and/or downlinks.

In one embodiment, the subject disclosure describes embodiments for improving network performance by analyzing information collected across several RF links to holistically improve communications between eNodeBs and UEs. In one embodiment, the subject disclosure describes embodiments for obtaining a suite of spectral key performance indicators (KPIs) which better capture the conditions of an RF environment. Such data can be used in self-optimizing networks to tune the RF link that supports the UE/eNodeB relationship. In addition, measurements and adjustments can be used to provide self-healing capabilities that enable the RF link of a UE/eNodeB RF to be adapted in real-time.

In one embodiment, signal to interference plus noise ratio (SINR) is an indicator that can be used to measure a quality of wireless communications between mobile and stationary communication devices such as base station(s). A base station as described in the subject disclosure can represent a communication device that provides wireless communication services to mobile communication devices. A base station can include without limitation a macro cellular base station, a small cell base station, a micro cell base station, a femtocell, a wireless access point (e.g., Wi-Fi, Bluetooth), a Digital Enhanced Cordless Telecommunications (DECT) base station, and other stationary or non-portable communication services devices. The term "cell site" and base station may be used interchangeably. A mobile or portable communication device can represent any computing device utilizing a wireless transceiver for communicating with a base station such as a cellular telephone, a tablet, a laptop computer, a desktop computer, and so on.

For illustration purposes only, the embodiments that follow will be described in relation to cellular base stations and mobile cellular telephones. It is submitted, however, that the embodiments of the subject disclosure can be adapted for use by communication protocols and communication devices that differ from cellular protocols and cellular communication devices.

Figure 22:
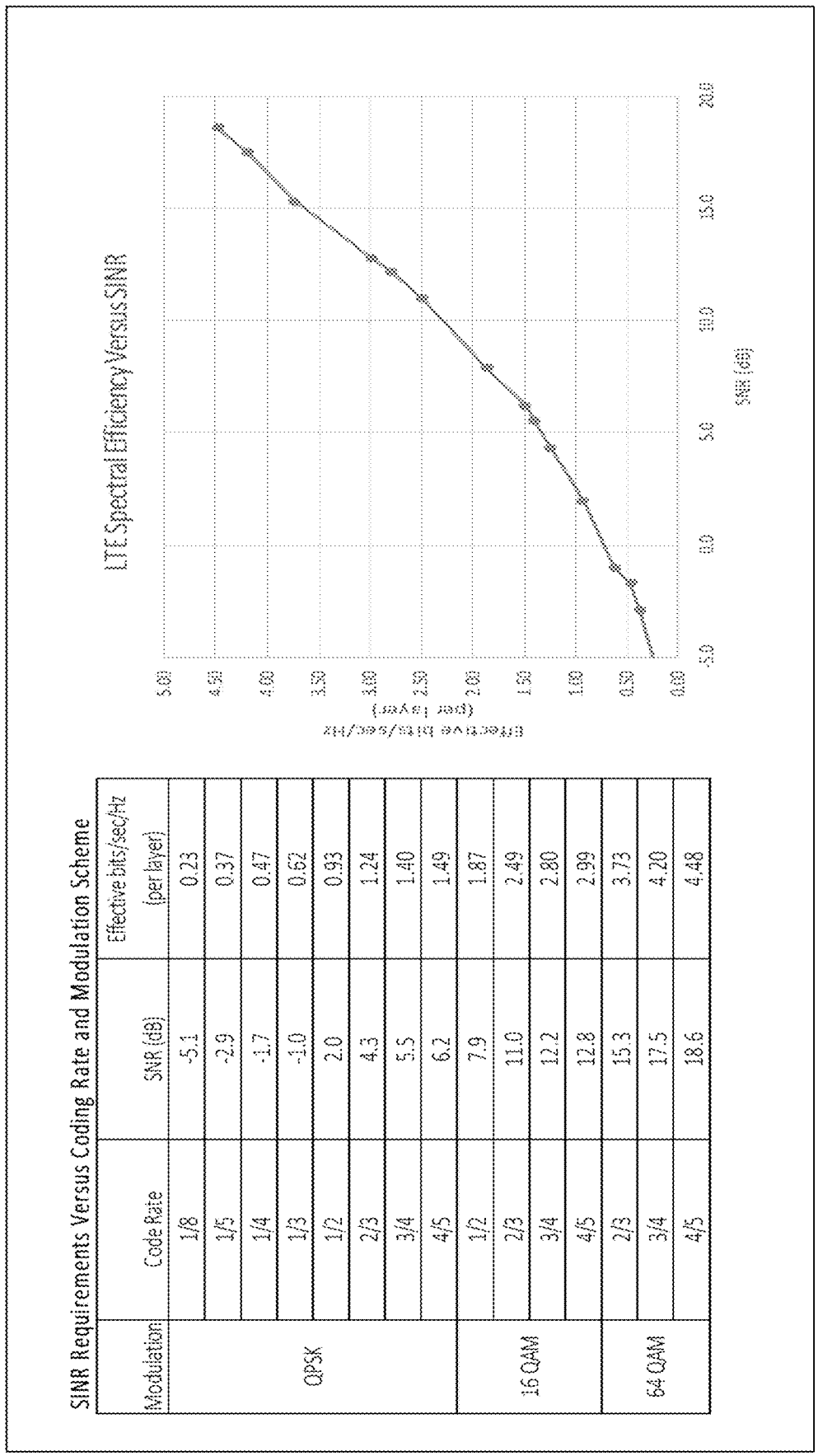
FIG. 22 depicts an illustrative embodiment of a relationship between SINR and data throughput and performance.

In communication systems such as LTE networks, achieving a target SINR may enable the coverage area of a cell site to achieve its design goals and allow the cell site to utilize higher modulation and coding schemes (MCS), which can result in higher spectral density—a desirable goal for LTE networks. Delivering desirable throughput rates in LTE systems can require higher SINR than in 3G systems. Performance of LTE systems can suffer as SINR falls, whether due to lower signal and/or higher interference and noise. FIG. 22 depicts the impact of SINR on throughput and therefore capacity.

In one embodiment, SINR can be improved by collecting information from each cell site (e.g., on a sector and/or resource block basis), compiling an estimated SINR from such information, and adjusting RF parameters of the RF link to improve an overall network performance of the cell site. In one embodiment, SINR can be described according to the following equation:

$$SINR = \frac{Signal}{Interference + Noise} = \frac{S}{N + N_c + N_{adj} + N_{comp} + N_{out} + \sum I} \quad (EQ\ 1)$$

where S is the received signal level, N is the thermal noise, and $N_c$ is in-band co-channel interference, $N_{adj}$ is the adjacent band noise in guard bands or the operator's other carriers, $N_{comp}$ is interference in the same overall frequency band from other operators, $N_{out}$ is the out-of-band noise, and $\Sigma I$ is the summation of the inter-cell interference contributed from surrounding cell sites. Some prior art systems consider in-band co-channel interference $N_c$, the adjacent interference noise $N_{adj}$, the competitors' transmissions $N_{comp}$, and the out of band noise $N_{out}$ to be very small. This assumption is generally not accurate, particularly for cell sites where performance is a challenge. In practice, I is proportional to the quality and strength of the signal (S) from neighboring sites; particularly, in dense networks or near cell edges, where one site's signal is another site's interference.

By describing SINR in its constituent parts as depicted in the above equation, specific actions can be taken to improve SINR and consequently performance of one or more RF links, which in turn improves performance of the network. An RF signal received by a cell site can be improved in a number of ways such as by selective filtering, adding gain or amplification, increasing attenuation, tilting antennas, and adjusting other RF parameters. RF parameters of an RF link can be modified in ways that improves overall network performance within a specific cell site and in some cases across multiple inter-related cell sites.

To achieve improvements in one or more cell sites, a matrix of SINRs can be created that includes an estimate for SINR at a path level for each node (cell site) or sector in the network. Optimization scenarios can be achieved by analyzing a network of cell sites collectively using linear programming for matrix optimization. By adjusting an uplink, one can create a weighted maximization of the SINR matrix with element δ added to each SINR element. Each point in the matrix with index i and j can consist of $SINR_{i,j} + \delta_{i,j}$ for a particular node. In one embodiment, SINR can be optimized for each cell site, within an acceptable range of $SINR_{i,j} \pm \delta_{i,j}$, where $\delta_{i,j}$ is lower than some specified $\Delta$. The term $\delta_{i,j}$ can represent a threshold range of performance acceptable to a service provider. A SINR outside of the threshold range can be identified or flagged as an undesirable SINR. The threshold range $\delta_{i,j}$ can be the same for all base stations, paths, sectors, or clusters thereof, or can be individualized per base station, path, sector, or clusters thereof. The term $\Delta$ can represent a maximum threshold range which the threshold range $\delta_{i,j}$ cannot exceed. This maximum threshold range $\Delta$ can be applied the same to all base stations, sectors, paths, or clusters thereof. Alternatively, the term $\Delta$ can differ per base station, sector, path, or cluster thereof. In one embodiment, the objective may not necessarily be to optimize SINR of a particular cell site. Rather the objective can be to optimize SINR of multiple nodes (cell sites and/or sectors) in a network. Below is an equation illustrating a matrix for optimizing SINR of one or more nodes (cell sites).

$$\begin{bmatrix} SINR_{1,1} \pm \delta_{1,1} & \cdots & SINR_{1,j} \pm \delta_{1,j} \\ & \ddots & \\ SINR_{i,1} \pm \delta_{i,1} & \cdots & SINR_{i,j} \pm \delta_{i,j} \end{bmatrix} \times \begin{bmatrix} \text{Transformation} \\ \text{matrix} \end{bmatrix} = \begin{bmatrix} \text{Optimized} \\ SINR + \delta \end{bmatrix} \quad \text{(EQ 2)}$$

In one embodiment, for a particular cell site and sector i,j, SINR can be estimated on a resource-block level basis as $SINR_{i,j,k}$ (where i, and j are the site and sector indices that refer to the site location with respect to the surrounding sites and k is the index that refers to a particular resource block within the LTE system). The overall channel $SINR_{i,j}$ can be calculated by averaging the $SINR_{i,j,k}$ over all the resource blocks, e.g., $SINR_{i,j} = \Sigma_{k=1}^{N} SINR_{i,j,k}$, where N can be, for example, 50.

Improving SINR of one or more the nodes in a network using the above analysis, can in turn improve the throughput and capacity of the network, thereby enabling higher modulation and coding schemes (MCS) as shown in FIG. 22. The improved link performance of cell site(s) can help achieve design goals set by service providers for coverage area and capacity of the cell site(s). Achieving these design goals results in improved (and at times optimal) throughput and cell coverage as measured by data rate, accessibility/retainability, and reduction of time UEs are not on LTE commonly referred to as measure of TNOL (or similarly increase time UE's are on LTE).

Figure 23:
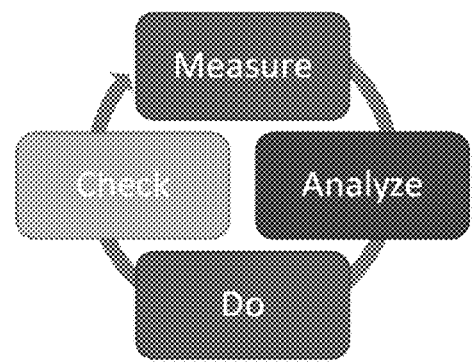
FIG. 23 depicts an illustrative embodiment of a closed loop process.

In one embodiment, a closed loop process can be used for adjusting the condition of an RF link of a node (or cell site) to improve performance of one or more other nodes in a network. Such a process is depicted in FIG. 23. This process can be described as follows.

Measure: collect a set of RF KPIs across multiple categories to more fully reflect the frequently changing conditions of the underlying RF physical link of one or more nodes.

Analyze: compare current RF link conditions and trends against network KPIs and the SINR matrix to determine changes that can be implemented to improve the conditions of the RF physical link.

Do: perform changes to adjust the RF link conditions of one or more nodes.

Check: confirm that the changes that were made have had the desired effect. To achieve a closed loop process, the results derived from the "Check" step can be provided to the "Measure" step in subsequent iterations to drive continuous improvement.

Together the steps of FIG. 23 provide a useful approach for analyzing an RF link and for taking appropriate steps to improve its condition. The steps of FIG. 23 are discussed in greater detail below.

Measurement. Understanding the current conditions of an RF link is an important step to improving network performance. Today's networks make available a variety of KPIs that reflect network performance, many focused on specific layer(s) of the OSI model shown in FIG. 21. To better improve link conditioning, the subject disclosure introduces a new set of KPIs that can provide a more complete "spectral portrait" that describes the RF environment that the RF link depends upon.

Figure 24:
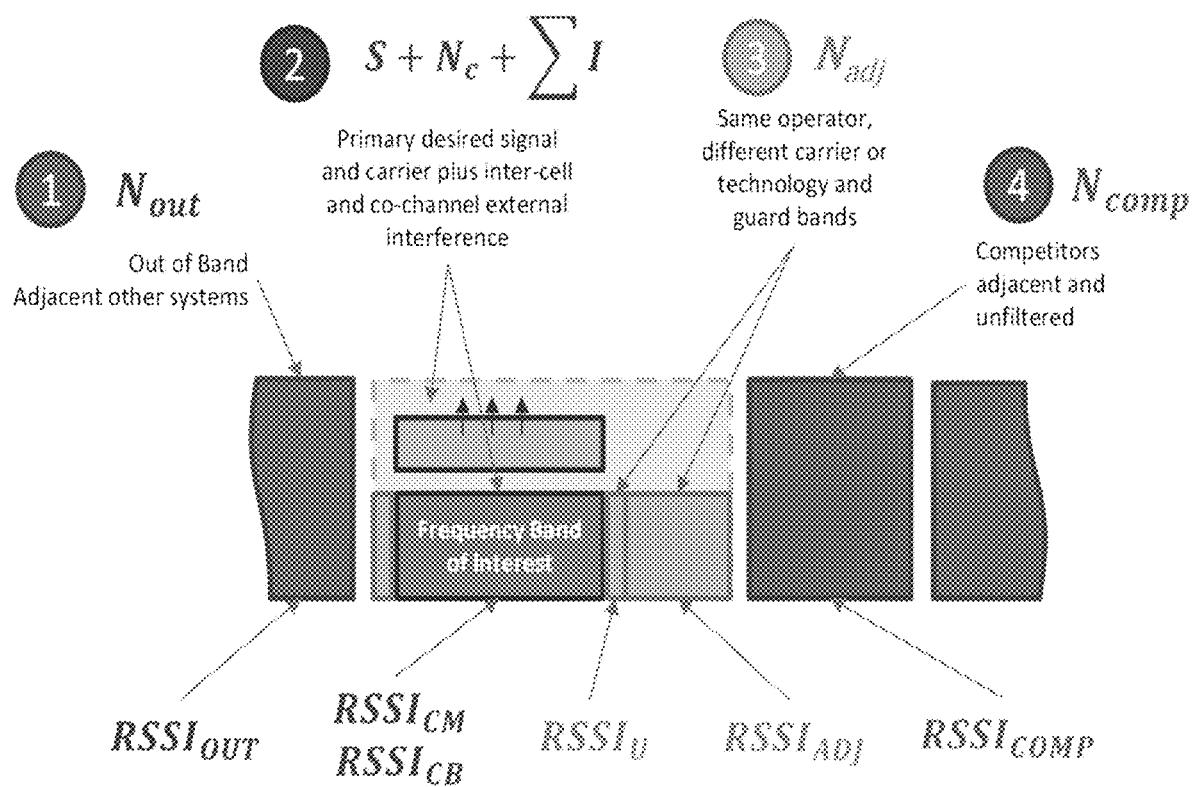
FIG. 24 depicts an illustrative embodiment of a spectral environment of a wireless channel.

There can be several aspects of the RF spectrum that can impact an RF link, as shown in FIG. 24. For example, one aspect of the RF spectrum that can impact the RF link involves the condition of a particular frequency band used for a desired signal. Other co-channel signals in the same frequency band can have an impact on the RF link, whether due to inter-cell interference from neighboring cell sites or external foreign interference from faulty systems and unintentional radiators. Each desired frequency band also has neighbors ranging from guard bands left open to provide isolation, additional carriers used by the same wireless operator (e.g., multiple UMTS bands or LTE neighboring CDMA), competing carriers operating in near adjacent bands, other systems operating in adjacent bands, and so on.

Each of four different RF categories measured during link conditioning (enumerated as 1-4 in FIG. 24) can provide important RF information that can directly impact a condition of the RF link and ultimately the UE—eNB relationship. Link conditioning as described by the subject disclosure provides a holistic spectral portrait enabling more insight than what is provided by OEM (Original Equipment Manufacturer) equipment which collects RSSI information and carrier power information in band (e.g., only 1 of the 4 groups), but doesn't give an operator visibility into what is happening in adjacent bands, out of band, or unused spectrum. Prior art OEM equipment also does not provide a comparison between expected, averages and daily measurements, which if available would provide a service provider a way to measure network performance.

Figure 25:
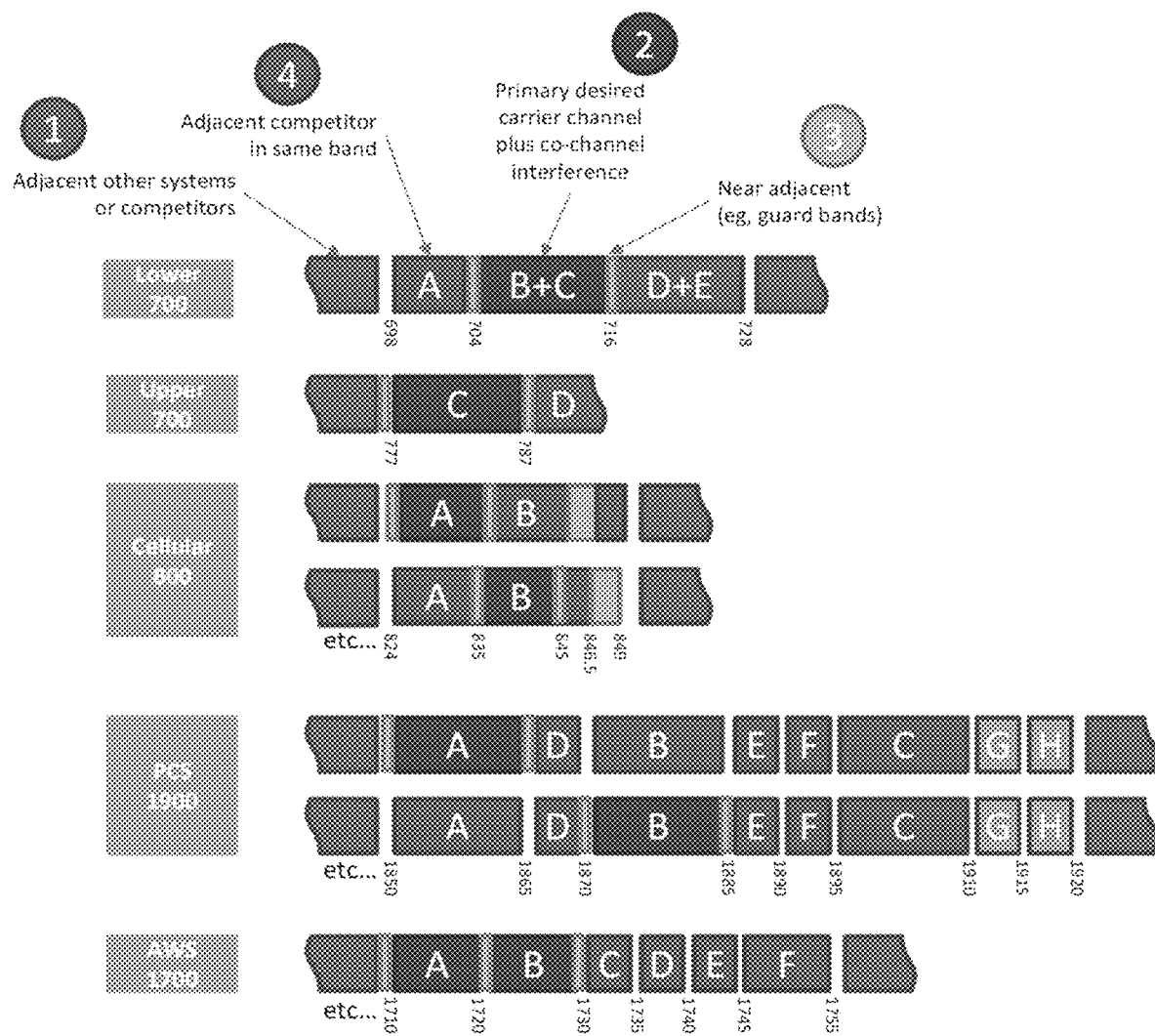
FIG. 25 depicts an illustrative embodiment of examples of spectral environments for various frequency bands.

Co-channel signals in an operating band can be filtered using the filtering techniques described earlier in the subject disclosure. FIG. 25 describes the four categories of bands in each of current US spectrums. In some instances, these classes of RF segments are presently impacting the performance of the underlying RF link and therefore the overall network performance. To support active conditioning of an RF link, the new KPIs introduced above along with SINR monitoring can provide visibility to parameters not currently available and can be used to mitigate spectrum and link conditions that may be undesirable. Such parameters can include absolute nominal values for each RF technology such as, for example, SINR targets based on nominal values and site-specific values based on particular conditions of a cell site. For example, some sites can have a target SINR higher than others due to the nature of traffic the sites support and/or because of network design considerations.

A network is a dynamic entity that changes continuously due to software upgrades, traffic volumes and pattern changes, seasonality and environmental conditions, just to name a few. Monitoring these variations and then adjusting the RF link to accurately compensate for such variations enables cell sites to consistently operate with a desired performance. In addition to monitoring and adjusting variations in an RF link, in one embodiment, nominal spectral values and RF statistics can be recorded in an ongoing basis (daily, hourly, according to moving averages, etc.).

Occasionally there can be significant differences between real-time, short-term averages and longer-term design parameters that can cause degradation of cell site metrics, which may negatively impact customer experience, and which can result in lost revenue for a service provider if not counteracted. When such issues are identified a next step can be to understand why the issues arose by analyzing spectral insights gained through the analysis of signals impacting SINR.

In one embodiment, link conditioning can be performed based on a number of metrics that can include without limitation:

$RSSI_{OUT}$— RSSI in the neighboring frequency bands (out of band). For example, TV channel 51 adjacent to the lower 700 MHz LTE bands or SMR and public safety bands adjacent to the 800 MHz cellular bands. This metric is proportional to $N_{out}$. ❶

$RSSI_{CB}$ and $RSSI_{CM}$— RSSI per carrier during busy hour and during maintenance window which can be used to help estimate S. ❷

$RSSI_c$— RSSI in carrier's used spectrum. This metric is proportional to $S+N_c$. ❷

$RSSI_{ADJ}$—RSSI in band in the carrier's unused spectrum. This metric is proportional to $N_{adj}$. ❸

$RSSI_{COMP}$— RSSI of competing wireless carriers occupying adjacent spectrum, not filtered by front end. This metric is proportional to $N_{comp}$. ❹

SINR—the signal to noise plus interference ratio of the resource blocks.

To gain a better understanding of the above metrics, the reference numbers 1-4 used in the above listing can be cross-referenced with the reference numbers 1-4 in FIGS. 24-25. These metrics can be measured on a path-by-path basis and can be used to drive optimization of one or more cell sites. As the environment changes, so can the performance of a network which can be reflected in these metrics. Using these metrics and correlating them against spectral KPIs can reveal vital information that can be used to improve an RF link's performance.

Analysis. As variations of RSSI and SINR data are collected RF statistics relating to these metrics can be generated and used to mine a data set for trends, outliers, and abnormalities across cell sites and frequency bands. By analyzing such information, a network and its corresponding cell sites can be monitored for changes over time, and corresponding mitigation steps can be taken when necessary.

Recall equation EQ1 above, $$SINR = \frac{Signal}{Interference + Noise} = \frac{S}{N + N_c + N_{adj} + N_{comp} + N_{out} + \sum I}$$

where S is the received signal level, N is the thermal noise, and $N_c$ is in-band co-channel interference, $N_{adj}$ is the adjacent band noise, $N_{comp}$ is interference from other operators, $N_{out}$ is the out-of-band noise, and $\sum I$ is the summation of the inter-cell interference contributed from all the surrounding cells. If SINR of a given sector or node is lower than expected a number of causes and solutions can be applied, based on a deeper understanding of the RF environment and its contribution to SINR. Below are non-limiting illustrations and corresponding recommended solutions to improve SINR.

1. $N_{out}$ is high, the solution may be to provide better filtering or diversity optimization
2. $N_{comp}$ is high, the solution may be to incorporate dynamic filtering to eliminate those sources
3. $N_{adj}$ is high, the solution may be to incorporate dynamic filtering to eliminate those sources or 3G service optimization (e.g., pilot power reduction or antenna tilt)
4. $N_c$ is high, the solution may in band mitigation using filtering techniques described in the subject disclosure
5. $\sum I$ is high, the solution may involve reducing overall gain to minimize intra-cell site noise
6. S is low, the solution may be to increase uplink gain to improve the RF link of the UE The above listing provides illustrations for initiating mitigating actions based on spectral analysis, which can be implemented with closed loop control so that ongoing performance improvements can be maintained.

Mitigation (Do). RF link mitigation can be initiated from an analysis of spectral data that leads to a set of specific recommended actions. There are many aspects of the RF link that can be modified as part of a link mitigation strategy, including without limitation:

Filtering adjacent signals: If adjacent signals are detected at the eNodeB at higher levels than expected, antennas can be tilted away from adjacent systems and/or digital filtering can be applied to the uplink to provide additional adjacent channel selectivity.

Adding gain: Based on traffic conditions or trends. For example, cell sites can be directed to increase uplink gain, effectively improving SINR for received signals or expanding coverage of a cell site.

Attenuating high signal power: In situations involving high traffic or locations of certain types of traffic leading to high signal power in-band, base station transceivers (BTS) can be instructed to reduce uplink signal power, which can improve an eNodeB's operating performance.

Interference suppression: in-band uplink filtering techniques described in the subject disclosure can be used to remove external interference within the carrier's active channel.

Diversity optimization: picking the better signal of a main and diversity receive antennas.

3G service optimization: Adjusting 3G pilot power or 3G antennas to minimize interference.

Adjusting mobile transmit parameters: Working with SON interfaces and eNodeB to adjust target power levels to modify cell coverage or reduce inter-cell interference.

Tilting antennas to reshape coverage: As traffic moves and capacity demand shifts, providing control of antenna tilt or input to antenna SON algorithms can enable the network to adjust coverage to address traffic demands. Coordinating across multiple sites, link conditioning algorithms can adjust positions of antennas (e.g., tilt down) on one site to reduce coverage and focus capacity while simultaneously up-tilting antennas of neighboring sites to fill in coverage gaps. This can shift traffic reducing the interference from UEs serviced by neighboring sites.

Check and Reporting. As changes are made to the network parameters based on any of the mitigation actions described above, the changes can be verified to determine whether such mitigation actions in fact improved network performance. Additionally, the SON network can be informed of these changes on the uplink for possible use in downlink conditioning as previously described. In addition, relevant data can be logged to guide future enhancement cycles.

As noted earlier, verification of the changes to the RF link can be implemented by way of a closed loop confirmation process which can provide input to the SON network to ensure that the network as a whole is operating according to up-to-date settings and the same or similar RF data. Reports generated in the verification step may include information relating to external interference that was detected, resource block utilization, multiple channel power measurements, etc.

As part of the ongoing adaptation of the link conditioning cycle, all changes can be logged, statistics can be updated and metadata can be generated and/or assigned to logged changes to ensure all changes can be understood and analyzed by personnel of a service provider. Such reports can also be used by future applications which can be adapted to "learn" from historical data generated from many cycles of the process described above. Implementing a link conditioning process based on real-world conditions as described above provides an enhanced and optimized RF physical layer performance. Ongoing link conditioning also enables operators to rely less on designing cell sites to worst-case conditions or anticipated network coverage.

The embodiments of the subject disclosure provide a unique focus on the RF physical layer according to a collective analysis of RF links across multiple cell sites. These embodiments enable systems to extract insight from spectral information, historical trends and network loading, while simultaneously optimizing RF parameters of multiple sites with live network traffic, thereby improving communications between eNodeBs and the UEs.

Figure 26A:
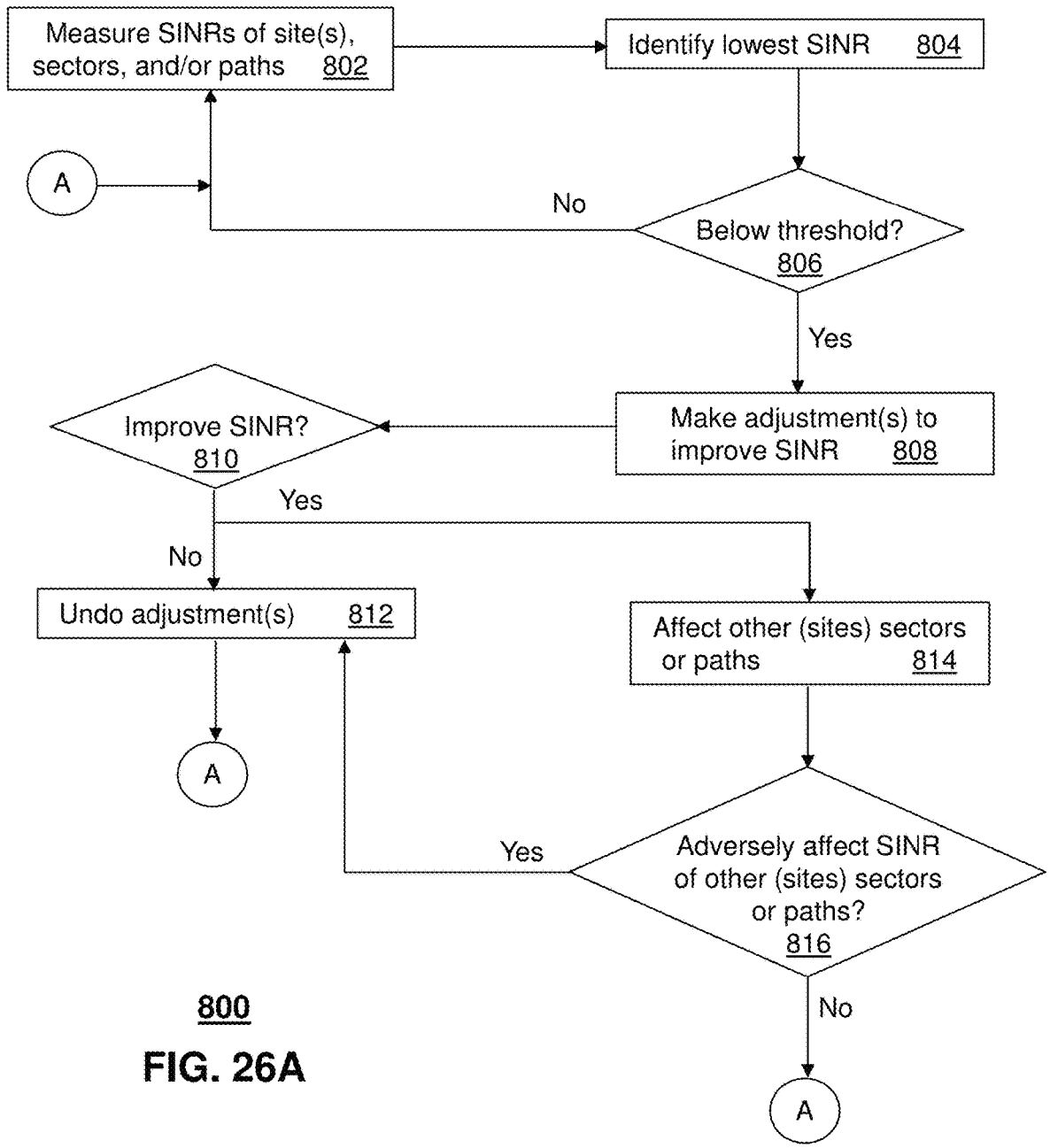
FIG. 26A depicts an illustrative embodiment of a method for link management in a communication system.
Figure 26B:
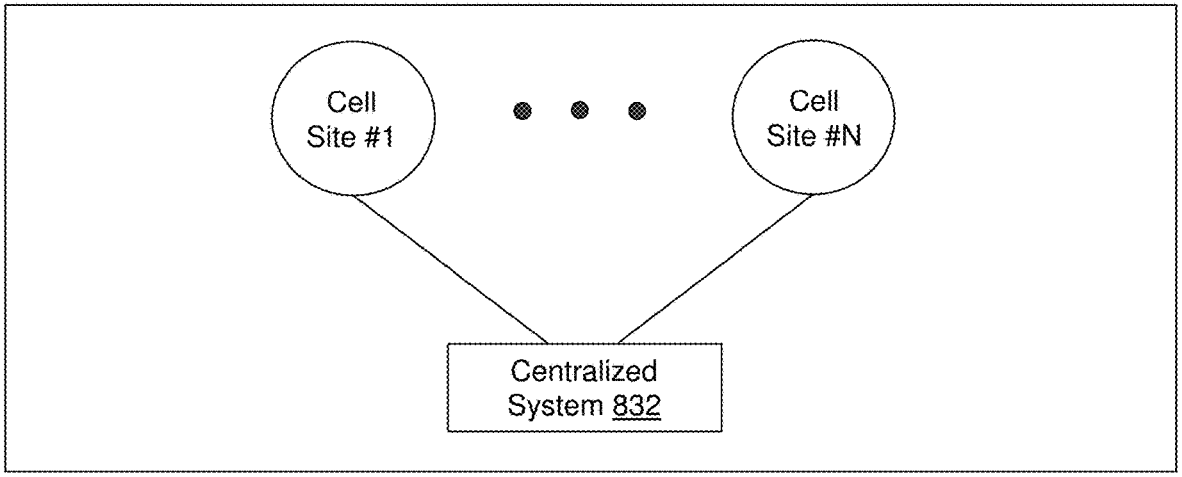
FIG. 26B depicts an illustrative embodiment of a centralized system managing cell sites according to aspects of the subject disclosure.
Figure 26C:
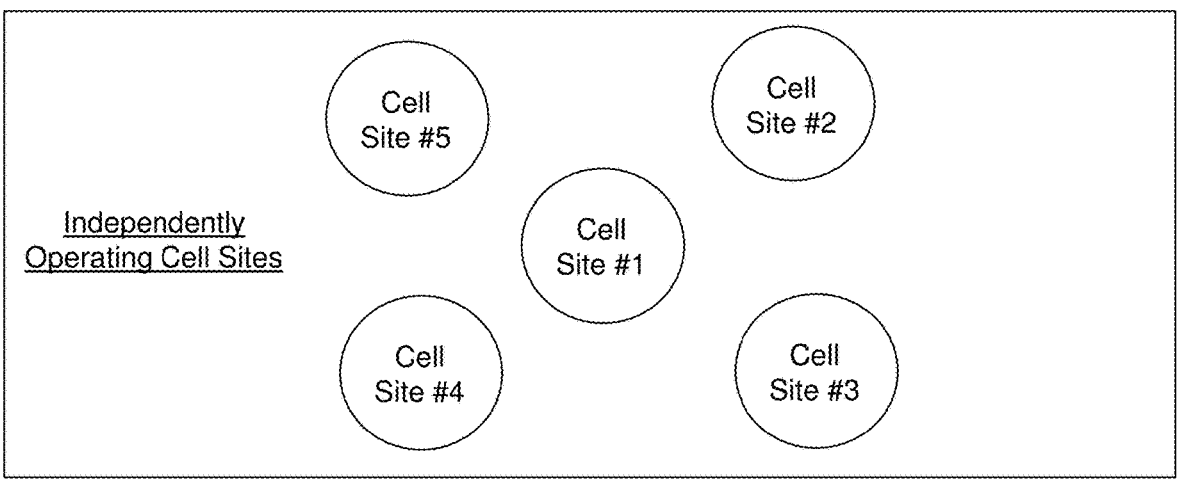
FIG. 26C depicts an illustrative embodiment of independently operating cell sites according to aspects of the subject disclosure.
Figure 26D:
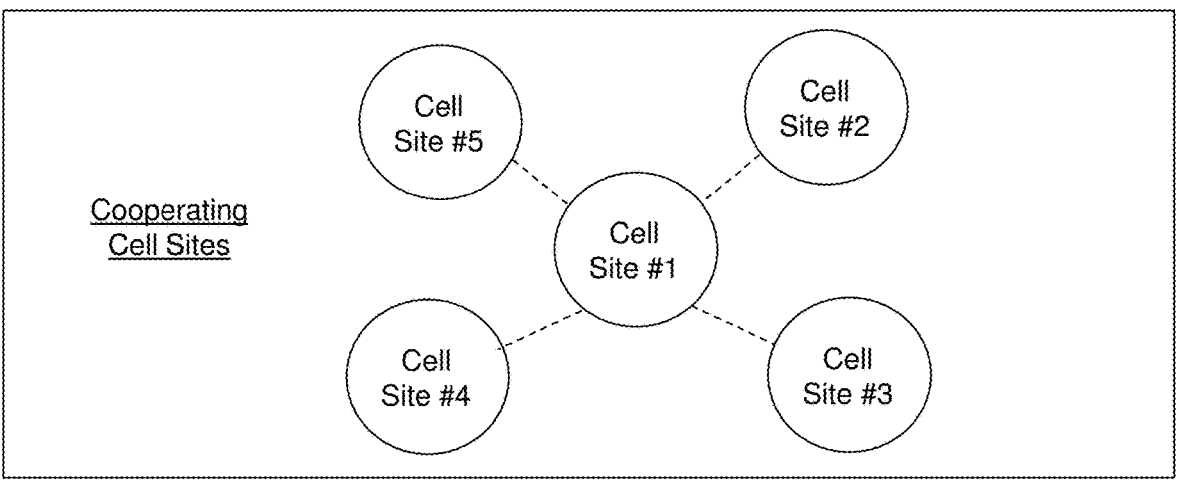
FIG. 26D depicts an illustrative embodiment of cell sites cooperating with each other according to aspects of the subject disclosure.

FIG. 26A depicts non-limiting illustrative embodiments of a method 800 for implementing link management in a communication system. In one embodiment, method 800 can be performed by a centralized system 832 that coordinates SINR measurements and corrective actions between cell sites as depicted in FIG. 26B. In an alternate embodiment, method 800 can be performed independently by each cell site without regard to adverse effects that may be caused by a particular cell site on neighboring cell site(s) as depicted in FIG. 26C. In another alternate embodiment, method 800 can be performed by each cell site, each communicating with one or more neighboring cell sites to reduce adverse effects caused by a particular cell site on neighboring cell site(s) as depicted in FIG. 26D. The embodiments of FIGS. 26B-26D can be combined in any fashion in relation to applications of method 800. For example, suppose method 800 is implemented independently by cell sites depicted in FIG. 26C. Further suppose the centralized system 832 of FIG. 26B receives SINR results from each of the cell sites performing method 800. In this illustration, the centralized system 832 can be configured to reverse or modify some (or all) of the independent actions of the cell sites of FIG. 26C depending on SINR measurements received by the centralized system 832 from the cell sites. Other combinations of FIGS. 26B-26D are possible and should be considered in relation to method 800.

For illustration purposes only, method 800 will now be described according to the centralized system 832 of FIG. 26B. Method 800 can begin at step 802 where a SINR measurement can be made by each cell site on a corresponding sector and/or path. Cell sites can be configured to perform SINR measurements over several iterations which can be averaged over time. Each cell site can share SINR measurements with the centralized system 832. The SINR measurements can include a SINR measurement for the cell site, a SINR measurement for each sector, a SINR measurement for each path, or combinations thereof. The SINR measurement for a sector can be an average of SINR measurements for the paths of the sector. The SINR measurement for the cell site can be an average of SINRs measurements of multiple sectors, or SINRs measurements of multiple paths. When SINR measurements have been shared by all cell sites, a determination can be made by the centralized system 832 at step 804 as to which of the cell sites, sectors, or paths has the lowest SINR measurement. The minimum SINR measurement can then be compared by the centralized system 832 in step 806 to one or more thresholds which may be established by a service provider as a minimum expected SINR performance for any particular cell site, sector, and/or path. If the minimum SINR measurement is not below the threshold, the centralized system 832 can proceed to step 802 and reinitiate measurements of SINR across multiple cell sites and corresponding sectors and/or paths.

If, however, the minimum SINR measurement of a particular cell site, sector or path is below the threshold, then corrective action can be taken by the centralized system 832 at step 808 to improve the SINR measurement of the cell site, sector or path in question. The corrective action can include, without limitation, filtering adjacent signals, adding gain, attenuating high signal power, filtering interference signals according to the embodiments of the subject disclosure, utilizing diversity optimization, utilizing 3G service optimization, adjusting mobile transmit parameters, tilting antennas to reshape cell site coverage, or any combination thereof.

Once corrective action has been executed by a cell site and/or UE, a determination can be made by the centralized system 832 at step 810 as to whether the SINR of the cell site, sector or path in question has improved. If there is no improvement, the corrective action can be reversed in whole or in part by the centralized system 832 at step 812, and measurements of SINR per cell site, sector and/or path can be repeated beginning from step 802. If, however, the corrective action did improve the SINR of the cell site, sector or path in question, then a determination can be made by the centralized system 832 at step 814 as to whether the corrective action implemented by the cell site and/or UE has had an adverse effect on other paths or sectors of the same cell site or neighboring cell sites.

In one embodiment, this determination can be made by the centralized system 832 by requesting SINR measurements from all cell sites, sectors, and/or paths after the corrective action has been completed. The centralized system 832 can then be configured to determine an average of the SINRs for all the cell sites, sectors, and/or paths for which the corrective action of step 808 was not applied. For ease of description, the cell site that initiated corrective action will be referred to as the "corrected" cell site, while cell sites not participating in the corrective action will be referred to as the "uncorrected" cell sites.

With this in mind, at step 816, the centralized system 832 can determine whether the SINR averages from the uncorrected cell sites, sectors or paths are the same or similar to the SINR averages of the uncorrected cell sites, sectors, and/or paths prior to the corrective action. If there is no adverse effect or a nominal adverse effect, then the centralized system 832 can be configured to maintain the corrective action initiated by the corrected cell site, sector and/or path and proceed to step 802 to repeat the process previously described. If, on the other hand, the average of the SINRs of the uncorrected cell sites, sectors or paths for which corrective action was not taken has been reduced below the SINR averages of these sites, sectors or paths prior to the corrective action (or below the threshold at step 806 or different threshold(s) established by the service provider), then the corrective action initiated by the corrective cell site, sector or path can be reversed in whole or in part by the centralized system 832 at step 812.

In another embodiment, step 816 can be implemented by establishing a minimum SINR values that are unique to each cell site, sector, and/or path. If after the corrective action the SINR measurements of the corrected cell site, sector and/or path has improved at step 810 and the SINR measurements of the uncorrected cell sites, sectors and/or paths are above the unique SINR values established therefor, then the corrective action can be maintained by the centralized system 832 and the process can be reinitiated at step 802. If, on the other hand, the SINR measurement of the corrected cell site, sector or path has not improved after the corrective action, or the SINR measurements of one or more uncorrected cell sites, sectors, and/or paths are below the unique SINR values established therefor, then the corrective action taken can be reversed in whole or in part by the centralized system 832 at step 812.

Method 800 can be adapted to use different sampling rates for SINR, and/or different thresholds. The sampling rates and/or thresholds can be temporally dependent (e.g., time of day profiles-morning, afternoon, evening, late evening, early morning, etc.). SINR profiles can be used to account for anomalous events (e.g., a sporting event, a convention, etc.) which may impact traffic conditions outside the norm of regular traffic periods. Thresholds used by method 800 can include without limitation: minimum thresholds used for analyzing SINRs of cell sites, sectors and/or paths prior to corrective action; corrective thresholds used for analyzing SINRs of corrected cell sites, sectors and/or paths, consistency thresholds used for analyzing SINRs from uncorrected cell sites, sectors and/or paths after corrective action, and so on. Method 800 can also be adapted to use other KPIs such as dropped calls, data throughput, data rate, accessibility and retain-ability, RSSI, density of user equipment (UEs), etc. Method 800 can also be adapted to ignore or exclude control channels when determining SINR measurements. That power levels from control channels can be excluded from SINR measurements. Method 800 can also be adapted to perform closed-loop methods for balancing uplink and downlink performance as described earlier for SON networks, cell sites, UEs, or combinations thereof. Method 800 can be adapted to obtain the noise components of SINR (EQ1) from power measurements described in the subject disclosure. Referring to FIG. 24, the RSSI measurements shown in FIG. 24 can be determined by measuring power levels at different spectral locations in the spectral components shown in FIG. 24.

As noted earlier, method 800 can also be adapted to the architectures of FIGS. 26C and 26D. For example, method 800 can be adapted for use by each cell site of FIG. 26C. In this embodiment, each cell site can independently perform SINR measurements per sector and/or path, perform analysis based on expected SINR threshold(s), mitigate below performance SINRs, verify corrective actions, and reverse when necessary corrective measures in whole or in part as described earlier. A distinct difference between this embodiment and that described for the centralized system 832 of FIG. 26B is that in this embodiment, each cell site can take corrective action without regard to adverse effects that may be caused to neighboring cell site(s) shown in FIG. 26C.

In the case of FIG. 26D, method 800 can adapted for use by each cell site with the additional feature that each cell site can be adapted to cooperate with its neighboring cell sites to avoid as much as possible adverse effects caused by corrective actions taken by any of the cell sites. In this embodiment, a corrected cell site can request SINR measurements of neighboring (uncorrected) cell sites, sectors or paths from the uncorrected cell sites themselves or a centralized system monitoring SINR measurements. Such requests can be made before or after correction action is performed by the corrected cell site. For example, before corrective action is taken, a cell site that needs correction can determine whether the SINR measurements of one or more neighboring cell sites, sectors or paths are marginal, average or above average when compared to expected SINR performance threshold(s). The cell site to be corrected can use this information to determine how aggressive it can be when initiating corrective action. After corrective action is taken, the corrected cell site can request updated SINR measurements from neighboring cell sites which it can then compare to threshold(s) established for the neighboring cell sites and determine therefrom whether to reverse the corrective action in whole or in part.

It is further noted that method 800 can be adapted to combine one or more of the foregoing embodiments for performing link conditioning in any one of the embodiments FIGS. 26B, 26C, and 26D such that combined implementations of method 800 are used to achieve a desirable RF link performance for clusters of cell sites in a network.

While for purposes of simplicity of explanation, the respective processes are shown and described as a series of blocks in FIG. 26A, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 27A:
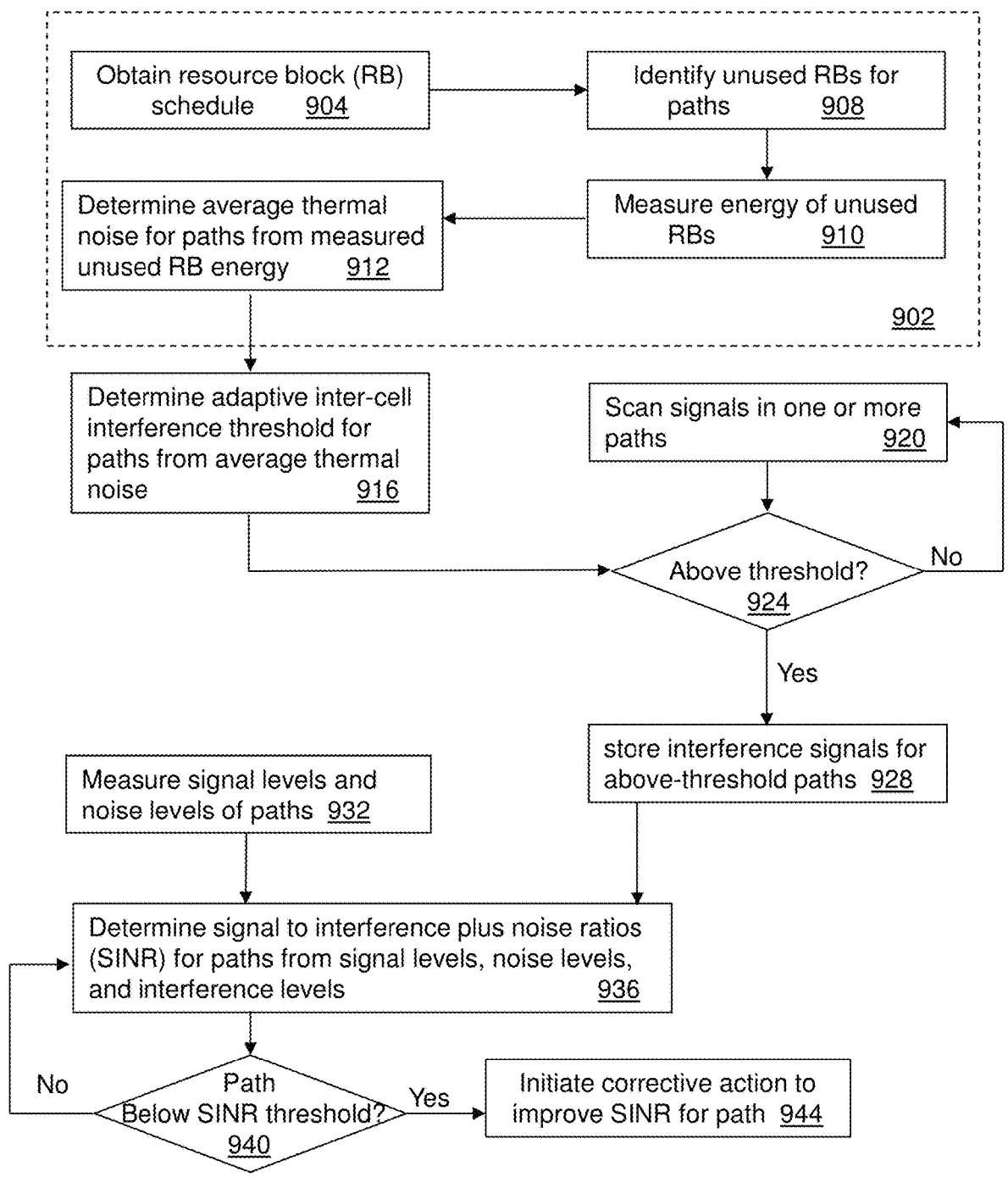
FIG. 27A depicts an illustrative embodiment of a method for determining an adaptive inter-cell interference threshold based on thermal noise measured from unused paths.

FIG. 27A depicts a non-limiting, illustrative embodiment of a method 900 for determining an adaptive inter-cell interference threshold based on thermal noise measured from unused wireless signal paths. Wireless signal paths can be, for example, channels, communication channels, cellular connections, spectral segments, and/or radio channels. In one or more embodiments, in step 904, the system and methods of the subject disclosure can be adapted to obtain one or more resource block (RB) schedules associated with one or more paths, one or more sectors, and/or one or more cell sites. For example, an LTE controller in a base station 16 (such as depicted in FIG. 4) can assign to UE's data packet traffic to certain resource blocks. The term base station and cell site may be used interchangeably in the subject disclosure. The UE's can access the resource block scheduling information in a control channel. In particular, the resource block schedule can include information regarding which of the scheduled resource blocks are used to carry data and which are unused. In one embodiment, the systems and methods of the subject disclosure can obtain from a transmit link (downlink) of the base station 16 parametric information relating to the downlink (e.g., a resource block or RB schedule, gain being used on the downlink, tilt position of the antenna, etc.). The downlink parametric information can be obtained by demodulating the transmit link. In an embodiment, the systems and methods of the subject disclosure can be adapted to obtain the downlink parametric information without demodulation (e.g., from a functional module of the base station). In step 908, the system and methods of the subject disclosure can be adapted to identify the unused resource block for certain wireless signal paths from the resource block schedule. Since RB schedule(s) can be obtained for multiple paths, sectors and/or cell sites, the unused resource blocks can be associated with one or more cell sites, one or more sectors, and/or one or more paths.

In one or more embodiments, in step 910, the system and methods of the subject disclosure can be adapted to measure signal energy levels during the unused resource blocks. In one embodiment, the resource blocks that are scheduled for use in carrying data information will bear RF signals during particular portions of frequency/time identified by the resource block schedule. By comparison, when the resource blocks are not scheduled to carry data information, the resource blocks should not bear RF signals during particular portions of frequency/time identified by the resource block schedule.

Put another way, no active transmission power should be allocated to the time-frequency signal space by a transmitting LTE UE during the unused resource blocks, while active transmission power is expected to be allocated to the time-frequency signal space by a transmitting LTE UE during "used" resource blocks. Therefore, during the unused resource blocks, a wireless signal path should exhibit a lower energy level than during the "in use" resource blocks. In one embodiment, signal energy levels in unused resource blocks can be measured for one or more wireless signal paths, one or more sectors, or one or more sectors. Generally, the energy measured in the unused resource blocks should be thermal noise only. However, if inter-cell (i.e., adjacent cell site) interference is present, the energy measured in one or more unused resource blocks may be above an expected thermal noise level.

In one or more embodiments, in step 912 the system and methods of the subject disclosure can be adapted to determine an average thermal noise level from the measured signal energy levels of the wireless signal path(s) during unused resource blocks. In one embodiment, the average system noise can be determined per resource block of a particular path. In one embodiment, the average system noise can be determined across all unused resource blocks of the particular path. In one embodiment, the average system noise can be determined across a subset of unused resource blocks of the particular path. In one embodiment, the average system noise can be determined for unused resource blocks across all paths of a particular sector. In one embodiment, the average system noise can be determined for unused resource blocks across multiple sectors. In one embodiment, the average system noise can be determined for unused resource blocks across multiple cell sites. Based on the foregoing illustrations, any combination of averaging of energy measurements across one or more unused resource blocks is possible for determining an average thermal noise at step 912.

A sample of unused resource blocks can be selected so that measurements and thermal noise averaging is distributed over a time period or can be selected based on another organized factor. For example, the sample of unused resource blocks could be based on the relative traffic loading, where greater or lesser numbers of unused resource blocks could be selected for measurement and thermal noise averaging can be based on the data traffic load. In another example, the sample of unused resource blocks could be selected for measurement and thermal noise averaging based on changes in noise and/or error rate conditions for the wireless signal paths. Noise and/or error rate conditions can be monitored and classified as improving, deteriorating, and/or steady state. Under improving or steady state noise/error rate trends, a reduced set of unused resource blocks can be selected for measurement of signal energy levels and thermal noise averaging determined therefrom, while a larger set of unused resource blocks can be selected under deteriorating noise/error rate conditions. The sample of unused resource blocks selected can also depend on known or scheduled events, time of day, day of the week, or combinations thereof. For example, traffic conditions may vary during time of day. Thus, traffic conditions can be profiled daily and by geography (e.g., heavy traffic from noon to late afternoon, lighter traffic at other times). Events such as sporting events or conventions can also change traffic conditions.

Accordingly, the system and methods of the subject disclosure can measure signals levels and determine thermal noise averages based on a sample of unused resource blocks selected according to any number of techniques including without limitation distributing measured energy levels of unused resource blocks over a time period, accounting for traffic conditions at different times of the day, scheduled events that can change traffic conditions, and/or responding to trends in noise/error rate levels. In another embodiment, the measured energy levels can be weighted to emphasize or deemphasize certain measurements based on criteria such as location of wireless signal paths, relative importance of wireless signal paths, and/or how recently the measurement was collected. The average thermal noise level can be determined from the weighted sample of measured energy levels. In one embodiment, the average thermal noise level can be adjusted. Additionally, certain measured energy levels can be excluded from a thermal noise averaging calculation (e.g., excluding unexpectedly high measured energy levels in certain unused resource blocks, excluding measured energy levels that exceed a threshold, and so on).

In one or more embodiments, in step 916 the system and methods of the subject disclosure can be adapted to determine an adaptive inter-cell interference threshold for one or more wireless signal paths, one or more sectors, and/or one or more cell cites based on the average thermal noise level determined at step 912. In one embodiment, the adaptive inter-cell interference threshold can be based on the average thermal noise level determined at step 912 with no additional factors. In another embodiment, the adaptive inter-cell interference threshold can be determined from a sum of a threshold supplied by a service provider and the average noise level determined at step 912.

In one or more embodiments, in step 920 the system and methods of the subject disclosure can be adapted to scan signals in one or more wireless paths. The scanned signals can represent signals measured in one or more resource blocks of one or more wireless paths. If a resource block schedule is available to identify which resource blocks are in use as in the present case, then the scanned signals can represent signals measured in one or more "used" resource blocks. Alternatively, in another embodiment, whether or not a resource block schedule is available, the scanned signals can represent signals measured in one or more resource blocks that may include used and unused resource blocks. In one or more embodiments, the scanned signals can be compared to the adaptive inter-cell interference threshold at step 924 to detect interference signals that may adversely affect communications between UEs and base station(s). If the scanned signals exceed the adaptive intercell interference threshold in step 924, then the interference signal energies and frequencies are stored, in step 928.

In one or more embodiments, in step 932 the system and methods of the subject disclosure can be adapted to measure signal energy levels and noise energy levels of wireless signal paths. Again, the wireless signal paths can be selected for measurement of signal levels and noise levels based on one or more criteria, such as changes in noise or error rate trends, criticality of one or more wireless signal paths, loading of one or more wireless signal paths, availability of system resources, among other possible factors. The measured noise levels can include, for example, the noise factors previously described for EQ1, e.g., in-band co-channel interference ($N_c$), adjacent band noise in guard bands or the operator's other carriers ($N_{adj}$), $N_{comp}$ interference in the same overall frequency band from other operators, and $N_{out}$ out-of-band noise. Thermal noise (N) in the present case can be based on the average thermal noise determined at step 912.

In one or more embodiments, in step 936 the system and methods of the subject disclosure can be adapted to determine signal-to-interference plus noise ratios (SINR) for the wireless signal paths based on measured signal levels, noise levels, and interference levels. The SINR can be determined by processing, in a SINR model, the measured signal and noise energy levels from step 932 and the stored above-threshold interference signal energy levels from step 928. The SINR model can be the equation for SINR calculation described above (EQ1). In one embodiment, SINR values can be determined for all wireless signal paths or for selected wireless signal paths. The wireless signal paths can be selected based on one or more criteria, such as changes in noise or error rate trends, criticality of one or more wireless signal paths, loading of one or more wireless signal paths, and/or availability of system resources. In one embodiment, SINR values can be generated and reported on a periodic basis. In one embodiment, SINR values can be generated and reported responsive to a system encountering communication issues between UEs and one or more cell sites.

In one or more embodiments, in step 940 the system and methods of the subject disclosure can be adapted to compare SINR values to one or more SINR thresholds to determine if any of the wireless signal paths is exhibiting an SINR value that is below the SINR threshold. If the a wireless signal path is operating with a below-threshold SINR, then, in step 944 the system and methods of the subject disclosure can be adapted to initiate a corrective action to improve the SINR for the wireless signal paths, as described above in relation to FIGS. 26A-26D.

While for purposes of simplicity of explanation, the respective processes are shown and described as a series of blocks in FIG. 27A, respectively, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 27B:
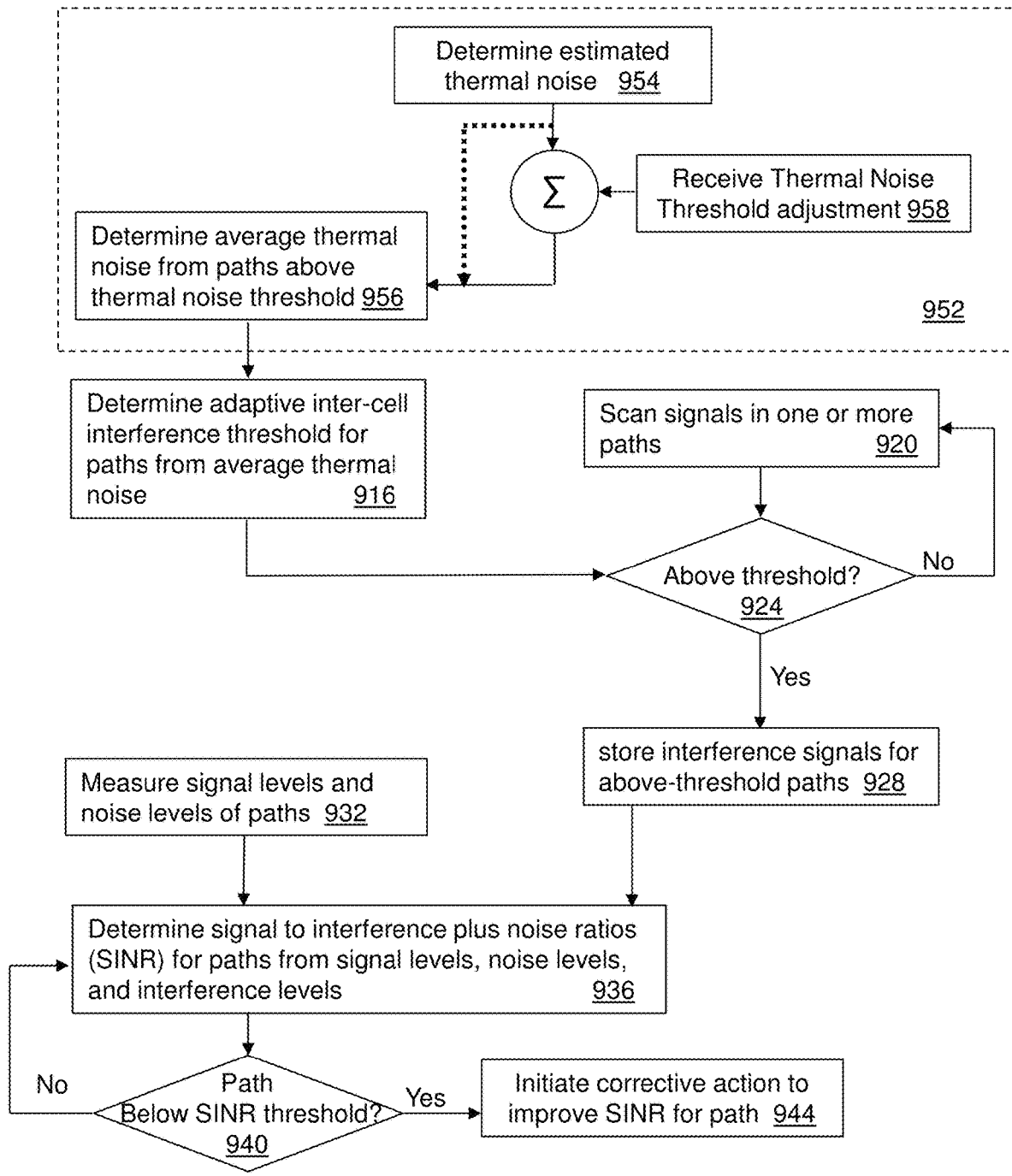
FIG. 27B depicts an illustrative embodiment of another method for determining an adaptive inter-cell interference threshold based on an estimated thermal noise energy.

FIG. 27B depicts an illustrative embodiment of another method 950 for determining an adaptive inter-cell interference threshold based on an estimated thermal noise energy. In situations where resource block schedule(s) cannot be obtained, method 950 replaces block 902 of FIG. 27A with block 952 of FIG. 27B. In one or more embodiments, in step 954, the system and methods of the subject disclosure can be adapted to determine an estimated thermal noise energy levels at wireless signal paths of the system. In one embodiment, the thermal noise energy levels can be estimated for one or more wireless signal paths, one or more sectors, or one or more cell sites. In one embodiment, all wireless signal paths of the system can be associated with the same estimated thermal noise energy. In one embodiment, different wireless signal paths can be associated with different estimated thermal noise levels based on one or more criteria, such as location of the wireless signal path and/or noise/error rate trends for the wireless signal path. In one embodiment, the estimated thermal noise level can be determined by identifying resource blocks with the lowest signal levels or closest to an expected thermal noise level. In an embodiment, the system and methods of the subject disclosure can be adapted to use all measured signal levels or a subset of such measurements. In an embodiment, the system and methods of the subject disclosure can be adapted to average all measured signal levels or a subset of such measurements to estimate the thermal noise. In an alternative embodiment, a default estimated thermal noise level can be obtained from a service provider. The default thermal noise level can be modified to account for one or more criteria, such as the location of the wireless signal path.

In one or more embodiments, in step 958 the system and methods of the subject disclosure can be adapted to adjust the estimated thermal noise energy according to a thermal noise threshold adjustment to create an adjusted estimated thermal noise energy. In one embodiment, the thermal noise threshold adjustment can be provided by a service provider. In one embodiment, the thermal noise threshold adjustment can be specific can different between wireless signal paths, sectors or cell sites. In one embodiment, all wireless signal paths of the system can be associated with the same thermal noise threshold adjustment. In one embodiment, the thermal noise threshold adjustment can be determined by the system or device by accessing a configuration that is specific to a wireless signal path. In one embodiment, a default thermal noise threshold adjustment can be used. The default thermal noise threshold adjustment can be modified to account for one or more criteria, such as the location of the wireless signal path or current noise/error trend information.

In one or more embodiments, in step 956 the system and methods of the subject disclosure can be adapted to determine an average thermal noise level for the wireless signal paths, sectors, or cell sites based on averages of the adjusted estimated thermal noise. In one embodiment, the average thermal noise level for the wireless signal paths, sectors or cell sites can be based on averaging of the unadjusted estimated thermal noise of step 954. Steps 916-944 can be performed as described above in method 900.

It is further noted that the methods and systems of the subject disclosure can be used in whole or in part by a cellular base station (e.g., macro cell site, micro cell site, pico cell site, a femto cell site), a wireless access point (e.g., a Wi-Fi device), a mobile communication device (e.g., a cellular phone, a laptop, a tablet, etc.), a commercial or utility communication device such as a machine-to-machine communications device (e.g., a vending machine with a communication device integrated therein, an automobile with an integrated communication device), a meter for measuring power consumption having an integrated communication device, and so on. Additionally, such devices can be adapted according to the embodiments of the subject disclosure to communicate with each other and share parametric data with each other to perform in whole or in part any of embodiments of the subject disclosure.

It is further noted that the methods and systems of the subject disclosure can be adapted to receive, process, and/or deliver information between devices wirelessly or by a tethered interface. For example, SINR information can be provided by the cell sites to a system by way of a tethered interface such as an optical communication link conforming to a standard such as a common public radio interface (CPRI) referred to herein as a CPRI link. In another embodiment, a CPRI link can be used to receive digital signals from an antenna system of the base station for processing according to the embodiments of the subject disclosure. The processed digital signals can in turn be delivered to other devices of the subject disclosure over a CPRI link. Similar adaptations can be used by any of the embodiments of the subject disclosure.

Although reference has been made to resource blocks in the methods and systems of the subject disclosure, the methods and systems of the subject disclosure can be adapted for use with any spectral segment of any size in the frequency domain, and any frequency of occurrence of the spectral segment in the time domain. Additionally, the methods and systems of the subject disclosure can be adapted for use with adjacent spectral segments in the frequency domain, spectral segments separated from each other in the frequency domain, and/or spectral segments of different wireless signal paths, sectors, or cell sites. It is further noted that the methods and systems of the subject disclosure can be performed by a cell site operating independently of the performance of other cell sites, by a cell site operating in cooperation with other adjacent cell sites, and/or by a central system controlling operations of multiple cell sites.

LTE downlink signals are modulated using orthogonal-frequency domain multiplexing, or OFDM. The LTE uplink, on the other hand, uses single-carrier frequency domain multiple access, or SC-FDMA. SC-FDMA was selected for the LTE uplink because it has a much lower peak-to-average than OFDM, and therefore, it helps reduce the power consumption of mobile phones. However, the use of SC-FDMA also introduces problems. SC-FDMA is very susceptible to interference. Even a small amount of interference can degrade the performance of an entire LTE cell.

Figure 28:
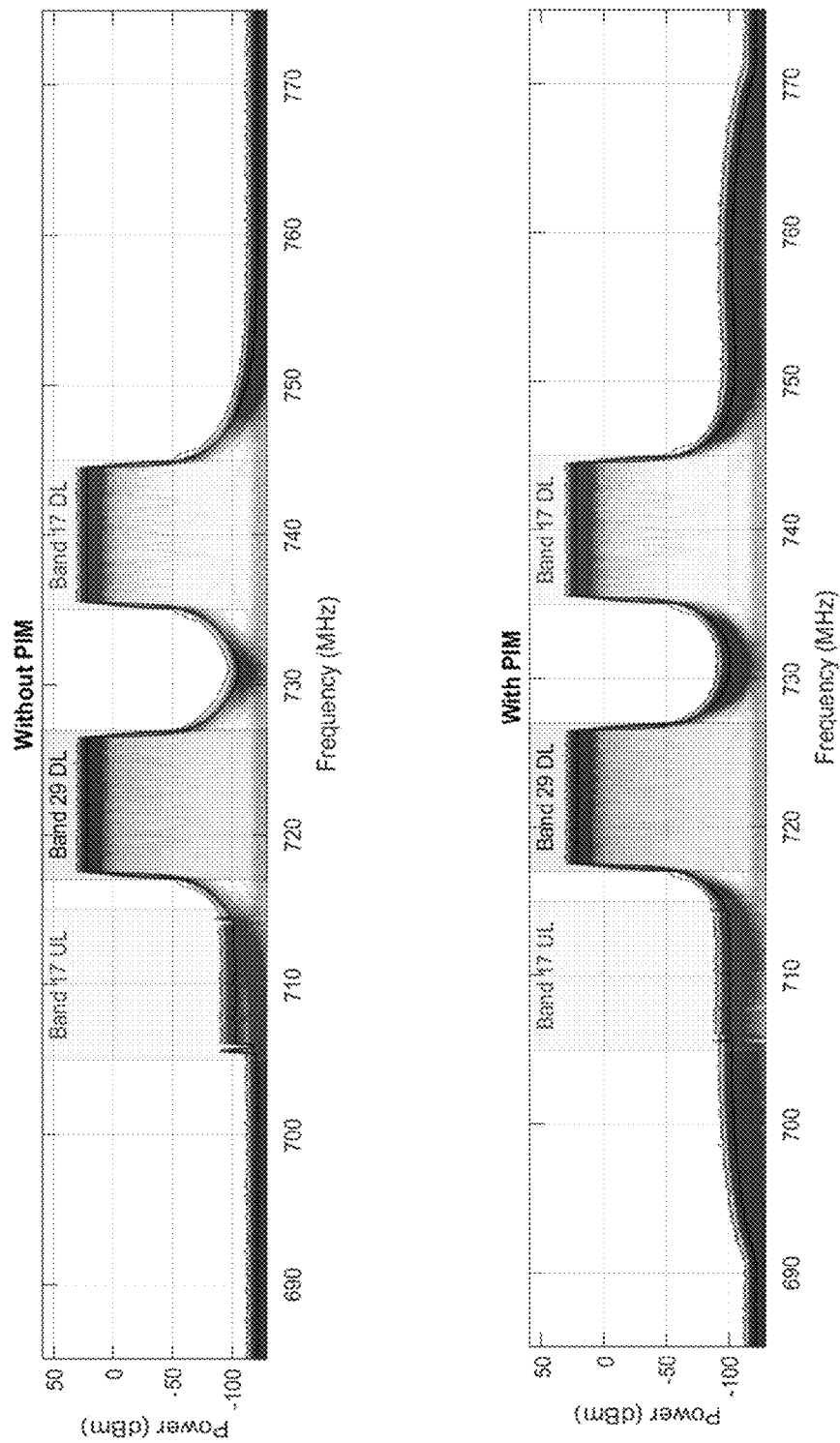
FIG. 28 depicts an illustrative embodiments of a system affected by PIM interference.

Another form of interference that the embodiments of the subject disclosure can be adapted to mitigate is Passive Intermodulation Interference (PIM). PIM is quickly becoming a common form of interference affecting 4G LTE networks. PIM occurs when RF energy from two or more transmitters is non-linearly mixed in a passive circuit. PIM becomes interference to a cellular base-station when one of the intermodulation products is received by a base-station in one or more of its receive channels. PIM can occur, for example, in a 700 MHz LTE network. For example, a service operator can operate 10 MHz LTE networks in band 17 and band 29. When base-stations operating in these bands are co-located, there is a high risk of degrading the performance of the band 29 receiver due to PIM. The non-linear mixing of the band 17 and band 29 downlinks produce a $3^{rd}$ order intermodulation (IM) energy that occurs in the band 17 uplink channel. This situation is illustrated in FIG. 28.

The most common sources of PIM are poor RF connections, damaged cables, or poor antennas. However, PIM can also be caused by metallic objects in front of the antennas. This situation is often observed when the base-station is installed in a roof-top, and the antennas are near rusted ducts, vents, and other metallic structures capable of mixing and reflecting the RF energy.

The conventional approach to removing PIM interference requires knowledge of the transmit signals. These algorithms work by injecting a digitized version of the transmitting signals into a mathematical model. The mathematical model is capable of generating an intermodulation signal similar to what is generated by an actual PIM source. The intermodulation signal produced by the mathematical model is then correlated against the receive signal. If a match is found, the algorithm attempts to remove as much intermodulation energy as possible. However, the conventional PIM cancellation approach cannot be used when there is no knowledge of the transmitting signals. Therefore, a new approach to PIM mitigation that operates without knowledge of the transmitting signals would be desirable.

The subject disclosure describes non-limiting embodiments for reducing the impact of PIM on an uplink receiver, without knowledge of the downlink signals producing the PIM interference. It will be appreciated that the embodiments of the subject disclosure previously described can be adapted to mitigate PIM as will be described below. Accordingly, such adaptations are contemplated by the subject disclosure.

Figure 29:
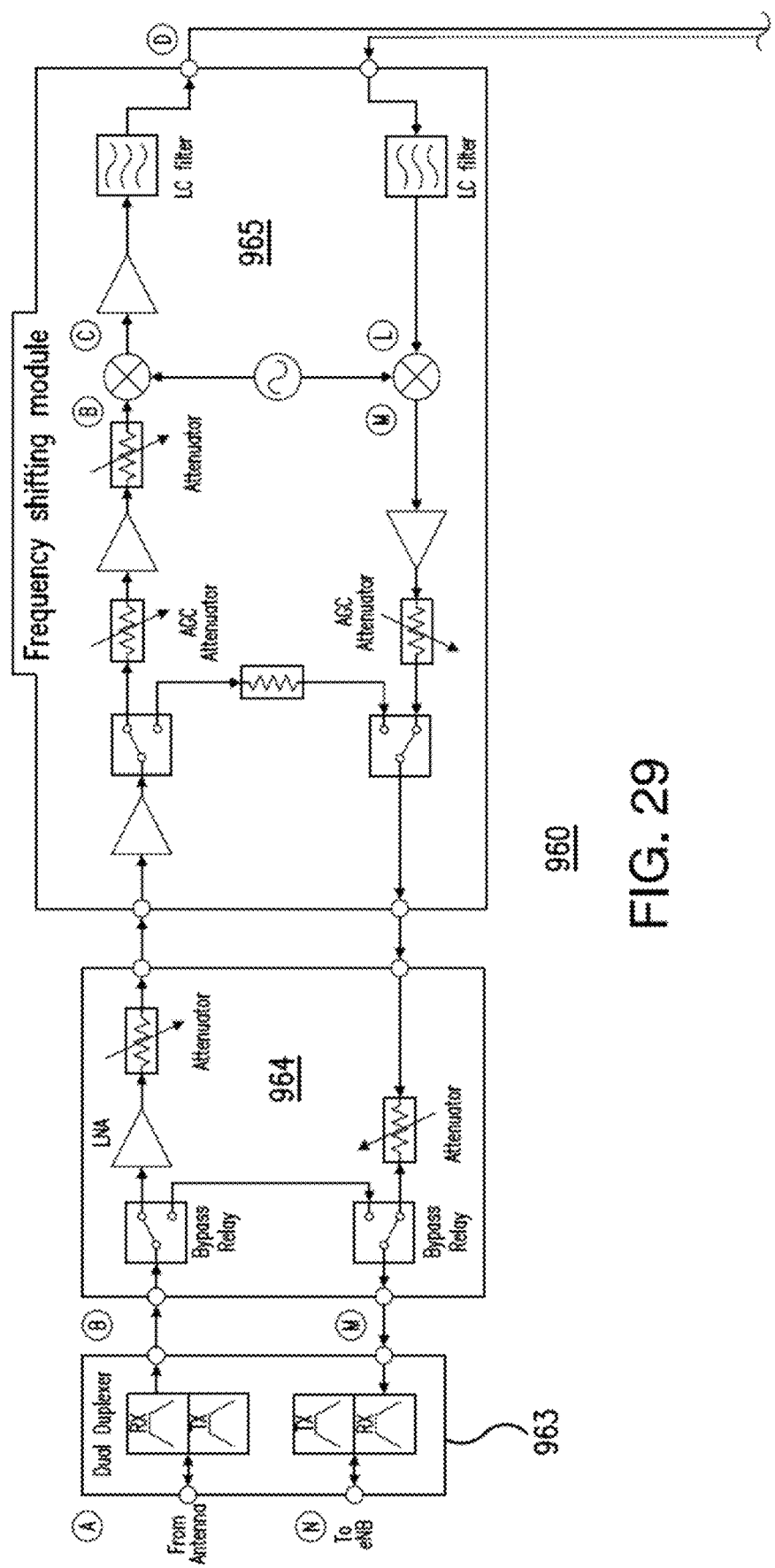
FIG. 29 depicts an illustrative embodiment of a system for mitigating PIM interference.
Figure 29:
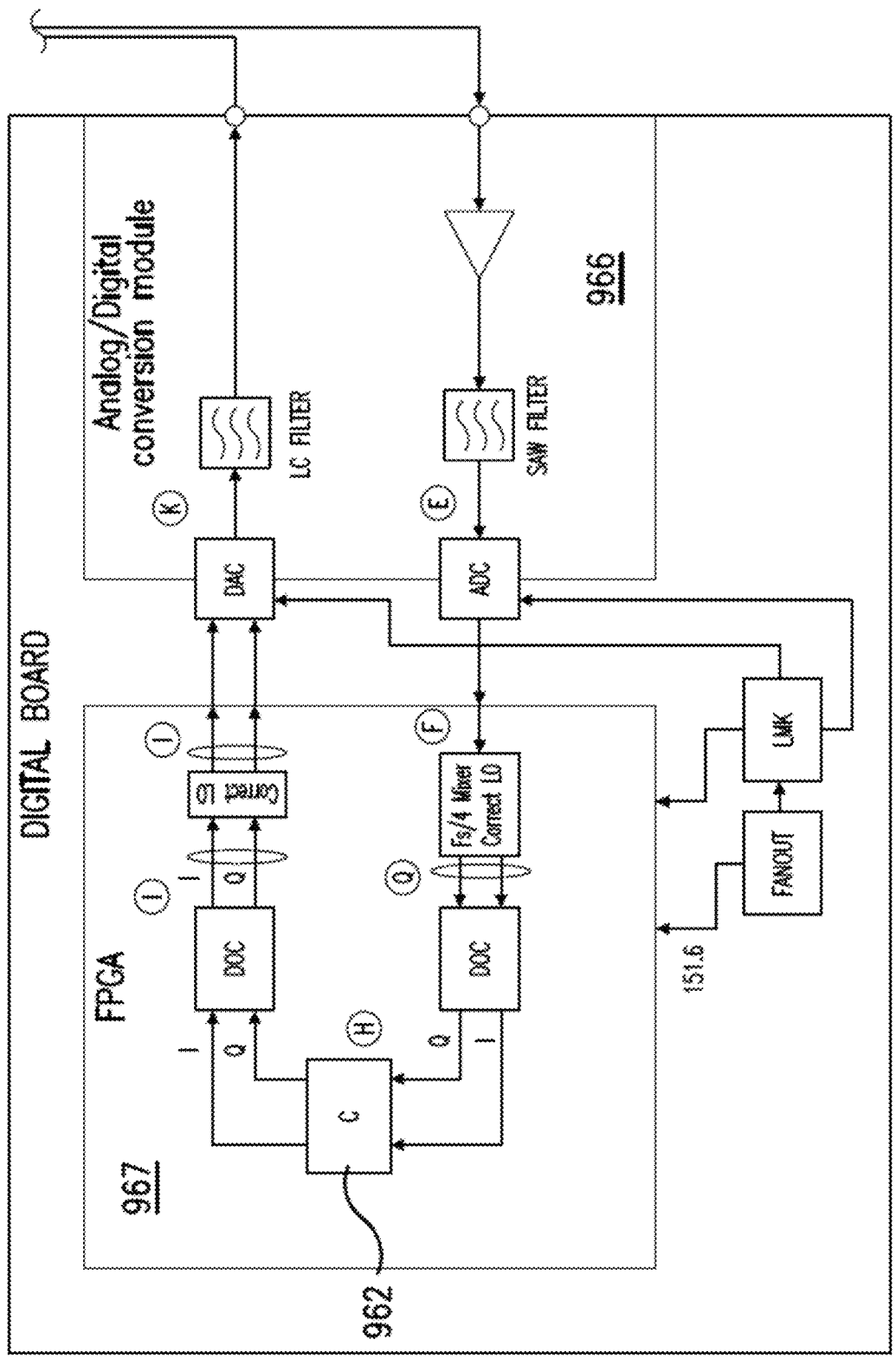

FIG. 29 depicts an illustrative embodiment of a system 960 for mitigating interference (including PIM interference). System 960 can comprise a dual duplexed module 963 that processes transmit and receive paths of an antenna (not shown) and a base station processor (not shown). The dual duplex module 963 can supply a received RF signal to an LNA module that comprises a low noise amplifier for amplifying, for example, an antenna signal and a bypass mode that bypasses the functions of the system when an operation fault is detected in the system 960. The attenuator can set the received RF signal level to a predetermined attenuation. The RF signal generated by the LNA module 964 can be supplied to a frequency shifting module 965 that converts the RF signal at a given carrier frequency, utilizing mixers, amplifiers and filters, to a down-converted signal at an intermediate frequency (IF).

The down-converted signal can then be supplied to an analog and digital conversion module 966 that utilizes digital-to-analog conversion to digitize the down-converted signal and thereafter utilizes analog-to-digital conversion to convert a processed version of the down-converted signal back to an analog signal. The digitized down-converted signal can be supplied to an FPGA module 967 that extracts I and Q signals from the digitized down-converted signal, processes these signals via a signal conditioning module 962 (labeled "C"), and supplies the processed I and Q signals to a combination of the analog and digital conversion module 966, the frequency shifting module 965, the LNA module 964, and the dual duplexer module 963, which together generate an RF signal that has been processed to remove interference (including PIM interference) impacting SC-FDMA systems. The processed RF signal is then supplied to a base station processor for further processing.

It will be appreciated that system 960 can be an integral component of the base station processor (e.g., eNodeB). In other embodiments, the processing resources of the base station processor can be configured to perform the functions of system 965.

As noted above, the module 962 can be configured to perform signal conditioning to reduce interference (including PIM interference) impacting SC-FDMA systems. Module 962 can be configured to distinguish SC-FDMA signals from interfering signals such as PIM. SC-FDMA signals have many unique characteristics in both the time and frequency domains. Certain frequency and time domain characteristics are dictated by the LTE standard and can be used to identify a unique signal profile for legitimate LTE signals. Interfering signals, on the other hand, typically have a very different set of time and frequency characteristics or signal profile.

As an example, consider the case of PIM interference generated in a roof-top by two LTE base-stations. The LTE downlink signals from the base-stations mix to produce an intermodulation product that interferes with the uplink channel used by one of the base-stations to receive signals from mobile or stationary communication devices. In this illustration, the interfering PIM signal is generated by a nonlinear mixing of two LTE downlink signals, modulated using OFDM. The profile of the PIM signal is unique, and quite different from the profile of a desired SC-FDMA uplink channel signal unaffected by PIM interference. One of the signal profile differences is the peak-to-average power ratio (PAPR). The PAPR of LTE uplink signals range from 7 to 8.5 dB. The PAPR of a $3^{rd}$ intermodulation product created by the mixing of two LTE downlink signals is in the range of 18 to 30 dB.

When PIM interference is present, the signal received by the base-station is the sum of the SC-FDMA signals transmitted by the UEs (desired signal), which has a PAPR under 10 dB, and the PIM signal (undesired signal), which has a PAPR of 18 to 30 dB. Since PIM energy has a much higher PAPR, most of the energy in the peaks of the received signal come from PIM and not from the UEs. In certain embodiments, clipping techniques can be used to reduce the amount of PIM energy in the receive signal.

In an embodiment, for example, the impact of PIM interference can be reduced by reducing the peak-to-average ratio of a received signal affected by PIM to expected levels. This can be accomplished with a circular clipper that limits or clips the peaks of an SC-FDMA uplink channel signal affected by PIM. Since the PIM signal has a much higher PAPR than the PAPR of an unaffected uplink channel signal, most of the energy in the peaks of the received signal come from PIM and not from the UEs. Therefore, clipping techniques can be used to reduce the amount of PIM energy in the receive signal. For example, if the PAPR of the received signal is 25 dBs, a clipper can be configured to clip the peak of the signals that exceed a PAPR of 10 dB. The result is a signal with a PAPR of around 10 dB, and with an improved signal-to-interference ratio.

Figure 30A:
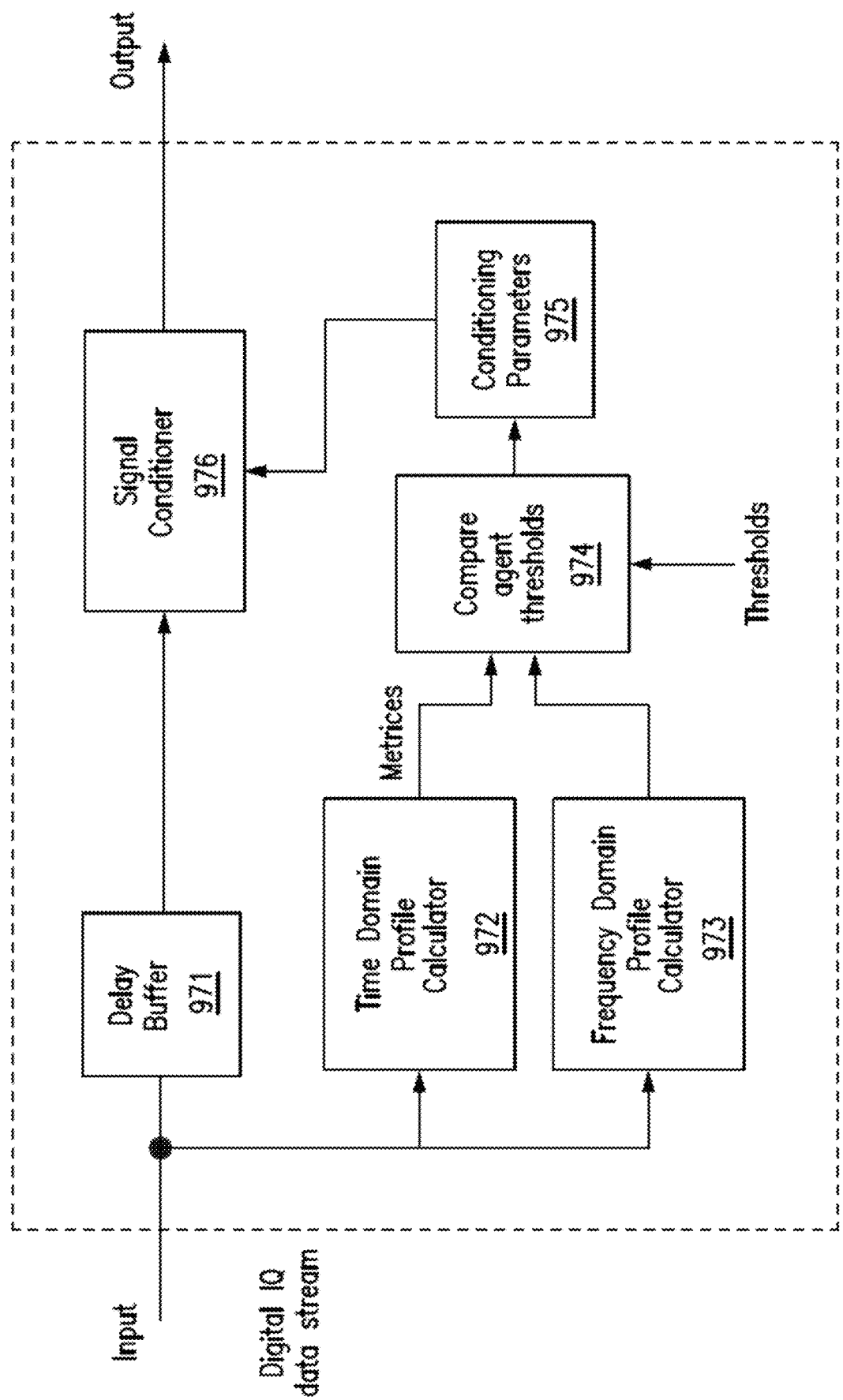
FIG. 30A depicts an illustrative embodiment of a module of the system of FIG. 29.

FIG. 30A depicts an illustrative embodiment of the module 962 of the system 960 of FIG. 29. The input is assumed to be the signal received on the LTE uplink channel (represented by the I and Q signals of the digitized down-converted signal), which is the sum of the signal of interest (SC-FDMA components) and the interfering signal or signals. The input signal is delayed using a delay buffer 971. While the signal is being delayed, the profile of the signal is calculated. The time-domain profile calculator 972 calculates metrics in the time domain. These metrics can include mean, median, peak, and mathematical combination of them, such as peak to average ratio. The frequency-domain profile calculator 973 calculates metrics in the frequency domain. These metrics can include occupied bandwidth, shape of the power spectral density, resource block utilization, etc.

The metrics computed by the time and frequency profile calculators 972, 973 can be compared by a comparator module 974 against a set of time domain and/or frequency domain thresholds. The time-domain and/or frequency-domain thresholds can be pre-determined based on measurements of desired LTE signals without interference. If the time-domain threshold and/or frequency-domain threshold is exceeded, signal conditioning techniques can be applied to the received signal based on parameters generated by a conditioning parameters module 975.

The signal conditioning technique used by a signal conditioner 976 depends on which time domain or frequency domain metric exceeds its corresponding threshold, and the parameters supplied by the conditioning parameters module 975. For example, where PIM is interfering with a SC-FDMA signal, the measured peak-to-average ratio will exceed the threshold for SC-FDMA. In this case, the signal conditioner 976 can be configured with a clipper that reduces the peaks of the signal based on time domain and/or frequency domain parameters supplied to the signal conditioner 976 to enable the clipper function to restore the peak-to-average ratio to normal levels for SC-FDMA signals, thereby reducing the power of the PIM interferer. The collective processing delay of the time-domain and frequency-domain profile calculators 972, 973, threshold comparisons by the comparator module 974, and generation of conditioning parameters by the conditioning parameters module 975 is approximately the same delay added to the signal by the delay buffer 971.

Figure 30B:
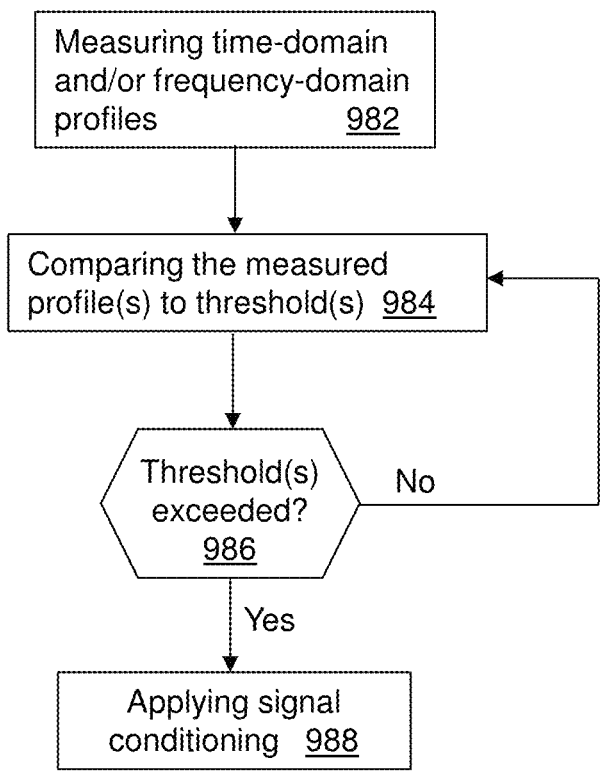
FIG. 30B depicts an illustrative embodiment of a method utilized by the module of FIG. 29.

In certain embodiments, the foregoing embodiments can be described by the flow diagram of FIG. 30B. According to this flow diagram, module 962 can be configured to reduce PIM interference by:
 step 982: measuring the time domain and/or frequency domain profile(s) of the received signal, comprised of the sum of the desired signal(s) and interfering signal(s)
 step 984: comparing the measured profile(s) against predetermined profile thresholds
 step 986: determining if measured profile(s) exceeds the thresholds
 step 988: applying signal conditioning techniques to the combined signal according to time domain and/or frequency domain parameters, when the measured profile(s) exceeds the thresholds In certain embodiments, the frequency domain and/or time domain profile thresholds can be pre-determine based on known signal characteristics of desired uplink signals without PIM interference. In other embodiments, the frequency domain and/or time domain profile thresholds can be determined dynamically based on historical measurements taken from the received signal comprising the sum of the desired signal(s) and interfering signal(s) (e.g., utilizing rolling averages, and/or other statistical techniques). Signal conditioning can be applied when time domain or frequency domain profile metrics that exceed a corresponding time domain or frequency domain threshold.

Signal conditioning techniques can include, but are not limited to:
 limiting or clipping of the signal amplitude, magnitude, or power; and/or
 frequency domain filtering (low pass, band pass, or notch)
Time-domain profile metrics can include, but are not limited to:
 measuring the mean, median, and peak power level of the received signal;
 averages of the above measurements;
 ratios of the above measurements;
 making measurements synchronized to the desired signal timing. This can include making measurements synchronized with the air-interface timing, including measurements performed over a symbol time, slot, subframe, and/or frame; and/or
 making measurements asynchronously Frequency-domain profile metrics can include, but are not limited to:
occupied bandwidth;
shape of the spectrum density; and/or
resource block utilization It will be appreciated that the foregoing embodiments can be applied to any type of RF signal affected by interference, as long as the profile of the desired signals and the interference are significantly different. Accordingly, the embodiments of the subject disclosure for reducing interference is not limited to LTE signals and/or PIM interference. Accordingly, a system can be adapted to filter interference affecting any type RF signal that can be profiled in the time domain and/or frequency domain for its desired characteristics relative to interference. It is further noted that module 962 is not limited to a clipping technique. Frequency and/or time domain filtering techniques used in place of, and/or combined with, clipping or signal limiting methods can also be applied to the subject disclosure. For example, spatial filtering and/or polarization selection techniques or combinations thereof can be used in place of clipping or signal limiting methods.

Additionally, RF signals being filtered for interference can be obtained over a CPRI interface, an analog cable coupled to the antenna receiving the RF signals, or a combination thereof. In yet other embodiments, the RF signals being filtered for interference can be received from MIMO antennas. In other embodiments, the PIM interference algorithm described above can be adapted to make use of a known transmitter of one or more base stations being a source of PIM interference. For example, by knowing that certain transmitters of one or more base stations is a source for PIM interference, the PIM interference algorithm can be adapted to more precisely pinpoint PIM interference at expected frequency ranges, power levels, and so on, which can speed up the algorithm and thereby reduce chances of a false positive or a false negative. It will be further appreciated that any of the embodiments of the subject disclosure can be combined in whole or in part and/or adapted in whole or in part to the foregoing embodiments associated with the descriptions of FIGS. 29, 30A and 30B.

Figure 31A:
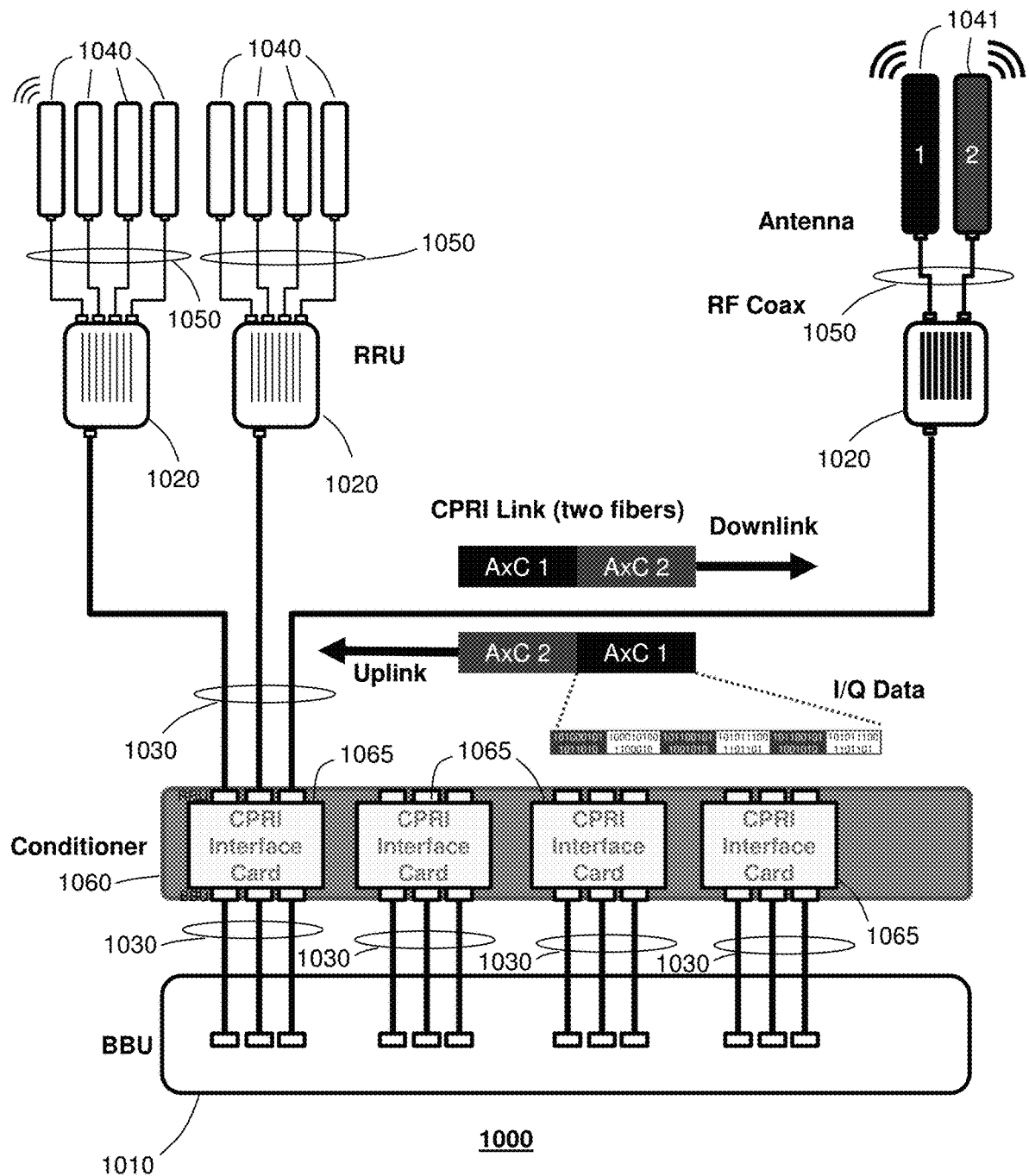
FIG. 31A illustrates a system for conditioning uplink signals.

FIG. 31A illustrates a system 1000 for conditioning uplink signals. As illustrated in FIG. 31A, a baseband processor unit (BBU) 1010 comprises a plurality of baseband processors and interfaces or connectors for connection to a remote radio unit (RRU) 1020 through a plurality of fiber optic cables 1030. BBU 1010 processes downlink data signals for transmission to mobile or stationary UEs (not illustrated) and uplink data signals received from mobile or stationary UEs. BBU 1010 integrates multiple lines of common public radio interface (CPRI) antenna carrier data in full duplex at high speed over the fiber optic cables 1030.

RRU 1020 transmits and receives radio frequency (RF) signals from one or more antennas 1040 through RF coaxial cables 1050. RRU 1020 contains circuitry to convert the baseband digital signals received from BBU 1010 to RF signals, and vice-versa.

Inserted between BBU 1010 and RRU 1020 is a conditioner 1060. In an embodiment, conditioner 1060 can be configured to output signals based on a predefined protocol such as a Gigabit Ethernet output, an open base station architecture initiative (OBSAI) protocol, or CPRI protocol, among others. Conditioner 1060 can comprise an adaptive filter as illustrated in FIGS. 7 and 8 and can execute signal processing algorithms described in the subject disclosure. Conditioner 1060 can receive digital signals, known as antenna carriers (denoted by AxC), from BBU 1010 and RRU 1020 via fiber optic cables 1030. Each antenna carrier carries I/Q data for one RF signal at one antenna element. In an embodiment illustrated in FIG. 31A, a 2×2 MIMO antenna 1041 comprises two uplink antenna carriers on the uplink fiber and two downlink antenna carriers on the downlink fiber. I/Q data samples are interleaved and placed in a basic frame of the antenna carrier. Samples from multiple antennas are contained in each basic frame. The uplink information can include one or more system information blocks (SIBs) as defined by an LTE protocol. The SIBs can include a physical resource block (PRB). From a PRB the system can obtain uplink information, which can include among other things, an indication of how many communication devices will be transmitting wireless signals in uplink paths assigned by one or more base stations, power level(s) that will be used by each of the communication devices during uplink wireless communications, the resource blocks that are assigned to each communication device, and other useful parametric information utilized by each communication device when communicating via an uplink path.

In certain embodiments, the PRB can also be used by the system of the subject disclosure to create a signal profile. The signal profile can be, for example, an energy profile and/or a spectral profile, which can be determined from parametric information provided in the PRB (e.g., power level, resource blocks being used, radio access technology being used, etc.). The signal profile can be used to determine whether the wireless signal received is a standard signal (e.g., LTE signal), and if not standard, whether the wireless signal received causes signal interference. Accordingly, the signal profile can be used by the system of the subject disclosure to perform time domain and/or frequency domain analysis of measurements, which in turn can result in the detection of signal interferers.

The system of the subject disclosure can be adapted to perform, according to the uplink information, measurements on wireless signals transmitted by the communication devices via the uplink paths assigned to the communication devices. The wireless signals can be received via antennas (which in some embodiments may be configured as MIMO antennas). These antennas can be coupled to the system of the subject disclosure for performing measurements, processing and conditioning the signals received from the antennas according to such measurements, and for providing the conditioned signals to one or more base station processors. The measurements can be based on a sampling of analog signals supplied by an antenna receiving uplink wireless signals transmitted by the communication devices. In other embodiments, the measurements can be associated with measurements derived from digital signals supplied by one or more radio access networks (RANs) coupled to one or more corresponding antennas of a base station.

Conditioner 1060 can provide support for 2×2 and 4×4 MIMO antenna configurations (or other MIMO configurations), diversity antenna configurations, and a variety of CPRI interfaces. In an embodiment, conditioner 1060 supports up to 20 MHz carriers at CPRI rates 1-7, with 3, 5, and 7 being most common. In an embodiment, conditioner 1060 interfaces with 3 to 12 CPRI fiber pairs providing coverage for multiple bands in, for example, a three-sector site. Conditioner 1060 can be located anywhere within fiber optic range of BBU 1010 or RRU 1020, e.g., off tower, or even off site (e.g., a central office remote from the RRU 1020).

Conditioner 1060 comprises a plurality of CPRI interface cards 1065. In an embodiment, each CPRI interface card 1065 supports a CPRI link comprising up to 4 antenna carriers at, for example, 5, 10 and 20 MHz bandwidths. Each CPRI link comprises either one or more frequency bands. Multiple CPRI links can comprise multiple frequency bands. Each CPRI link can further comprise signals associated with MIMO or diversity antenna configurations and can comprise one or more sectors. For example, in one embodiment, the conditioner 1060 can provide capacity for up to twelve RRUs, 48 antenna carriers and 12 sectors. In other embodiments, the conditioner 1060 can provide capacity for more or less RRUs, more or less antenna carriers, and more or less sectors.

Each CPRI interface card 1065 can examine SIBs obtained from one or more downlink fibers to determine parameters of the uplink path signals received over the uplink fiber. In an embodiment, the CPRI interface card 1065 can take SINR measurements of each uplink path according to information obtained the SIBs obtained from the one or more downlink fibers and determine whether one or more SINR measurements fall below a threshold. In some embodiments, the CPRI interface card 1065 can take corrective action to improve one or more SINR measurements falling below the threshold, such as moving an uplink path affected by interference to an available uplink path in the same sector, or in different sectors, as set forth in more detail below. In an embodiment, the CPRI interface card 1065 can compare signals from different sectors to determine an approach for taking corrective action.

It will be appreciated that the threshold noted above can represent a minimally expected SINR measurement. It will be appreciated that the threshold compared against one or more SINR measurements can be a predetermined threshold. In other embodiments, the threshold can be determined empirically from measurements taken in a controlled setting to identify a desirable SINR measurement. In yet other embodiments, the threshold can be determined according to a running average of power levels within a resource block or among groupings of resource blocks. Other techniques described in the subject disclosure for determining a threshold that is compared to a SINR measurement can be used. Similarly, correlation techniques described in the subject disclosure can be used to identify circumstances that warrant corrective action of certain SINR measurements.

Figure 31B:
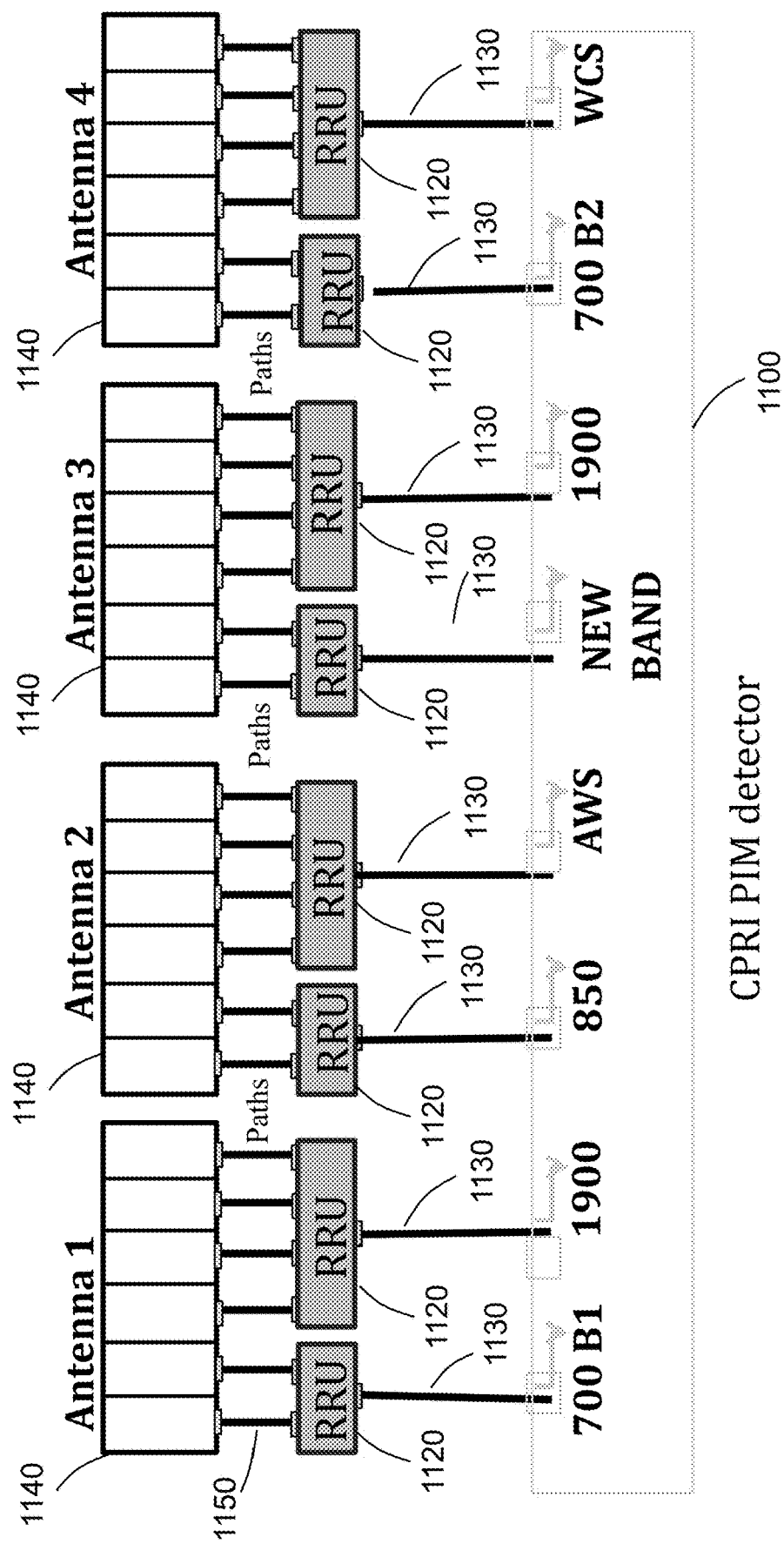
FIG. 31B illustrates a system for detecting passive intermodulation (PIM) interferences in uplink signals of a base station.

FIG. 31B illustrates a system for detecting passive intermodulation (PIM) interferences in uplink signals of a base station, the interference of which is described above in connection with FIG. 28. As illustrated in FIG. 31B, inserted between BBUs (not illustrated) and RRUs 1120 is a PIM detector 1100, which non-intrusively receives and supplies signals through a plurality of fiber optic cables 1130, which comprise multiple lines of CPRI antenna carrier data in full duplex at high speed over the fiber optic cables 1130. The PIM detector 1100 can be installed remotely from the base station. RRUs 1120 transmit and receive radio frequency (RF) signals from one or more antennas 1140 through RF coaxial cables 1150, denoted as "paths."

Prior art systems often confused PIM with wide band or narrow band interference. PIM detector 1100 illustrated in FIG. 31B measures the presence of PIM in one band and in one or multiple paths of an uplink based on detection algorithms applied to the measured signals. PIM detector 1100 can rank the source of PIM due to a junction, cables or components, or an antenna. PIM detector 1100 can quantify the PIM interference level, from low, moderate, to severe.

Knowing that a transmission signal on the same line is strong, if the line is duplexed, can indicate a PIM issue, and generally is an internal problem to the base station. Based on the level of PIM measured and correlation to RSSI a determination of the magnitude of the problem will be evaluated. For example, if the level of PIM on path 1 and on Path 2 are correlated, then it is more likely an external PIM is present. If there is no correlation, it is likely an internal PIM is present due to a particular component of the base station. By assessing a signature of the PIM, PIM detector 1100 can detect whether the source of interference is due to an LTE band signal, or due to other cellular technologies, or even non-cellular sources. As shown in FIG. 31B, if PIM is measured and is available on multiple bands that share the same cables and antenna, it is likely that a particular component or cable of a base station is the source of PIM.

Correlation with time can also be detected if PIM interference happens during a particular time when the system is heavily used and the PIM level can be correlated to another transmitter.

In an embodiment, a sequence of steps in a method are performed in which transmitters are turned on at different high power levels during a maintenance window and in certain combination(s) so that the PIM detector can determine if the PIM happens at certain target bands and under certain conditions. As illustrated in FIG. 31B, a cellular network carrier supplies 8 RF bands or services to a base station comprising four antennas 1140 in the mobile network. Each band/service may comprise 2 paths, or possibly 4 paths. As illustrated in FIG. 31B, four antennas 1140 comprise the 8 bands/services supplied by the carrier, over a total of 24 paths, two paths for the low frequency band, and four paths for the high frequency band on each antenna.

In the method, PIM detector 1100 builds an array of 24 RSSI measurements, one RSSI measurement for each path, while transmission occurs on one path, preferably under a simulated high traffic condition. Such high traffic condition can be simulated with the help of an Air interface load generator (AILG) or an Orthogonal channel noise simulator (OCNS) that creates signals at different frequencies, so that the level of PIM can be detected and determined. Another array of 24 RSSI measurements is built by PIM detector 1100 while transmission occurs only on the second path, and so forth. Each transmission path is used to create a row in a 24×24 matrix $M_i$ of RSSI measurements formed by the various transmissions:

$$24[^{24}]=M_i, \text{ where i denotes the power level}$$

Next, PIM detector 1100 changes the power level of the transmissions, thereby forming a series of matrices. By comparing the RSSI in each matrix to the next one, PIM detector 1100 can determine whether the transmissions are creating leakage, or possibly internal PIM from a particular transmission path. If increasing power with $M_i$ has an impact on the RSSI reading, then the interference is PIM, and internal PIM in particular. If the change in RSSI when power is doubled is 2 dBc, then the interference can be characterized as a 3rd order PIM. If the increase is 3-8 dBc, then the interference can be characterized as 5th order PIM. If increasing power with $M_i$ does not have an impact on the RSSI reading, then the interference is external.

In an embodiment, different combinations of bands and/or paths that can be impacted by PIM arising from multiple transmissions. From such combinations of bands and/or paths, PIM detector 1100 can be configured to determine if the PIM is caused by an internal component of a base station or an external component that is not part of the base station (e.g., an external metallic object that reflects a signal transmission from the base station). PIM detector 1100 can measure interference based on the detection algorithms in multiple bands and/or multiple paths based on the multiple transmissions. For example, consider only two transmitters transmitting in two bands out of the eight bands, there would be (8!/6!/2!) combinations, or 28 possible dual band transmission cases for the base station illustrated in FIG. 31B. If three transmitters out of the eight bands were transmitting at the same time to cause the PIM, there would be (8!/5!/3!) combinations, or 56 possible tri-band transmission cases for the base station of FIG. 31B. If four transmitters out of the eight bands were transmitting at the same time to cause the PIM, there would be (8!/4!/4!) combinations, or 70 possible quad-band transmission cases for the base station of FIG. 31B. If all 154 possible transmission combinations (28+56+70) are considered, then a matrix $MC_i$ can be formed measuring the RSSI in each of the 24 paths:

$$154[^{24}]=MC_i, \text{ where i denotes the power level}$$

By comparing the RSSI levels under different power levels and conditions, PIM detector 1100 can determine whether there is a certain combination that creates PIM interference, whether the interference is a function of certain frequency bands, or whether the interferences is a function of certain antenna proximity issues. By repeating the test transmissions at other sectors, further diagnosis can be performed.

Once PIM interference has been detect, corrective actions may include: checking antenna or moving antennas; adding a PIM cancellation solution, as described above; resolving issues related to variability among sectors; or looking at MCi and evaluating the increase in RSSI at different levels to determined what order level PIM (3rd, 5th, etc.) is causing the interference. Additionally, the impact on performance under different loading conditions can be considered. For example, the delta increase in RSSI can be correlated to a certain power level and as a result, the offending transmission should be reduced. Another case is when the optimum level of transmission is determined for a particular traffic condition on one of the 8 transmitters. This process may be repeated for each band.

In an embodiment, interference detection may be extended in several ways: the matrices of a particular sector may be correlated with that of another sector in the same site, and as a result, determine if there are issues in particular with antenna isolation, or more of a systemic issue; the matrix element of a particular sector can be correlated to determine the integrity of the RF environment and the quality of RF signals; or detection algorithms can determine the LTE quality. In an embodiment, the matrices of a particular site can be correlated with those of a neighboring site (taking into consideration that the other site may have different antenna configuration or isolation but the same frequency bands). In this case the information can help increase the confidence level in determining if the PIM is internal or external and if its external what bands are targeted. The information can help detect if the PIM or interference is coming from another competitive carrier or is self-inflicted due to the multiple bands in operation. (For example, peak and quiet time tends to be the same for all carriers and therefore maintenance window testing can rule out or confirm the source.)

In another embodiment, RSSI elements in the matrices could be replaced with spectral pictures in which the information can be segmented further into an array of frequencies. This will give further insight and provide information on the mixing combinations and determine if there are leakages instead of PIM. Also, any correlation with power levels can be used to determine the order of the PIM. In an embodiment, the system can be automated to perform carrier testing at maintenance window, which will provide a wealth of information on the quality of network.

Figure 31C:
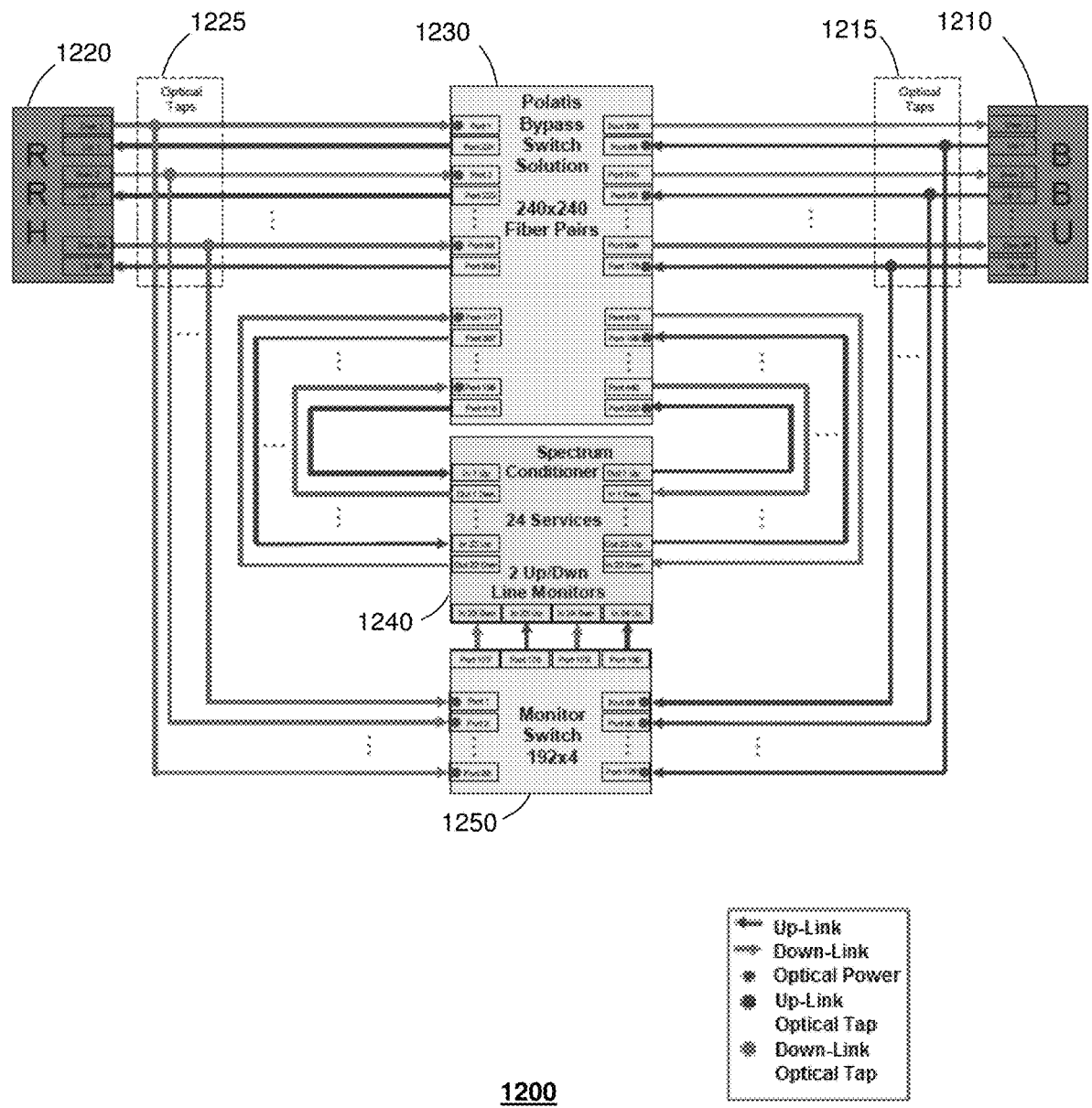
FIG. 31C illustrates a system for monitoring, detecting, testing, diagnosing, and/or mitigating interference in a wireless communication system.

FIG. 31C illustrates a system for monitoring, detecting, testing, diagnosing, and/or mitigating interference in a wireless communication system. As illustrated in FIG. 31C, inserted between a BBU 1210 and an RRU 1220 is a plurality of uplink optical taps 1215, a bypass switch 1230, and a plurality of downlink optical taps 1225. In an embodiment, bypass switch comprises an array of 240×240 optical ports, some powered, to receive and transmit optical signals. System 1200 also comprises a spectrum conditioner 1240 and a monitor switch 1250. In an embodiment, spectrum conditioner 1240 provides up to 24 resources for RF interference mitigation shared among the optical links, and two pairs of up/down line monitors. In an embodiment, monitor switch 1250 provides selective monitoring of two pairs of uplink/downlink signals chosen from up to 192 optical links.

In an illustrative embodiment, system 1200 monitors all of the CPRI links of an LTE base station. System 1200 analyzes I/Q data and extracts information that gives insight to the base station performance. The extracted information can include LTE signal quality, SINR, PRB utilization, intercell interference (ICI), any abnormalities, including PIM, interference, leakage interference and component problems. System 1200 also determines an LTE quality indicator, for example, an increase in RSSI above a historical acceptable level without an increase in traffic, which implies a performance issue with any one of the LTE base station(s) being monitored.

ICI can occur when an LTE uplink signal is received by a particular base station having the summation of 2 frequency components, the first is the signal received from the mobile devices or user equipment (UEs) that are connected to base station, and the second component is the signal from UEs serviced by other base stations that occupy the same frequency band as used by base station. This second component is considered an interfering signal for the base station, even though it is generated by UEs that are serviced by other base stations belonging to the same carrier. ICI noise can be detected from header information included in the noise signal.

System 1200 comprises algorithms that can classify the problem either as ICI, PIM detection, leakage, in-band interference, competitive carrier levels and antenna isolation detection, link conditioning and PIM analysis. Leakage noise can include uplink interference at a base station of interest caused by another base station that generates noise (e.g., defective power amplifier, defective mask/filtering, limitations on where base station that generates noise was placed, or poor cell placement engineering). Leakage noise generally occurs on the edges of a frequency band. System 1200 also monitors and records ICI levels and change in distribution of traffic, which may not indicate an immediate problem, but can be used for traffic engineering to avoid future issues before they happen.

Once system 1200 determines an issue, system 1200 obtains an accurate measurement of SINR (see U.S. patent application Ser. No. 14/702,855, filed May 4, 2015, which is incorporated by reference herein), and calculates the level of degradation and the impact on KPIs. Depending on the severity of the interference, system 1200 has a pool of problem alleviating resources, such as interference mitigation, interference cancelation and interference leveling, which can be applied to alleviate the interference. For example, system 1200 can monitor 192 links and have 24 resources for RF interference mitigation shared among the 192 links. The pool of resources will be available to cover any of the problems identified by system 1200. The resources are deployed to mitigate the interference and avoid any degradation in the link and any customer impact.

In an embodiment, system 1200 is adapted to coordinate test measurements with carrier scripts that control power and loading on certain links and bands in a predetermined sequence based on the identified interference sources of interference during a maintenance window. Based on measurements performed during the maintenance window, coupled with data gathered during which the interference occurred (e.g., frequency of interference, impact on KPIs of the base station, etc.), system 1200 determines a more detailed diagnosis of the interference. System 1200 can provide detailed information to the base station (or central server) of the carrier. For example, if the source of interference is determined to be PIM, system 1200 can be adapted to determine whether the PIM interference is internal or external to a base station of interest, the magnitude of the interference, and/or the order of the PIM interference, the impact on RSSI, and generate a time log to document occurrences. Spectrum conditioner 1240 can provide a real-time spectral view of the interference. If the detected interference is ICI elevation in any particular band, such interference could indicate a need to change traffic distribution across different bands. System 1200 can resolve leakage from other bands by adjusting center frequency of a carrier (retuning of a network). Other carrier power levels may be causing receiver sensitivity issues at the RRU, e.g., AGC (automatic gain control) issues at the RRU that need be resolved and addressed.

If system 1200 performs ICI monitoring/mitigation and has access to down link information from the base station directed to the UEs, then system 1200 will be able to distinguish the UEs that were given permission to be serviced by the base station versus others UEs communicating with other base stations in the same frequency band. If system 1200 doesn't have access to this down link information, it can accurately estimate the signal from those UEs serviced by the base station by distinguishing their RF signal in the time domain as having a different time offset than the signal from the others UEs communicating with other base stations in the same frequency band. Once system 1200 has detected those 2 groups of signals (i.e., from UEs communicating with the base station and UEs communicating with other base stations in the same frequency band) as described above, the magnitude of the ICI can be determined and quantified.

One of the challenges of wireless carriers is the placement of antenna which result in an undesirable coupling between antennas (i.e., a signal transmitted by one antenna is received by another antenna). Lower coupling between antennas indicates better isolation. Carriers try to maximize isolation through physical isolation (i.e., vertical or horizontal separation). Other methods can be used, such as filtering or direction/polarization of one antenna relative to another. For example, one carrier can have 12 antennas (e.g., a group of 4 per each 3 sector) per site, and if more than one carrier is sharing the site, the number of antennas can grow, sometimes as large as 36 antennas. Placing 36 antennas on a tower or a roof of a building without creating an impact is a complicated task, and as carriers try to optimize performance of one band or a group of antennas, they may impact other bands/antennas. Coupling between antennas can occur from a carrier's own placement of their antennas, or by other carriers placing antennas in a location that inadvertently creates coupling with antennas of another carrier.

It is hard to know an effect that an antenna may have on another during the day and under normal traffic conditions. But at night, during periods of very low traffic, system 1200 may generate high power levels at one antenna and observe received power at other antennas to determine whether there is an acceptable level of antenna coupling and proper isolation between antennas.

Figure 32A:
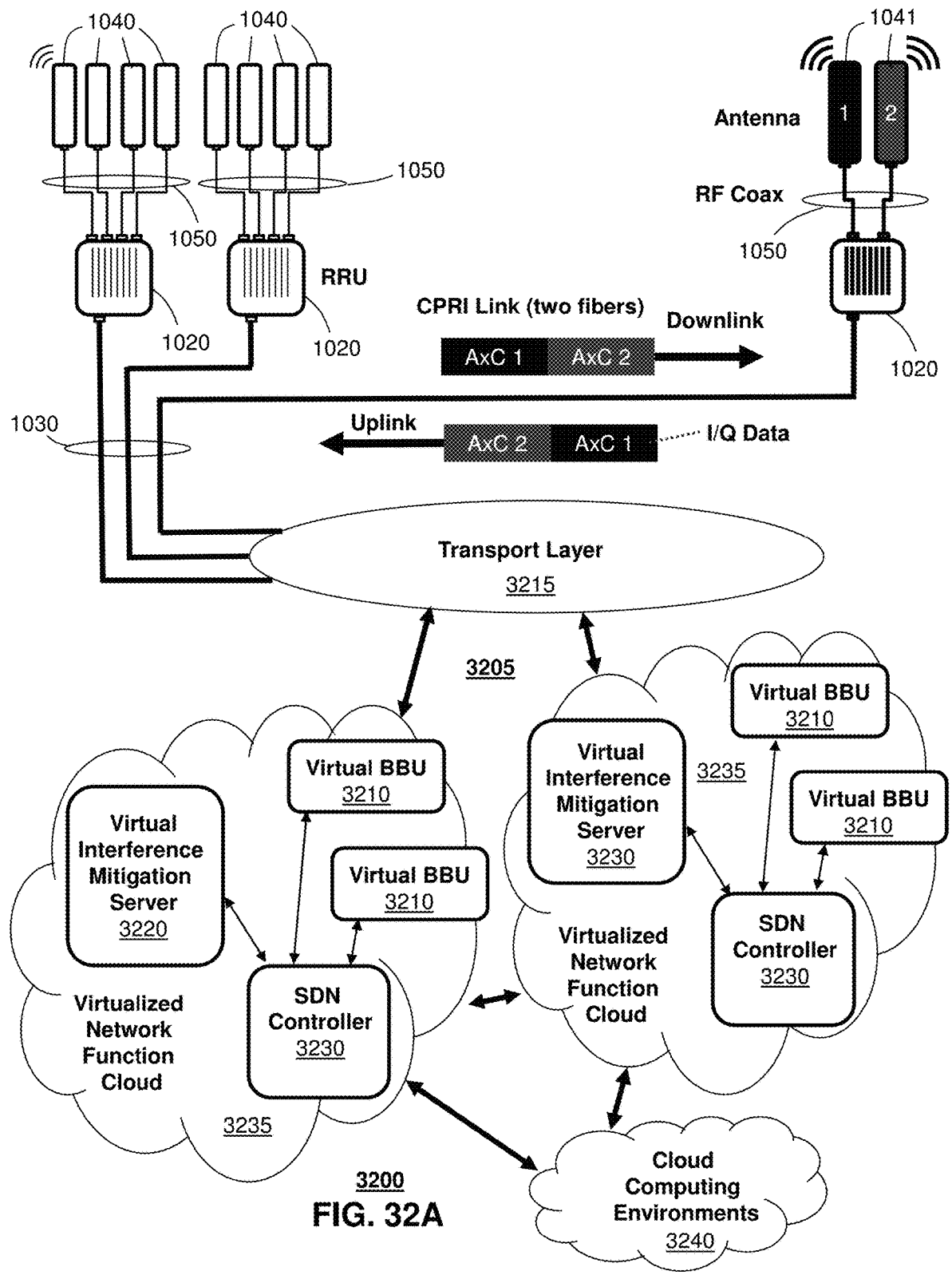
FIG. 32A is a block diagram depicts an illustrative embodiment of an interference detection and mitigation system.

FIG. 32A illustrates a block diagram depicting an example, non-limiting embodiment of a communication system 3200 including a virtualized interference mitigation network in accordance with various aspects described herein. In particular a virtualized interference mitigation network is presented that can be used to implement some or all of the methods for interference mitigation described herein. In one or more embodiments, communication system 3200 for conditioning uplink signals. Communication system 3200 can include remote radio units (RRU) 1020 and one or more antennas 1040. The RRUs 1020 can transmit and receive radio frequency (RF) signals to and from the one or more antennas 1040 through RF coaxial cables 1050. The RRUs 1020 can include circuitry to convert the baseband digital signals to RF signals, and vice-versa. In one embodiment, the RRUs 1020 can be coupled to fiber optic cables 1030. In one embodiment, the fiber optic cables 1030 can carry digital data to and from the RRUs. In one embodiment, a common public radio interface (CPRI) protocol can be used to carry digital data to and from the RRUs 1020 via full duplex at high speed over the fiber optic cables 1030.

The digital data, also known as antenna carriers (denoted by AxC), can originated from the RRUs 1020 or from virtual BBUs 3210, which are further described herein. In one embodiment, each antenna carrier can include In-Phase and Quadrature (I/Q) data for an RF signal associated with an antenna element. I/Q data can describe an instantaneous state of an RF signal by providing magnitude and phase angle information based on sinusoidal modeling of the RF signal. If an RF signal is used for modulating a voice/data signal on a carrier wave, then I/Q data can effectively convey information about the data being carried. In addition, I/Q data can be provided in a Cartesian coordinate system (X, Y), where X=amplitude and Y=phase angle. In an embodiment illustrated in FIG. 32A, a 2×2 MIMO antenna 1041 can include two uplink antenna carriers on the uplink fiber and two downlink antenna carriers on the downlink fiber. I/Q data samples can be interleaved and placed in a basic frame of the antenna carrier. Samples from multiple antennas are contained in each basic frame.

In one or more embodiments, the communication system 3200 can include virtualized interference mitigation, where functions for interference detection, mitigation, and baseband communications serving uplink and downlink paths can be implemented via a cloud networking architecture 3205. In particular, a cloud networking architecture 3205 is shown that can leverage cloud technologies and supports innovation and scalability. The cloud networking architecture 3205 for virtualized interference mitigation can include a transport layer 3215 and/or one or more virtualized network function clouds 3235. The cloud networking architecture 3205 can also include one or more cloud computing environments 3240. In various embodiments, this cloud networking architecture 3205 can be implemented via an open architecture that leverages application programming interfaces (APIs), which can seamlessly scale to meet evolving customer requirements including traffic growth, diversity of traffic types, and diversity of performance and reliability expectations.

In one or more embodiments, the cloud networking architecture 3205 can employ virtualized network function clouds 3235 to perform some or all of the functions of interference detection and mitigation. The virtualized network function clouds 3235 can include virtual network functions (VFN) or virtual network elements (VFE) to perform some or all of the functions for interference detection and mitigation as described herein. For example, the virtualized network function clouds 3235 can provide a substrate of networking capability, often called Network Function Virtualization Infrastructure (NFVI) or simply infrastructure that is capable of being directed with software and Software Defined Networking (SDN) protocols. In one embodiment, the virtualized network function clouds 3235 can include one or more a SDN Controllers 3230 that can direct, control, and/or modify the operation of the virtualized network function clouds 3235 and of the VFE and/or VFE that are instantiated in the virtualized network function clouds 3235. The virtualized network function clouds 3235 can support Network Function Virtualization (NFV).

As an example, an interference mitigation function, such as an adaptive front-end module 56 (shown in FIG. 4), can be implemented via a VNE composed of NFV software modules, merchant silicon, and/or associated controllers. The interference mitigation function can be in the form of a Virtual Interference Mitigation Service that is instantiated into the virtualized network function cloud 3235 by the SDN Controller 3230. Various interference mitigation functions can be instantiated in the virtualized network function clouds 3235, such as, but not limited to systems and/or methods for signal processing 116 (shown in FIG. 8), interference detection (shown in FIGS. 10-11), adaptive threshold determination (shown in FIG. 16), interference mitigation (shown in FIG. 19), network adaptation and optimization (shown in FIG. 20), and/or link analysis, optimization, and/or management (shown in FIG. 23). Other interference mitigation functions can be instantiated in the virtualized network function clouds 3235, such as, but not limited to systems and/or methods for adapting inter-cell interference thresholds based on thermal noise (shown in FIGS. 27A-B), conditioning uplink signals (shown in FIG. 31A, mitigating passive intermodulation interference (PIM) (shown in FIG. 31B), and general interference diagnosis and testing (shown in FIG. 31C).

In one or more embodiments, software can be written so that increasing workload on the virtualized network function clouds 3235 consumes incremental resources from a common resource pool, and moreover so that it is elastic: so, the resources are only consumed when needed. In a similar fashion, virtual interference mitigation servers 3220, virtual BBUs (3210, and other network elements such as other routers, switches, edge caches, and middle boxes), can be instantiated from a common resource pool as directed by an SDN Controller 3230. Such sharing of infrastructure across a broad set of uses makes planning and growing infrastructure easier to manage.

In an embodiment, the cloud networking architecture 3205 can include a transport layer 3215. The transport layer 3215 can include fiber, cable, wired and/or wireless transport elements, network elements and interfaces to transmit digital signals to and from the RRUs 1020 to the virtualized network function clouds 3235. In one example, fiber optic cable 1030 can transmit digital signals between the RRUs 1020 and the virtualized network function cloud 3235, and the transport layer 3215 simply be a continuation of the fiber optic cable and/or include repeating and/or buffering functions. In one example, the transport layer 3215 can translate the digital signals between the fiber optic cable 1030 and other transport media, such as wired or wireless connections. In one embodiment, a network element, such as a virtual BBU 3210, may need to be positioned at a specific location. For example, a bank of virtual BBUs 3210 may be physically co-located to take advantage of common infrastructure. To optimally link digital signals between a client RRU 1020 and a virtual BBU 3210 that is in a remote locations, the transport layer 3215 may convert between a communication media, such as a fiber optic link to the RRU 1020, and a long-haul media, such as the Internet or a cellular system. In one embodiment, a network element, such as a BBU, may include physical layer adapters that cannot be abstracted or virtualized, or that might require special DSP code and analog front-ends (AFEs), such that the network element cannot be completely virtualized. In this case, all or part of the network element may be included in the transport layer 3215.

The virtualized network function clouds 3235 can interfaces with the transport layer 3215 to provide virtual network elements, such as virtual interference mitigation servers 3220 and virtual BBUs 3210, that provide specific NFVs. In particular, the virtualized network function cloud 3225 can leverage cloud operations, applications, and architectures to support communication loading and required interference mitigation. For example, virtual interference mitigation servers 3220 and virtual BBUs 3210 can employ network function software that provides either a one-for-one mapping of non-networked versions of these functions or, alternately, combines versions of these functions that are designed and/or optimized for cloud computing. For example, virtual interference mitigation servers 3220 and virtual BBUs 3210, or other ancillary network devices, may be able to process digital data signals without generating large amounts of network traffic. As such, their workload can be distributed across a number of servers within and/or between each virtualized network function cloud 3235. Each virtual interference mitigation servers 3220 and virtual BBUs 3210 can add its portion of capability to the whole, so that the cloud networking architecture 3205 exhibits an overall elastic function with higher availability than a strictly monolithic version. These virtual interference mitigation servers 3220 and virtual BBUs 3210 can be instantiated and managed by an SDN Controller 3230 using an orchestration approach similar to those used in cloud compute services.

In one or more embodiments, the virtualized network function clouds 3235 can further interface with other cloud computing environments 3240 via application programming interfaces (API) that can expose functional capabilities of the virtual interference mitigation servers 3220 and virtual BBUs 3210 to provide flexible and expanded capabilities to the virtualized network function cloud 3235. In particular, interference mitigation workloads may have applications distributed across the virtualized network function clouds 3235 and the cloud computing environment 3240 (at third party vendors). The SDN Controller 3230 may orchestrate workloads supported entirely in NFV infrastructure from these third-party locations.

In one or more embodiments, a virtual interference mitigation servers 3220 at a virtualized network function cloud 3235 can be configured to receive digital signals from RRUs 1020 operating at a communications site, such as at a cellular tower. The virtual interference mitigation server 3220 can rely on the digital nature of the digital signals (converted from the RF domain prior to transmission on the fiber optic cables 1030), the transport layer 3215, and the virtualized network function cloud 3235 to facilitate remote processing of digital signals representing RF signals received at the RRUs 1020. In one embodiment, the virtual interference mitigation server 3220 can perform measurements on these digital signals for detecting interference on RF signals and can initiate mitigation for detected interference.

In one or more embodiments, the virtual interference mitigation server 3220 can perform measurements on digital data that it receives via the transport layer 3215. The virtual interference mitigation server 3220 can include interfaces capable of interfacing with the digital signals in a protocol, such as the common public radio interface (CPRI) protocol. In one embodiment, the virtual interference mitigation server 3220 can include one or more protocol-capable interface cards. In one embodiment, the virtual interference mitigation server 3220 can implement protocol compatibility via hardware, software, or a combination of hardware and software. In one embodiment, each virtual interference mitigation server 3220 can support one or more data links (CPRI-capable links). Each data link can include one or more frequency bands. Multiple data links can include multiple frequency bands. Each data link can further include signals associated with multiple-input and multiple-output (MIMO) antennas 1041 or diversity antenna configurations. Each data links can support one or more sectors. For example, a virtual interference mitigation server 3220 can provide capacity for banks of RRUs 1020, antenna carriers, and sectors at multiple cell locations.

In one or more embodiments, the virtual interference mitigation server 3220 can examine system information blocks (SIBs) to determine parameters of the uplink path signals received over the transport layer 3215. In an embodiment, the virtual interference mitigation server 3220 can obtain SINR measurements of uplink paths according to digital signal information from SIBs. The virtual interference mitigation server 3220 can determine whether one or more SINR measurements fall below a threshold and, in turn, can take corrective action to improve one or more SINR measurements that fall below the threshold. For example, the virtual interference mitigation server 3220 can determine a corrective action, whereby an uplink path that is affected by interference is moved to an available uplink path in the same sector, or in different sectors. In an embodiment, the virtual interference mitigation server 3220 can compare signals from different sectors to determine an approach for taking corrective action.

In one or more embodiments, the virtual interference mitigation server 3220 can include a conditioner function. The condition function can include an adaptive filter (as illustrated in FIGS. 7 and 8), and/or can execute signal processing algorithms described in the subject disclosure. The conditioner of the virtual interference mitigation server 3220 can receive digital signals from the transport layer 3215, where these digital signals represent RF signals that are received at the RRU 1020. The conditioner of the virtual interference mitigation server 3220 can provide support for 2×2 and 4×4 MIMO antenna configurations (or other MIMO configurations), diversity antenna configurations, and a variety of CPRI interfaces. In one embodiment, the conditioner can be co-located at the virtual interference mitigation server 3220. In other embodiments, the conditioner can be located anywhere, including at the virtual BBU 3210, the RRU 1020, the transport layer 3215, and/or at a second virtualized network function cloud 3235 or a cloud computing environment 3240.

In one or more embodiments, the virtual BBU 3210 provides digital communications to the RRU 1020. In one embodiment, a virtual BBU 3210 that is directing an RRU 1020 can be located in the same virtualized network function cloud 3235 as a virtual interference mitigation server 3220 that is performing interference measurements on digital signals from this same RRU 1020. In this way, an SDN Controller 3230 at the virtualized network function cloud 3235 can coordinate instantiation, configuration, and, if needed, decommissioning of the virtual BBU 3210 and the virtual interference mitigation server 3220. In one embodiment, the virtual BBU 3210 and the virtual interference mitigation server 3220 can be instantiated into different virtualized network function clouds 3235. In this situation, multiple SDN Controllers 3230 and virtualized network function clouds 3235 may be involved in managing these VNE.

Figure 32B:
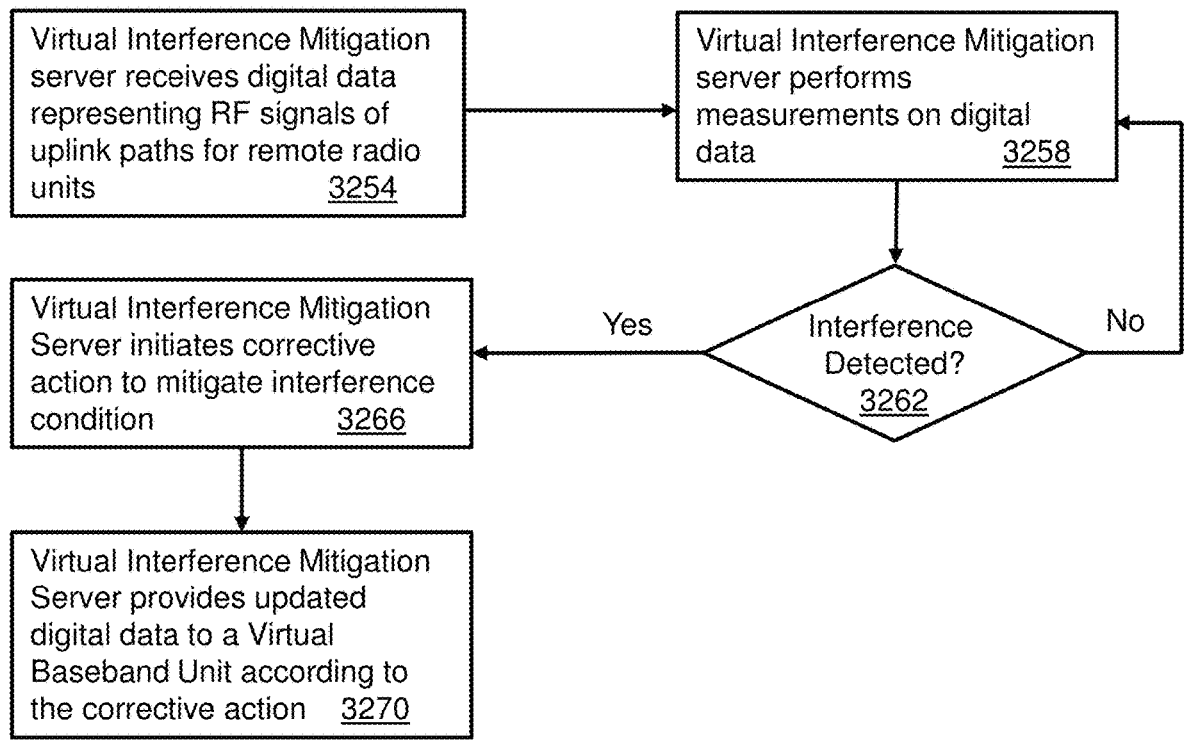
FIG. 32B is a flow diagram depicting an illustrative embodiment of a method for detecting and mitigating interference.

FIG. 32B depicts an illustrative non-limiting embodiment of a method 3250 for performing virtual interference mitigation. Method 3250 can be combined or adapted in whole or in part with other embodiments of the subject disclosure including other methods described herein. Beginning with step 3254, a virtual interference mitigation server 3220 of the subject disclosure can be adapted to obtain digital data representing RF signals of uplink paths associated with RRUs 1020 in communication with communication devices (e.g., mobile phones, tablets, stationary communication devices, etc.) that transmit wireless signals on the uplink paths. Uplink instructions are generally sent to communication devices via downlink wireless signals to enable the communication devices to engage in uplink wireless communications. In other embodiments, the virtual interference mitigation server 3220 can obtain uplink information based on information provided by a transport layer 3215. The uplink instructions can include SIBs from which the system performing method 3250 can obtain uplink information including an indication of how many communication devices will be transmitting wireless signals in uplink paths assigned by one or more base stations, power level(s) that will be used by each of the communication devices during uplink wireless communications, the resource blocks that are assigned to each communication device, and other useful parametric information utilized by each communication device when communicating via an uplink path.

In one or more embodiments, at step 3258, the virtual interference mitigation server 3220 of the subject disclosure can be adapted to perform, measurements of the digital signals of the uplink paths assigned to the communication devices. Wireless signals from the communication devices can be received via antennas 1040. These antennas 1040 can be coupled to RRUs 1020, which can generate the digital signals representing the RF signals that have been received. In one or more embodiments, the virtual interference mitigation server 3220 can perform measurements, processing, and/or conditioning of the digital signals received from the transport layer 3215.

At step 3262, the virtual interference mitigation server 3220 can be adapted to detect signal interference in one or more of the measurements performed at step 3258 based on such measurements that compare unfavorably to one or more thresholds. The threshold(s) can be based on the signal profile previously described and/or embodiments of other methods described in the subject disclosure (e.g., adaptive thresholds determined from an average baseline power level) which can be further adapted to take into consideration a knowledge of the uplink information associated with the communication devices transmitting wireless signals on one or more uplink paths. As noted earlier the uplink information can include, but is not limited to, the number of communication devices that will be transmitting in uplink paths, the power level(s) used by each communication devices while transmitting during one or more assigned resource blocks, the resource blocks that have been assigned to each communication device, and other useful parametric information utilized by each communication device when communicating via an uplink path.

The number of communication devices transmitting wireless signals on uplink paths can be used to determine a density of spectral energy expected in certain resource blocks and at certain time slots. With prior knowledge of the transmission characteristics used by each communication device, the system can be adapted to determine a threshold per resource block based on an expected power level for each corresponding resource block, an overall threshold based on an expected average power level across groups of resource blocks, a timing of the use of the resource blocks by the communication devices, or combinations thereof. A threshold can be determined statically, or dynamically as a running average of power levels as described in other embodiments of the subject disclosure. In an embodiment, the measurements performed at step 3258 can be based on SINR (or other) measurements described in the subject disclosure. At step 3262, the system of the subject disclosure can be further adapted to identify one or more affected uplink paths based on one or more measurements that compare unfavorably to the one or more thresholds of step 3258.

Responsive to identifying the affected paths and thereby detecting signal interference in such paths based on the threshold(s), the virtual interference mitigation server 3220 of the subject disclosure can be adapted to take corrective actions in step 3266 to improve the measurements of the affected paths. The affected uplink path can be affected by interference signals as described in the subject disclosure. The corrective action can include without limitation, singly or in combination, locating unused uplink paths that are not affected by the interference, suppressing one or more interference signals on the affected uplink paths, adjusting the number of communication device allowed to transmit wireless signals on the affected uplink paths, or by performing other mitigation techniques described in the subject disclosure.

At step 3270, the virtual interference mitigation server 3220 can be adapted to provide updated digital data to one or more virtual BBU 3210 to implement a corrective action. The virtual interference mitigation server 3220 of the subject disclosure can instruct one or more virtual BBU 3210 to move transmissions to one or more uplink paths different from the one or more affected uplink paths, instructing one or more of the plurality of communication devices to move to one or more uplink paths to uplink paths located in different sectors, or to move affected uplink paths to different uplink paths of a different base station, or any combinations thereof. The different uplink paths moved to can be unused, and thus, available uplink paths. In an embodiment, the virtual interference mitigation server 3220 of the subject disclosure can check the noise and/or interference level of the available uplink paths to ensure that better communications can be provided as a result of moving from the affected uplink paths.

The foregoing embodiments can be adapted for other applications as well. For example, the uplink information can be used by the system of the subject disclosure to determine PRB utilization, which can be reported to a base station processor. Based on interference detection and mitigation across one or more resource blocks, the system of the subject disclosure can be further adapted to provide recommendations and/or direct a base station processor to modify SIBs to improve PRB utilization in one or more uplink paths.

While for purposes of simplicity of explanation, the respective processes are shown and described as a series of blocks in FIG. 32B, respectively, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methods described herein.

Figure 32C:
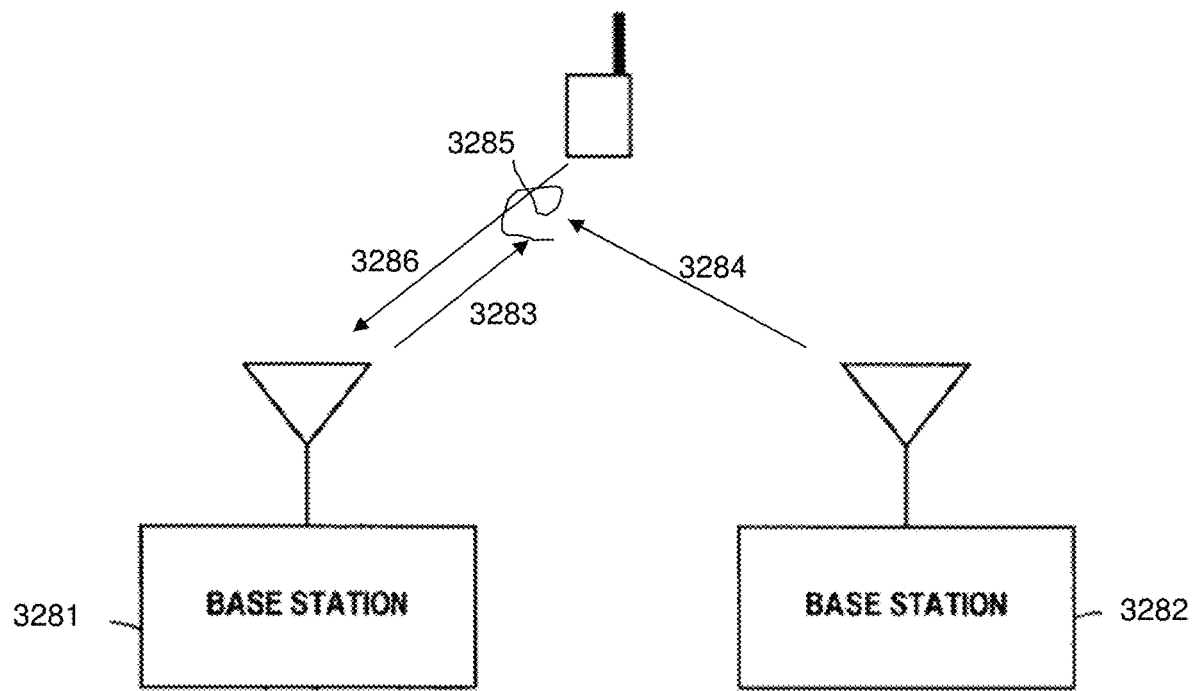
FIG. 32C is a block diagram illustrating a case of PIM interference generated by RF transmissions of two base stations in a cellular network.

FIG. 32C is a block diagram illustrating a case of PIM interference generated by RF transmissions of two base stations in a cellular network 3280. As shown in FIG. 32C, downlink RF transmission signals 3283, 3284 from the two base-stations (e.g., 3281 and 3282) are non-linearly mixed to produce an intermodulation product 3285 that interferes with an uplink channel 3286 for one of the two base stations (e.g., 3281), which is used to receive signals from a mobile (or even a stationary) communication device. As mentioned above, the intermodulation product 3285 is formed as a result of RF transmission signals 3283 and 3284 non-linearly mixing in a passive circuit, such as a bad RF connection, damaged cables, poor antennas, metallic structures, etc. (not illustrated). In this example, the interfering signal is generated by the non-linear mixing of the two downlink signals from base stations 3281 and 3282. In a practical application, 3281 can cancel the PIM interference, because it has knowledge of one of the two signals (i.e., 3283) that were mixed together in the above example that formed the PIM interference 3285 affecting the uplink channel 3286, and can solve for the PIM interference 3285 based on the known transmission, i.e., its own downlink transmission 3283.

Consider an input presumed to be a sum of the uplink signal 3286 received on the uplink channel, and the PIM interfering signal 3285. The PIM interfering signal 3285 is a non-linear combination of the transmit signal 3283 coming from base station 3281 and another signal 3284 coming from base station 3282. The difference between the input signal on the uplink channel and the uplink signal 3296 (if known) would be the PIM interfering signal 3285. If the PIM interfering signal 3285 could be inferred, a canceler technique could be used to remove the PIM interference and restore the received uplink signal. But PIM interference can be more generally caused by more than two base stations, or by two other base stations.

Figure 32D:
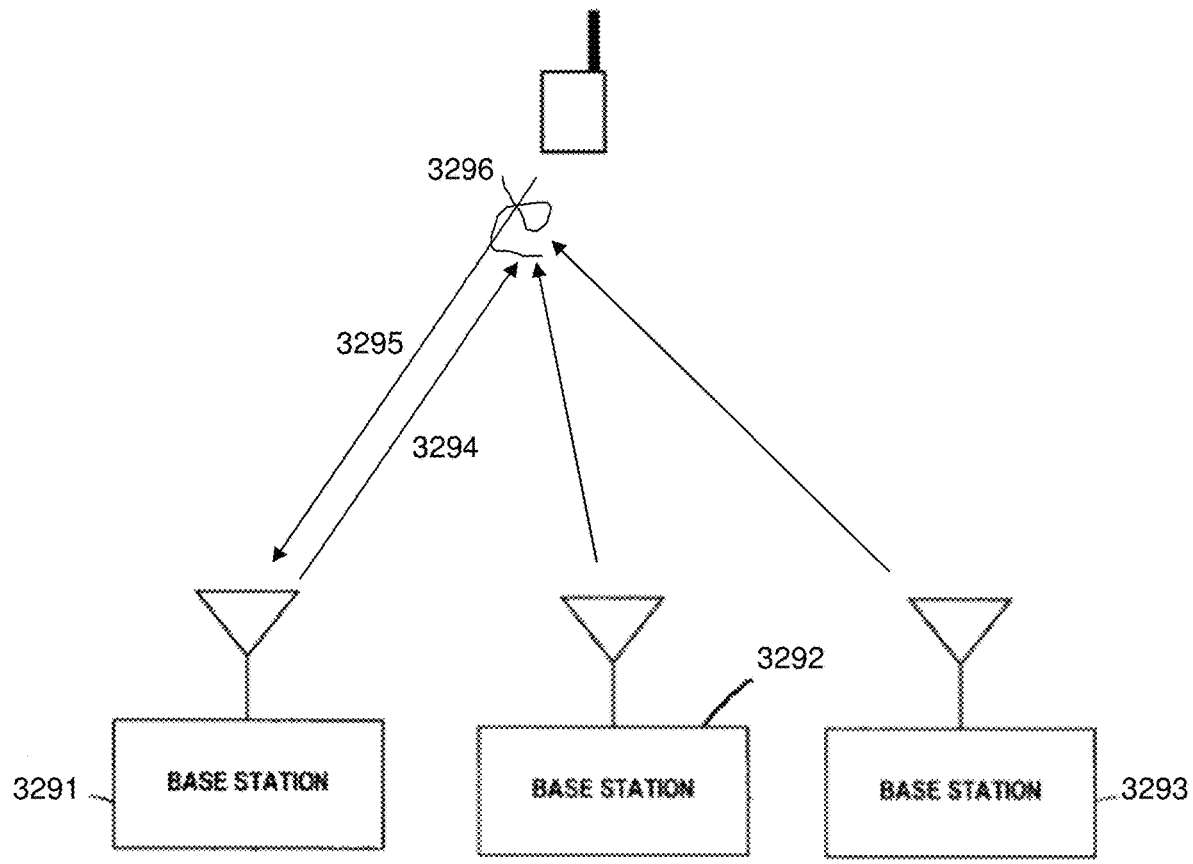
FIG. 32D is a block diagram illustrating a case where three base stations generate a PIM interfering signal by non-linear mixing of three downlink signals, each transmitted by a respective base station.

FIG. 32D is a block diagram illustrating a case 3290 where three base stations, 3291, 3292 and 3293, generate a PIM interfering signal 3296 by non-linear mixing of three downlink signals in a passive circuit, each transmitted by a respective base station. In this scenario, base station 3291 only has knowledge of one of those three downlink signals, namely the downlink signal 3294 that base station 3291 transmitted.

However, the received uplink signal 3295 is typically quite different from the three downlink signals creating the PIM interfering signal 3296. The uplink signal 3295 has unique characteristics in both the time and frequency domains that are distinguishable from the PIM interfering signal 3296. These characteristics, referred to hereinafter as a "profile," are dictated by the LTE standard. The PIM interfering signal 3296 will typically have a very different set of time and frequency characteristics or profile.

A method for creating an educated guess about the PIM interfering signal is presented below. At the outset, the method presumes that there are three transmitted signals that are creating the PIM interfering signal, and only one of the three signals is known. Further, the method assumes that time variances of the signals are not rapid, and thus the resultant PIM interfering signal does not rapidly change as well. Hence, measurements can be taken at four different times. These four measurements can be used to solve a system of equations having up to four unknowns.

For example, when there are three transmitted signals, each characterized by an amplitude and a phase, if one of the transmitted signal's amplitude and phase are known, then the other two signals' amplitude and phase would be four unknown values. By applying the techniques described above, those four unknown values can be determined, and an estimation of the PIM interference signal is enhanced and can be used to cancel out the PIM interference from the input signal on the uplink channel.

Assume 3 base stations each transmit a downlink (DL) signal causing the PIM, and assume only A & A1 are known:

PIM $a_p^{(t)}$ is DL1 in port 0 A
  $a_n^{(t)}$ is DL1 in port 1 A1
  $b_p^{(t)}$ is DL2 in port 0 B
  $b_n^{(t)}$ is DL2 in port 1 B1
  $C_p^{(t)}$ is DL3 in port 0 C
  $C_n^{(t)}$ is DL3 in port 1 C1 where: $a_p^{(t)}$ or A is polarized at any angle of the downlink signal 1 (DL1) at time t, and $a_n^{(t)}$ or A1 is normal to the polarized signal (DL1) at time t, etc.

The components of the PIM comprise the following:

IM 3LP $\alpha$ $a_p \cdot b_p \cdot c_p$
IM 3LN $\alpha$ $a_n \cdot b_n \cdot c_n$
IM 3LX $\alpha$ $(\alpha a_p + \beta a_n)(\alpha b_p + \beta b_n)(\alpha C_p + \beta C_n)$
  $\alpha$ $[\alpha^3 a_p b_p C_p + \beta^3 a_n b_n C_n + \alpha^2 \beta a_p b_p C_n + \alpha \beta^2 a_p b_n C_n + \alpha^2 \beta a_p b_n C_p + \alpha \beta^2 a_n b_n C_p + \alpha^2 \beta a_n b_p C_p + \alpha \beta^2 a_n b_p C_n]$, where: IM 3LP is the intermodulation interference signal in the polarized direction,
  IM 3LN is the intermodulation interference signal in the normal direction,
  IM 3LX is the intermodulation interference signal, and
  $\alpha$ and $\beta$ are random angles IM $3LX$=IM $3LP$+IM $3LN$+IM $3L1$+IM $3L2$+IM $3L3$+ IM $3L4$+IM $3L5$+IM $3L6$, where: IM 3L-6 are intermediate cross product terms.
Hence,

IM $3LX$=IM $3LP$+IM $3LN$+$ABC1$+$AB1C1$+$AB1C$+ $A1B1C$+$A1BC$+$A1BC1$

Assume that A & A1 are known [B & B1 and C & C are unknown] and IM 3LP & IM 3LN are almost zero. Therefore, four equations are needed to find the value of four unknowns. If four different cases of IM 3LX are measured, i.e., at four different times that are close enough in time that the PIM does not significantly change: IM $3LX_{i,\ i=1 \rightarrow 4}$, the four unknowns (B, B1, C, C1) can be determined, from which the intermediate cross product terms can be identified.

In a special case: when B=C or B=A, i.e., then there are only two transmitters, and only two measurements are needed.

One of the benefits of this technique is that the method can be implemented in the radio head of a base station. As a result, the signal profile of the downlink signal is known, thus making the implementation easier.

In another embodiment, four different measurements can be taken while the base station reduces the power of the downlink signal during each measurement, thereby creating the four measurements used to solve the four unknown values of phase and amplitude of the other two downlink signals that form the PIM interfering signal.

In another embodiment, the base station includes a dual band radio. In such embodiment, two out of the three transmitted signals are known, and only one transmitted downlink signal is unknown. In this embodiment, only two measurements would be needed to solve for the unknown amplitude and phase of the unknown transmitted downlink signal.

In another embodiment, two unknown transmitters provide information concerning the amplitude and phase of their transmitted downlink signals to a radio head, through other means in the 5G ecosystem.

In another embodiment, a base station having a high processing capability provides information concerning the transmitted downlink signals, or the PIM interfering signal, to other smaller cell sites.

In another embodiment, an antenna receives information from the radio head and helps identify the PIM interference. In this embodiment, the input signal is delayed using a delay buffer. While the input signal is being delayed, the profile of the signal is calculated. A time-domain profile calculator calculates metrics in the time domain. These could include mean, median, peak, and mathematical combination of them, such as peak-to-average ratio. A frequency-domain profile calculator calculates metrics in the frequency domain. These could include occupied bandwidth, shape of the power spectral density, resource block utilization, etc. These metrics that are computed by the profile calculators are compared against a set of thresholds. The time-domain and/or frequency-domain thresholds can be pre-determined based on measurements of desired uplink signals that are free from interference. If the time-domain threshold and/or frequency-domain threshold is exceeded, signal conditioning techniques are applied to the received signal.

In another embodiment, multiple cancelation techniques are applied in a cascaded way, one after another, in which one technique would be more effective than another. The signal conditioning technique used depends on which metric exceeds its corresponding threshold. The collective processing delay of the time-domain and frequency-domain profile calculators, threshold comparisons, and generation of conditioning parameters must be the same delay added to the signal by the delay buffer.

The foregoing embodiments, can be used by, for example, a device to reduce interference by:
  measuring the time-domain and frequency domain profile of the received signal, comprised of the sum of the desired signal(s) and interfering signal(s)
  comparing the measured profile against pre-determined profile thresholds,
  applying signal conditioning techniques to the combined signal when the measured profiles exceeds the thresholds.
The profile thresholds are pre-determine based on of measurement of desired signals without interference.
The signal conditioning technique used depends on the profile metric that exceeds its corresponding threshold
Signal conditioning techniques include, but are not limited to:
  limiting or clipping of the signal amplitude, magnitude, or power
  frequency domain filtering (low pass, band pass, or notch)

Figure 33:
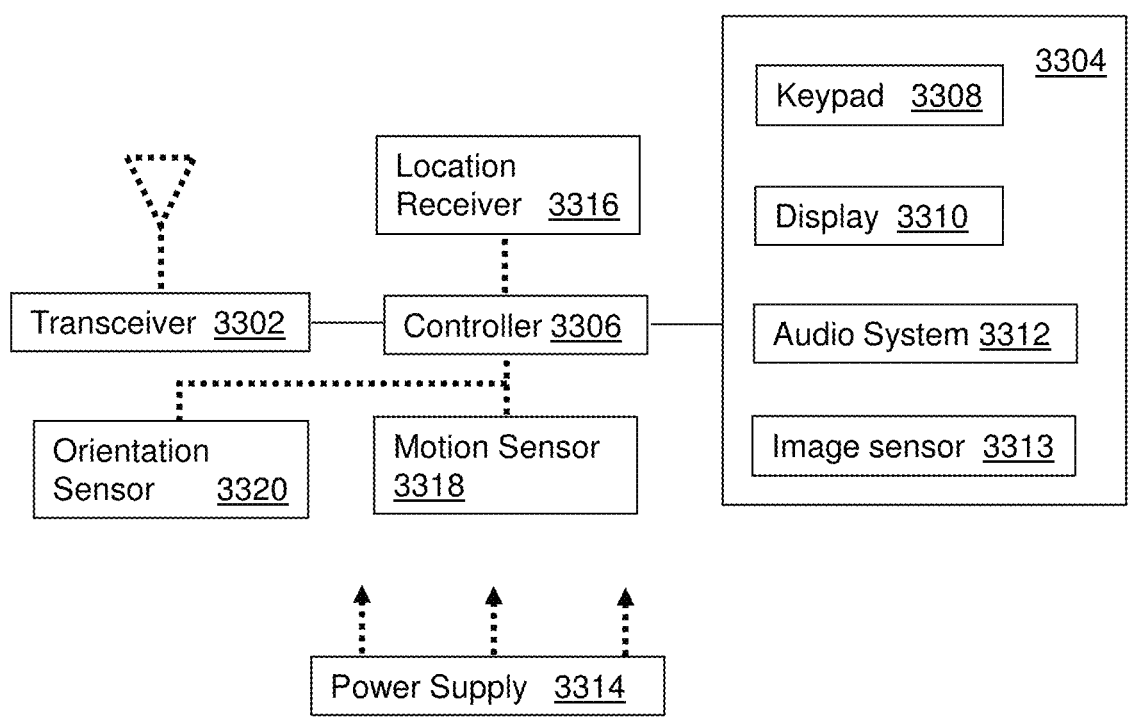
FIG. 33 depicts an illustrative embodiment of a communication device that can utilize in whole or in part embodiments of the subject disclosure for detecting and mitigating interference.

Time-domain profile metrics include:
Calculating or measuring the mean, median, and peak power of the signal
averages of the above measurements
ratios of the above measurements
making measurements synchronized the desired signals timing. This includes making measurements synchronized with the air-interface timing, including as measurements performed over a symbol time, slot, sub-frame, and or frame.
making measurements asynchronously
Frequency-domain profile metrics include:
occupied bandwidth
shape of the spectrum density
resource block utilization An illustrative embodiment of a communication device 3300 is shown in FIG. 33. Communication device 3300 can serve in whole or in part as an illustrative embodiment of the devices depicted in FIGS. 1, 4, and 6-8. In one embodiment, the communication device 3300 can be configured, for example, to perform operations such as measuring a power level in at least a portion of a plurality of resource blocks occurring in a radio frequency spectrum, where the measuring occurs for a plurality of time cycles to generate a plurality of power level measurements, calculating a baseline power level according to at least a portion of the plurality of power levels, determining a threshold from the baseline power level, and monitoring at least a portion of the plurality of resource blocks for signal interference according to the threshold. Other embodiments described in the subject disclosure can be used by the communication device 3300.

To enable these features, communication device 3300 can comprise a wireline and/or wireless transceiver 3302 (herein transceiver 3302), a user interface (UI) 3304, a power supply 3314, a location receiver 3316, a motion sensor 3318, an orientation sensor 3320, and a controller 3306 for managing operations thereof. The transceiver 3302 can support short-range or long-range wireless access technologies such as Bluetooth, ZigBee, Wi-Fi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 3302 can also be adapted to support circuit-switched wireline access technologies (such as PSTN), packet-switched wireline access technologies (such as TCP/IP, VoIP, etc.), and combinations thereof.

The UI 3304 can include a depressible or touch-sensitive keypad 3308 with a navigation mechanism such as a roller ball, a joystick, a mouse, or a navigation disk for manipulating operations of the communication device 3300. The keypad 3308 can be an integral part of a housing assembly of the communication device 3300 or an independent device operably coupled thereto by a tethered wireline interface (such as a USB cable) or a wireless interface supporting for example Bluetooth. The keypad 3308 can represent a numeric keypad commonly used by phones, and/or a QWERTY keypad with alphanumeric keys. The UI 3304 can further include a display 3310 such as monochrome or color LCD (Liquid Crystal Display), OLED (Organic Light Emitting Diode) or other suitable display technology for conveying images to an end user of the communication device 3300. In an embodiment where the display 3310 is touch-sensitive, a portion or all of the keypad 3308 can be presented by way of the display 3310 with navigation features.

The display 3310 can use touch screen technology to also serve as a user interface for detecting user input. As a touch screen display, the communication device 3300 can be adapted to present a user interface with graphical user interface (GUI) elements that can be selected by a user with a touch of a finger. The touch screen display 3310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 3310 can be an integral part of the housing assembly of the communication device 3300 or an independent device communicatively coupled thereto by a tethered wireline interface (such as a cable) or a wireless interface.

The UI 3304 can also include an audio system 3312 that utilizes audio technology for conveying low volume audio (such as audio heard in proximity of a human ear) and high-volume audio (such as speakerphone for hands free operation). The audio system 3312 can further include a microphone for receiving audible signals of an end user. The audio system 3312 can also be used for voice recognition applications. The UI 3304 can further include an image sensor 3313 such as a charged coupled device (CCD) camera for capturing still or moving images.

The power supply 3314 can utilize common power management technologies such as replaceable and rechargeable batteries, supply regulation technologies, and/or charging system technologies for supplying energy to the components of the communication device 3300 to facilitate long-range or short-range portable applications. Alternatively, or in combination, the charging system can utilize external power sources such as DC power supplied over a physical interface such as a USB port or other suitable tethering technologies.

The location receiver 3316 can utilize location technology such as a global positioning system (GPS) receiver capable of assisted GPS for identifying a location of the communication device 3300 based on signals generated by a constellation of GPS satellites, which can be used for facilitating location services such as navigation. The motion sensor 3318 can utilize motion sensing technology such as an accelerometer, a gyroscope, or other suitable motion sensing technology to detect motion of the communication device 3300 in three-dimensional space. The orientation sensor 3320 can utilize orientation sensing technology such as a magnetometer to detect the orientation of the communication device 3300 (north, south, west, and east, as well as combined orientations in degrees, minutes, or other suitable orientation metrics).

The communication device 3300 can use the transceiver 3302 to also determine a proximity to a cellular, Wi-Fi, Bluetooth, or other wireless access points by sensing techniques such as utilizing a received signal strength indicator (RSSI) and/or signal time of arrival (TOA) or time of flight (TOF) measurements. The controller 3306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 3300.

Other components not shown in FIG. 33 can be used in one or more embodiments of the subject disclosure. For instance, the communication device 3300 can include a reset button (not shown). The reset button can be used to reset the controller 3306 of the communication device 3300. In yet another embodiment, the communication device 3300 can also include a factory default setting button positioned, for example, below a small hole in a housing assembly of the communication device 3300 to force the communication device 3300 to re-establish factory settings. In this embodiment, a user can use a protruding object such as a pen or paper clip tip to reach into the hole and depress the default setting button. The communication device 3300 can also include a slot for adding or removing an identity module such as a Subscriber Identity Module (SIM) card. SIM cards can be used for identifying subscriber services, executing programs, storing subscriber data, and so forth.

The communication device 3300 as described herein can operate with more or less of the circuit components shown in FIG. 33. These variant embodiments can be used in one or more embodiments of the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 34:
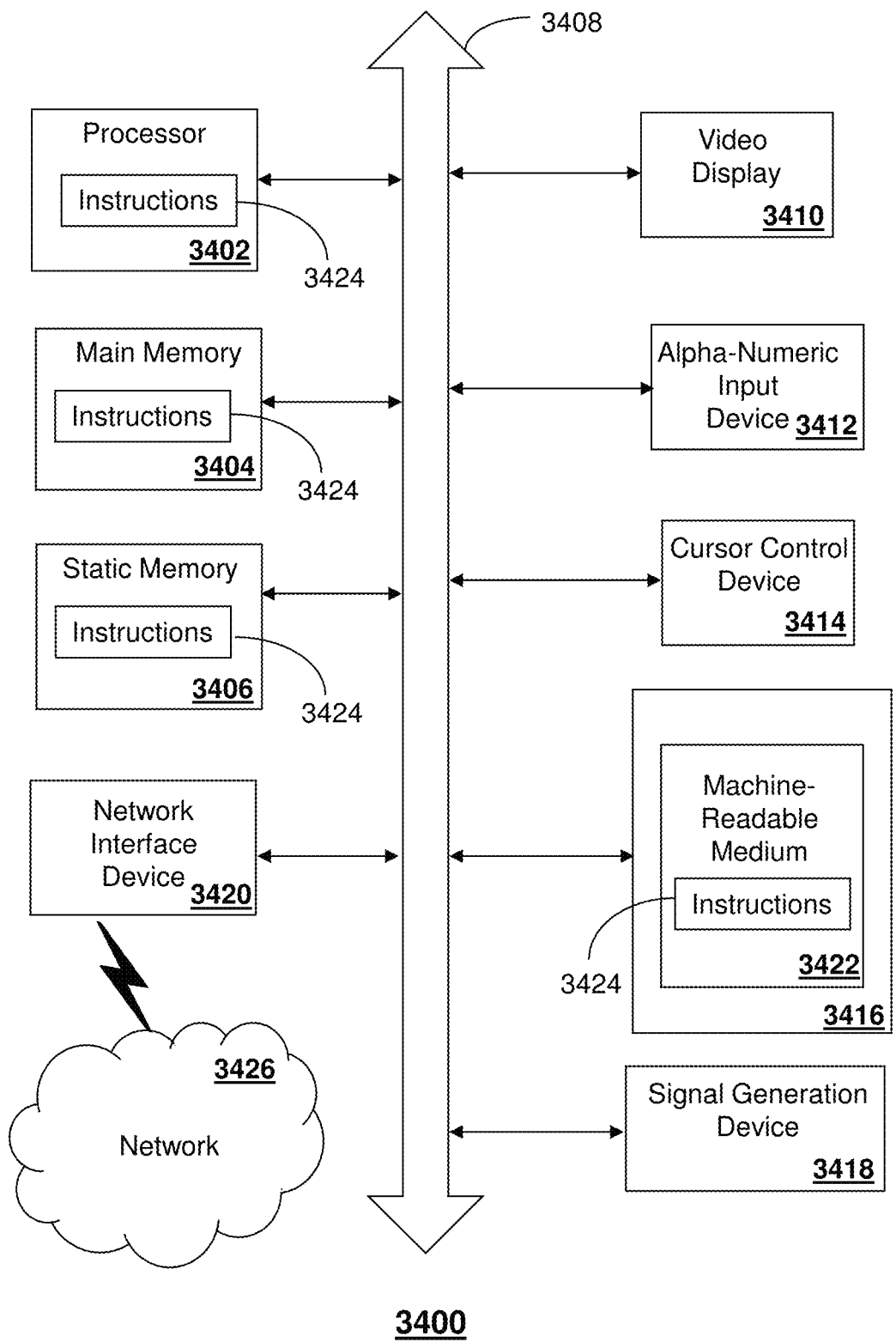
FIG. 34 is a diagrammatic representation of a machine in the form of a computer system within which a set of instructions, when executed, may cause the machine to perform any one or more of the methods described herein.

FIG. 34 depicts an exemplary diagrammatic representation of a machine in the form of a computer system 3400 within which a set of instructions, when executed, may cause the machine to perform any one or more of the methods described above. One or more instances of the machine can operate, for example, as the devices of FIGS. 1, 4, and 6-8. In some embodiments, the machine may be connected (e.g., using a network 3426) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 3400 may include a processor (or controller) 3402 (e.g., a central processing unit (CPU), a graphics processing unit (GPU, or both), a main memory 3404 and a static memory 3406, which communicate with each other via a bus 3408. The computer system 3400 may further include a display unit 3410 (e.g., a liquid crystal display (LCD), a flat panel, or a solid-state display. The computer system 3400 may include an input device 3412 (e.g., a keyboard), a cursor control device 3414 (e.g., a mouse), a disk drive unit 3416, a signal generation device 3418 (e.g., a speaker or remote control) and a network interface device 3420. In distributed environments, the embodiments described in the subject disclosure can be adapted to utilize multiple display units 3410 controlled by two or more computer systems 3400. In this configuration, presentations described by the subject disclosure may in part be shown in a first of the display units 3410, while the remaining portion is presented in a second of the display units 3410.

The disk drive unit 3416 may include a tangible computer-readable storage medium 3422 on which is stored one or more sets of instructions (e.g., software 3424) embodying any one or more of the methods or functions described herein, including those methods illustrated above. The instructions 3424 may also reside, completely or at least partially, within the main memory 3404, the static memory 3406, and/or within the processor 3402 during execution thereof by the computer system 3400. The main memory 3404 and the processor 3402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 3422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, ZigBee), and long-range communications (e.g., WiMAX, GSM, CDMA, LTE) can be used by computer system 3400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   receiving, by a circuit, a first uplink signal generated by a communication device without passive modulation interference;
   measuring, by the circuit, a time-domain profile and a frequency-domain profile of the first uplink signal to generate pre-determined profile thresholds;
   comparing, by the circuit, a second time-domain profile of a second uplink signal and a second frequency-domain profile of the second uplink signal with the pre-determined profile thresholds to detect a passive intermodulation interference in the second uplink signal, wherein the passive intermodulation interference is caused by one or more unknown downlink signals generated by one or more transmitters, wherein the one or more transmitters are unassociated with the communication device generating the first uplink signal; and
   performing, by the circuit, signal conditioning on the second uplink signal to reduce the passive intermodulation interference, wherein the signal conditioning is based on a profile of the passive modulation interference that the circuit calculates by mathematically solving a system of equations comprising coefficients for a known downlink signal from a transmitter associated with the communication device and unknown coefficients for the one or more unknown downlink signals.

2. The method of claim 1, wherein the profile is generated according to a rolling average of samples of the known downlink signal.

3. The method of claim 1, wherein the known downlink signal is sent from a base station comprising the circuit to the communication device, and wherein the profile is adjusted to mitigate time variances of the one or more unknown downlink signals.

4. The method of claim 1, wherein the signal conditioning is applied in a cascaded way.

5. The method of claim 1, wherein the estimations are based on measuring one or more, but not all of the unknown downlink signals.

6. The method of claim 1, wherein the performing further comprises performing signal conditioning on the second uplink signal in the time domain.

7. The method of claim 1, wherein the estimations are determined from a power level of one or more spectral segments of the one or more unknown downlink signals.

8. The method of claim 1, wherein the estimations are determined from a peak-to-average power ratio of one or more spectral segments of the one or more unknown downlink signals.

9. The method of claim 1, wherein the estimations are determined from conditions in one or more spectral segments of the one or more unknown downlink signals.

10. The method of claim 1, wherein the estimations are determined from one or more spectral segments of the one or more unknown downlink signals analyzed in the time domain.

11. The method of claim 10, further comprising analyzing signal transitions of the one or more spectral segments of the one or more unknown downlink signals in the time domain.

12. The method of claim 1, wherein the time-domain profile is determined according to a mean calculation of a magnitude and a power level of the signal, a median calculation of the magnitude and the power level of the signal, a peak calculation of the magnitude and the power level of the signal, a peak-to-average-power ratio calculation of the signal, a peak-to-average ratio magnitude calculation of the signal, or any combination thereof.

13. The method of claim 1, further comprising obtaining downlink information associated with the one or more transmitters, wherein the circuit generates the estimations of one or more, but not all of the unknown downlink signals according to the downlink information of the one or more transmitters.

14. A base station, comprising:
an antenna; and
a circuit coupled to the antenna, the circuit facilitating operations including:
receiving an uplink signal generated by a communication device;
generating a time-domain profile and a frequency-domain profile of the uplink signal;
detecting, by the circuit, a passive intermodulation interference in the uplink signal, wherein the passive intermodulation interference is caused by unknown signals of one or more transmitters that are non-linearly mixed with a downlink signal of the base station, wherein the passive intermodulation interference is detected by the circuit based on a characteristics of the uplink signal from the time-domain profile and the frequency-domain profile interfered by the passive intermodulation interference and compared to pre-determined profile thresholds, and wherein the one or more transmitters are unassociated with the base station; and
performing signal conditioning on the uplink signal to reduce the passive intermodulation interference, wherein the signal conditioning is based on a profile of the passive modulation interference calculated by mathematically solving a system of equations comprising coefficients for a known downlink signal transmitted by the base station and unknown coefficients for the one or more unknown signals.

15. The base station of claim 14, wherein the circuit generates the estimations of the one or more unknown signals generated by one or more transmitters.

16. The base station of claim 14, wherein the circuit comprises a remote radio unit and/or a baseband processor unit.

17. The base station of claim 14, wherein the uplink signal is received via a cable conforming to a common public radio interface (CPRI) protocol, and wherein the generating and the detecting is performed based on signaling data samples conforming to the CPRI protocol.

18. A machine-readable storage device, comprising executable instructions that, when executed by a system, facilitate performance of operations, the operations comprising:
receiving an uplink signal generated by a communication device without interference;
creating pre-determined profile thresholds from a time-domain profile and a frequency-domain profile of the uplink signal;
detecting a passive intermodulation interference in a received uplink signal by comparison of characteristics of the received uplink signal with the pre-determined profile thresholds, wherein the passive intermodulation interference is caused by the one or more transmitters; and
performing signal conditioning on the uplink signal to reduce the passive intermodulation interference, wherein the signal conditioning is based on a profile for the passive intermodulation interference calculated by mathematically solving a system of equations comprising coefficients for a known downlink signal from a transmitter associated with the communication device and unknown coefficients for one or more unknown downlink signals generated by the one or more transmitters.

19. The machine-readable storage device of claim 18, wherein the detecting comprises detecting the passive intermodulation interference by comparing a power level threshold to the time-domain profile, and wherein the time-domain profile is determined according to a mean calculation of a magnitude and a power level of the signal, a median calculation of the magnitude and the power level of the signal, a peak calculation of the magnitude and the power level of the signal, a peak-to-average-power ratio calculation of the signal, a peak-to-average ratio magnitude calculation of the signal, or any combination thereof.

20. The base station of claim 14, wherein the time-domain profile is determined according to a mean calculation of a magnitude and a power level of the signal, a median calculation of the magnitude and the power level of the signal, a peak calculation of the magnitude and the power level of the signal, a peak-to-average-power ratio calculation of the signal, a peak-to-average ratio magnitude calculation of the signal, or any combination thereof.

* * * * *